United States Patent [19]
Dunn et al.

[11] 3,750,024
[45] July 31, 1973

[54] NARROW BAND DIGITAL SPEECH COMMUNICATION SYSTEM

[75] Inventors: James G. Dunn, Montclair, N.J.; John R. Cowan, Brooklyn, N.Y.

[73] Assignee: International Telephone and Telegraph Corporation, Nutley, N.J.

[22] Filed: June 16, 1971

[21] Appl. No.: 153,591

[52] U.S. Cl. ....... 325/38 B, 179/1 SA, 179/15.55 R, 179/15 BW
[51] Int. Cl. .......................... H04b 1/66, H03k 13/22
[58] Field of Search ..................... 179/15 BW, 1 SA, 179/15.55 R, 15.55 T; 178/DIG. 3; 325/38 B

[56] References Cited

UNITED STATES PATENTS

| | | | |
|---|---|---|---|
| 3,659,052 | 4/1972 | Slavin | 179/15 BW |
| 3,594,509 | 7/1971 | Shimamura | 179/15.55 R |
| 3,499,996 | 3/1970 | Klayman | 179/15.55 R |
| 3,621,150 | 11/1971 | Pappas | 179/15.55 T |

*Primary Examiner*—Benedict V. Safourek
*Attorney*—C. Cornell Remsen, Jr., Philip M. Bolton et al.

[57] ABSTRACT

Speech to be transmitted is sampled at a given rate with each of the samples being converted to a binary representation of its amplitude. A digital arithmetic unit under control of predetermined program determines from the binary representations of the two immediately preceeding samples the redundant information of the speech, a weighting parameter of the redundant information and removes this redundant information from the speech to produce a residual non-redundant signal. The weighting parameter is transmitted according to a predetermined binary code having a given number of binary bits and the residual signal is transmitted by delta modulation. The binary code representation of the weighting parameter and the delta modulation representing the residual signal are time multiplexed for transmission to a receiver. At least one distinctive combination of bits of a code group of the weighting parameter is employed to indicate an out-of-synchronization condition. The clock recovery, framing and timing signal at the receiver are derived from the code groups representing the weighting parameter. A digital arithmetic units in the receiver responds to the weighting parameter code groups and the delta modulation to reconstruct the binary representations of the speech samples. The binary representations of the speech samples are converted to a analog signal and passed through a low pass filter to reconstruct the speech for utilization. The size of the delta modulation step is adjusted in the receiver in accordance with the number of delta modulation bits having a given polarity in sequence.

19 Claims, 67 Drawing Figures

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

ADDRESS CODES

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

INVENTORS
JAMES G. DUNN
JOHN R. COWAN
BY Alfred C. Hill
AGENT

INVENTORS
JAMES G. DUNN
BY JOHN R. COWAN
Alfred C. Hill
AGENT

NARROW BAND DIGITAL SPEECH COMMUNICATION SYSTEM

BACKGROUND OF THE INVENTION

This invention relates to speech communication system and more particularly to a narrow band digital speech communication system.

The existing techniques for digital speech communication systems may be classified into two major catagories: (1) the wideband high bit rate systems including pulse code modulation (PCM), differential PCM and delta modulation and (2) narrow band low bit systems based on analysis and synthesis of speech. The analysis-synthesis systems may be further classified into the vocoder type of frequency spectrum analysis systems which generally suffer from an unnatural synthetic nature of the reproductive speech, and waveform analysis systems which attempt to remove the redundancy from the speech by transmitting only those samples which cannot be predicted from the previous history of the signal. The latter systems suffer from the delay introduced in the speech as a result of the storage of nonredundant samples and subsequent readout to provide a smooth transmission rate.

The most promising approach to digitizing speech is a variation of delta modulation or differential PC. These systems provide improved performance over ordinary PC when the signal power is an integrated spectrum, falling off at high frequencies, thereby implying a correlation between adjacent samples. A further improvement is possible if the predictor in the encoder can be designed to remove most of the redundancy inherent in speech.

One difficulty with ordinary delta modulation when applied to speech signals is the wide dynamic range of the spoken speech. To provide adequate signal-to-quantizing noise for weak voice sound it has been necessary in the past to operate at relatively high bit rates. This difficulty can be overcome by making the delta modulation adaptive to the signal amplitude or signal slope. This has resulted in a number of algorithims for companded or variable slope delta modulation systems.

However, as the sampling rate decreases, even adaptive companding becomes inadequate. The reason for this is that speech signals contain a great deal of highly oscillatory waveforms. Under such conditions an ordinary delta modulator has its step size optimized for maximum signal-to-distortion ratio. This is similar to an adaptive companded delta modulator in which the step size is adjusted slowly, for instance, at a syllabic rate. It is clear that at low sampling rates such a system makes a very poor approximation to oscillatory speech waveforms.

Other adaptive companding systems operate more in the nature of an instantaneous compander. To achieve fast response, however, such systems operate close to instability and, as a result, exhibit substantial overshoots of the actual waveform.

In studying the prior art techniques other than delta coding were considered with the aim of minimizing the bit rate of a digitized speech signal by means which are practical to implement and give reasonably good quality reproduction. In order to do this effectively, it is necessary to, in some manner, take advantage of the redundancy inherent in speech. Two broad classes of redundancy reduction techniques are 1. Predictive quantizers such as differential PC, delta modulation, and the like, and
2. Vocoders.

Both of these techniques are based on statistical properties of the speech signal; primarily on the statistical properties of the speech production process and secondarily on the perception characteristics of the listener. Because of this dependence on speech properties, these techniques cannot be simultaneously effective for digitizing both speech and other information sources whose outputs are in the voice band. Thus, the prior art techniques studied are applicable only to speech transmission.

The predictive quantizer is based on the notion that the speech signal can be separated into two parts:

1. The redundant part, for instance, that portion which can be predicted from a past knowledge of the signal, and
2. The unpredictable part.

The redundant part need not be transmitted because it can be reconstructed at the receiver from the past. Thus, it is only necessary to quantize and transmit the unpredictable part.

The vocoder is based on a device which models the speech production process, for instance, a speech synthesizer. By manipulating the parameters of this device an artificial speech signal is generated. For a transmission system, only the control parameter information need be sent because the synthesis device is used for reproduction at the receiver. The transmitter performs an analysis operation which determines the parameter data from the input speech.

Setting voice excited vocoders aside for the moment, the completely synthetic vocoders have achieved bit rates well below 10 kilobits per second (kbps) but their reproduction quality has been poor. Simple predictive quantizers, such as delta modulation, have been able to operate at bit rates as low as about 20 kbps before their quality deteriorates too far. There has been increasing evidence in the prior art that the region around 10kpbs offers a good compromise and such systems that can achieve these bit rates are:

1. Voice excited vocoders which assume that the excitation function is too difficult to synthesize. Therefore, this part of the speech signal is digitized and transmitted along with other parameters of the vocoder synthesizer.
2. Redundancy reduction techniques using linear or fan prediction or extremal sampling, and
3. Predicitive quantizers such as the system reported in an article by B. S. Atal and M. R. Schroeder, entitled, "Adaptive Predictive Coding of Speech Signals," Bell System Technical Journal, Volume 49, pgs. 1973–1986, October, 1970.

This above cited article and the technique disclosed therein will be referred to hereinbelow as the Atal and Schroeder article and technique. The cited article reports on a predictive quantizer which uses a fairly elaborate predicter, the parameters of which are varied in accordance with the time varying statistics of the input speech signal.

As a result of the technique study in the prior art, the predictive quantizer was selected as the most promising approach to achieving the desired relatively low bit rate, low cost, high intelligibility and speaker recognition. In principal, this type of system is very similar to the voice excited vocoder. However, the predictive quantizer can be implemented with digital processing which will result in lower cost and smaller and more reliable equipment. The predictive quantizer approach is considered superior to the redundancy techniques because it 1. is more efficient; the predictor can be more nearly matched to speech statistics and
2. has immediate processing while on the other hand the linear or fan prediction and extremal sampling system require a buffer storage the size of which limits the usefulness of the technique.

In accordance with the Atal and Schroeder technique the signal-to-quantizing error of the output is improved over that of the quantizer alone by the ratio of the signal-to-prediction error. If, for example, the prediction is accurate, say the signal-to-prediction error ratio is 20db(decibels) than the signal-to-reconstruction error would be approximately 26db. This assumes that the quantizer input signal to quantizing error ratio of a two level quantizer along is 6db. This ratio tends to be constant and about 4–6db for normal signals.

Thus, the problem of achieving good results for the predicitve quantizer of the Atal and Schroeder technique is one of designing the predicter to give an accurate prediction of the input signal. It should be noted, however, that the prediction of the Atal and Schroeder technique is not based on the past of the input signal, but, rather on the past of the reconstructed signal. The method of adapting the weights in accordance with the Atal and Schroeder technique is to assume, for the purpose of calculating the weights, that the reconstructed signal is the same as the input signal. In actual operation, if the prediction is good, the prediction error will be small, the error in the reconstructed signal will be small, therefore, the above assumption will be valid and the prediction should, in fact, have been good in the first place. Conversely, if the prediction is not good, then the errors will be large and the reconstructed signal will differ from the actual signal and there is no reason to expect the prediction to improve. Both of these situations have been encountered in practice.

The reconstructed signal at the transmitter is the same as the reconstructed signal at the receiver except for the effect of transmission errors. The spectrum of the reconstruction error tends to be flat because this error is the same as the quantizer error which tends to be flat even when the spectrum of the quantizer input is not flat.

The method of adapting the predictor weights is to solve the following simultaneous equations $$\sum_{i=1}^{m} w_i R_{ii} = R_i, \quad i = 1, \ldots, m$$

The coefficient in these equations are short term correlation fucntion which, in fact, can be defined in different ways. Three different definitions of the correlation coefficients are shown below.

$$(1)\ R_i = E s_n s_{n-i},\ R_{ii} = E s_{n-i} s_{n-i}$$

$$(2)\ R_i = E s_n r_{n-i},\ R_{ii} = E r_{n-i} r_{n-i}$$

$$(3)\ R_i = E r_n r_{n-i},\ R_{ii} = E r_{n-i} r_{n-i}$$

In these definitions, the operator $E$ is a short term average.

The first definition bases the calculation of the predictor weights on past values of the input signal. This is the method used in the Atal and Schroeder technique. They used a short term time average obtained by storing a 5 millisecond (ms) block of input data and averaging over that block. This method actually stores more than 5 ms of data since lagged products are formed where the lag may be as much as 10 to 15 ms when using long term prediction. The delay in the system, however, is still only 5 ms. This block of input data is then played through the predictor quantizer with the calculated values used for the weights. These predictor weights would be optimum for that 5 ms interval if the reconstructed signal was identical to the input signal.

An exponential time average could also be used with the first definition. This would eliminate the need for storing a 5 ms block of data but would mean that the predictor weights would be optimum for the immediate past rather than the 5 ms for which they are used.

The second definition for the correlation coefficients assumes a short term exponential time average and is the result of minimizing the short term means square value of the prediction residual. This definition has the peculiar destinction that the weights calculated are optimum, in the sense of minimizing the mean square error, at the time they are calculated if they had been in use all along; but, if they had been in use, the reconstructed signal would not have been the same and they would no longer have been optimum.

The third definition also assumes an exponential short term time average. The main justification for this definition is that the weights are determined entirely from the reconstructed signal which is available at the receiver also. Thus, no predictor parameter information need be transmitted to receiver. This is similar in principle to variable slope adaptive data modulators which determine quantizer level by past values of the binary data signal which is available at both the transmitter and receiver. It has, however, the disadvantage that the weight calculation is no longer directly related to the input signal.

The predictive quantizer employs a m-tap predictor. In principle, any number of taps can be used. However, the number of correlation coefficients, the difficulty of solving the simultaneous equations and the difficulty of ensuring filter stability all increase rapidly with the value of m. In regard to stability, it can be seen that the filter used at the receiver and also at the transmitter is of the recursive form and, therefore, with improper weights can be unstable.

There is nothing in the mathematics of the method of calculating the weights which says that the result will correspond to a stable filter. In fact, just the opposite; if the input signal has the form of a growing sinusoid, as occurs at the onset of voiceing, the calculated filter will be unstable during that period of time in an attempt to produce an output with a growing amplitude. Actually an unstable filter is satisfactory if it is not unstable too long. However, this would require updating the parameters every sample. It has been consistently observed during computer simulation that, unless a check on stability is made, occasional instabilities occur which cause very objectionable distortion. This seems to be aggravated by other factors, in addition to the update rate, such as finite accuracy in arithmetic and quantizing of parameters for transmission.

Thus, a stability check has been found essential to both the predictive quantizing system and the inventive system to be described hereinbelow. In the case of a two tap filter, the check is relatively easy. The check consists of seeing if the weights fall inside a triangular region in the $w_1$–$w_2$ plane bounded by three straight lines as will be described hereinbelow in greater detail under the heading "Description of the Preferred Embodiment." The stability check is much more complicated as the number of taps increases above two.

A different approach to stability is for the system to monitor the level of the prediction and compares it to the level of the input signal. Normally, the level of the prediction should be less than the level of the input. If it is not, their system assumes something is wrong, and forces the prediction to zero at that time. This is satisfactory as long as it doesn't happen too often. If this improper condition occurred frequently, one would lose the advantage of having the prediction in the first place.

In the system described in Atal and Schroeder article, the predictor is formed in two parts: (1) a long term prediction of the fundamental pitch period and (2) a short term prediction correspond to the broadly-shaped, short-term power spectrum of the signal. The long term prediction is adapted by finding the predictor tap with the maximum magnitude of the correlation coefficient. The long term predictor, thus, uses only one tap, the position and gain of the tap are variable and track the pitch of the voice signal. The short term prediction is the same as that described above except that the weights are based on the residual of the long term prediction instead of the input speech. The short term predictor used eight taps so that the response can exhibit up to four resonances.

It should be recognized that the long term prediction is considerably more complex to implement than the short term prediction only. Although at any one time only one tap is used, it is necessary to compute and compare about 100 correlation coefficients. Also, the values of 100 previous samples must be stored, both at the transmitter and receiver.

SUMMARY OF THE INVENTION

An object of the present invention is to provide a narrow band digital speech communication system of the adaptive prediction type which is an improvement over the adaptive prediction system described in the above cited Atal and Schroeder article.

Another feature of the present invention is to provide a narrow band digital speech communication system having a relatively low bit rate, for instance, in the order of 9,600 bits per second (bps) or lower, low cost, high intellegibility and speaker recognition.

Still another object of the present invention is to provide a narrow band digital speech communication system of the adaptive prediction type having a reduction in the size and complexity of the circuit imp'ementaion thereof as compared with the circuit implementation of the system disclosed in the above cited Atal and Schroeder article.

A feature of the present invention is the provision of a speech communication system comprising: a source of speech; first means coupled to the source responsive solely to the speech to determine the redundant information of the speech, to determine at least one parameter of the redundant information and to remove the redundant information from the speech to produce a residual signal; second means coupled to the first means to transmit the residual signal and the parameter of the redundant information; and third means coupled to the second means responsive to the residual signal and the parameter of the redundant information to reconstruct the speech for utilization.

Another feature of the present invention is the provision of a speech transmitter comprising: a source of spech; first means coupled to the source responsive solely to the speech to determine the redundant information of the speech, to determine at least one parameter of the redundant information and to remove the redundant information from the speech to produce a residual signal; and second means coupled to the first means to transmit the residual signal and the parameter of the redundant information.

Still another feature of the present invention is the provision of a receiver to provide speech output comprising: a source of delta modulation signals representing a non-redundant portion of the speech and binary code groups representing a predetermined parameter of a redundant portion of the speech; an arithmetic unit coupled to the source responsive to the delta modulation signals and the present one and a given number of immediately preceeding ones of the binary code groups to reconstruct a binary code representation of samples of the speech; and a digital-to-analog converter arrangement coupled to th arithmetic unit to provide the speech output.

BRIEF DESCRIPTION OF THE DRAWINGS

Above-mentioned and other features and objects of this invention will become more apparent by reference to the following description taken in conjunction with the accompanying drawing in which.

DESCRIPTION OF THE PREFERRED EMBODIMENT

Figure 1:
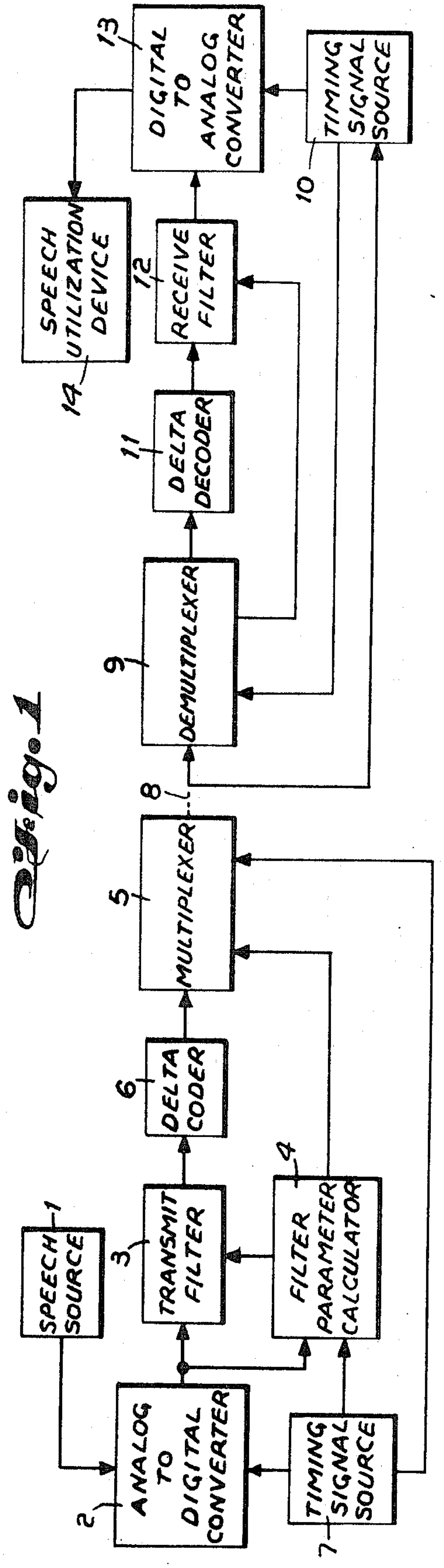
FIG. 1 is a simplified block diagram of the narrow band digital speech communications sytem in accordance with the principles of the present invention.

Referring to FIG. 1, there is illustrated therein a simplified block diagram of a 9,600 bps narrow band digital speech communication system in accordance with the principles of the present invention. The transmitter of the system of FIG. 1 includes a speech source 1, such as a microphone, coupled to the input of analog-to-digital converter 2 which samples the speech at a given rate and converts the amplitude of the samples to a binary representation thereof. The output of converter 2 is coupled to transmit filter 3 and filter parameter calculator 4 which operates on the binary representation of the speech samples to adapt or adjust the time varying transfer function of filter 3. The weighting parameter calculated by calculator 4, the redundant portion of the speech, is coupled to multiplexer 5 together with the delta modulated output of delta coder 6. Delta coder 6 functions to convert the output of filter 3, the residual portion of the speech, to delta modualtion. Timing signal source 7 is provided to control the time of operation of converter 2, calculator 4 and multiplexer 5 which is a time division multiplexer.

The coded output signal of time division multiplexer 5 is coupled through a propogation medium 8, which may be a telephone line or a radio propagation path, to the receiver. The receiver of the system of FIG. 1 includes a time division demultiplexer 9 to receive the time division multiplexed signal from propagation path 8 and operates under control of timing signal source 10 which drives its timing signals from the coded data input to demultiplexer 9 to provide the necessary synchronization between the transmitter and receiver and to appropriately separate the delta modulation from the input data for application modulation delta modualtion decoder 11 and to appropriately separate the code groups representing the weighting parameter calculated by calculator 4 from the input data for application to receive filter 12. Filter 12 adapt or adjust in accordance with the weighting so that at the output of filter 12 there is reconstructed the binary representation of each of the samples as produced in converter 2 of the transmitter. The output of filter 12 is coupled to a digital-to-analog converter 13 to reconstruct the speech of source 1 for application to speech utilization device 14, such as a speaker. Timing signal source 10 also provides the appropriate timing signal for the operation for converter 13 together with the timing signals necessary for the proper demultiplexing of the data train on propogation path 8.

The principle of operation of the system of FIG. 1 is based on a commonly used model of the means by which the acoustic speech is produced by the talker. This model consists of an excitation signal which drives a filter, such as filter 12, with a time varying transfer function representing the effect of the vocal tract. The purpose of transmitter filter 3 in the system of this invention is to appropriately reconstruct the excitation signal which can be more easily digitized by a low data rate delta coder, such as coder 6, than can the speech at the vocal tract output. The effect of the vocal tract is restored at the receiver by receive filter 12 with a transfer function approximating that of the vocal tract.

The nature of the excitation signal as well as the vocal tract transfer function varies with the particular speech sounds produced. In the case of voiced sounds, for instance, vowels, the excitation signal is a pulse train corresponding to the acoustic signal generated by the vocal cord vibration. The pulse train is approximately periodic with a repetition rate which varies between about 60 to 400 cps (cycle per second). This periodic excitation has a line spectrum where the line spacing is equal to the repetition rate or fundamental pitch. The waveshape of each pulse is roughly triangular which causes the broad shape of the line spectrum to fall off at higher frequencies.

The transfer function of the vocal tract for these sounds has a number of lightly damped poles. In other words, the transfer function has a number of relatively narrow band resonances. When excited by the input, these resonances give rise to damped oscillations in the output waveform. The vocal tract response also has a line spectrum since it is excited by a periodic input, but now the broad spectral shape follows the resonances in the transfer function.

Due to its oscillatory nature, the vocal tract response cannot be encoded accurately at low rates. However, the excitation function is relatively slowly varying and could be encoded accurately by a 6–8 kbps delta coder if it were available for processing. The 9,600 bps transmitter of the present invention reconstructs an approximate excitation function by measuring the short term spectrum of the vocal tract response. This corresponds to measuring the broad spectrum of the response determined by the vocal tract transfer function. The resonances are them removed by passing the signal through transmitter filter 3 with an inverse transfer function.

Other speech sounds such as fricative consonants are quite different in nature. The excitation signal is wide band noise and the vocal tract transfer function in general contains zeroes as well as poles. The transfer function shapes the spectrum of this noise which again can be determined approximately by a short term spectral measurement. After the transmit filter 3 the approximate excitation signal is noise like with a flat spectrum. Such a signal cannot be encoded with fidelity by a low data rate delta coder. However, since it is a noise signal, good fidelity is not necessary. Although the detailed waveform at the output of delta decoder 11 in the receiver is a poor approximation of the output signal of transmit filter 3, it is still noise-like with a flat spectrum. When this spectrum is shaped properly by receive filter 12, it has the same sound as the original signal to the listener.

The basic speech sounds have durations from about 50 to several hundred milliseconds (ms). At a 6–8 kilohertz (khz) sampling rate, this corresponds to hundreds and even thousands of samples over which the spectrum is fairly constant. During transitions from one speech sound to another, however, the change in spectrum can be fairly rapid. In the speech communication system of the present invention, the spectral measurement and the corresponding transmit and receive filter parameters are updated every 5ms.

Figure 2:
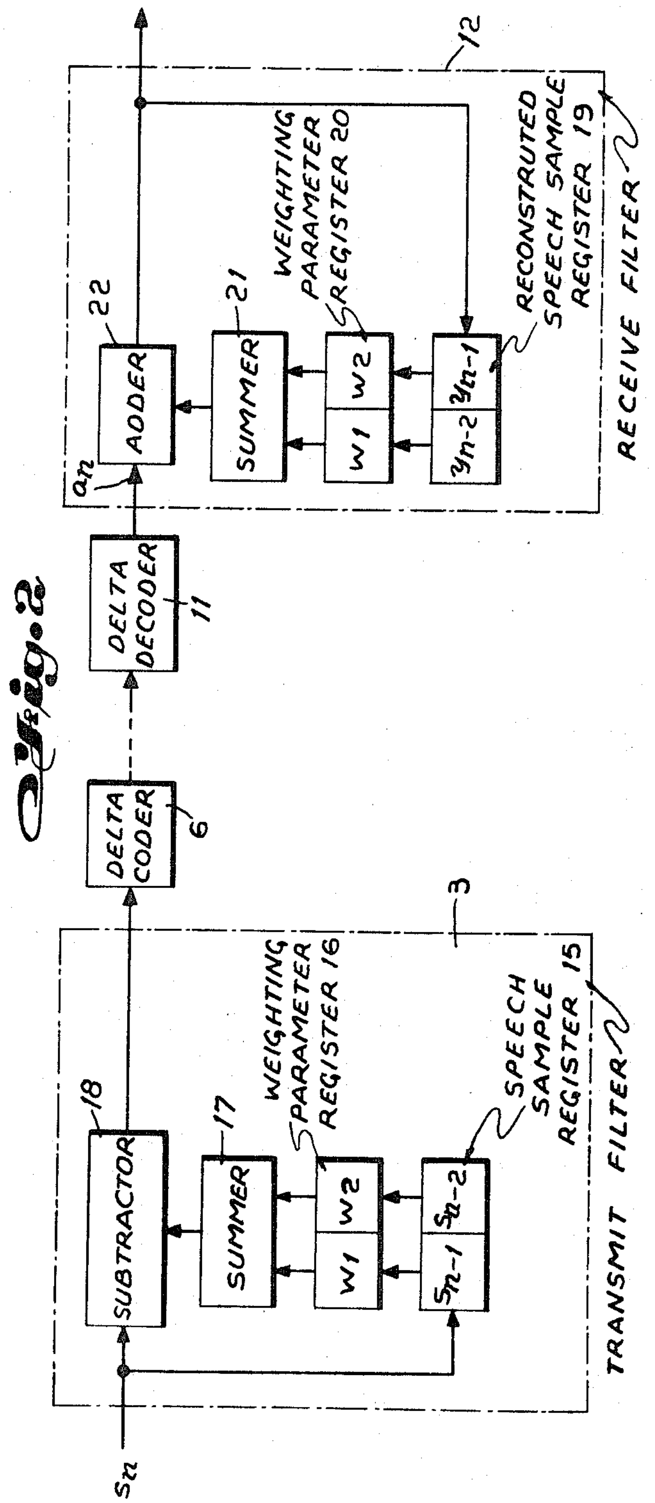
FIG. 2 is a simplified block diagram illustrating a simplified version of both the transmit filter and received filter of FIG. 1.

The actual form of transmit filter 3 and received filter 12 is illustrated in FIG. 2. Transmit filter 3 stores the binary representation of two previous samples of the input signal in register 15. The output of filter 3 is the difference between the present input sample and the weighted sum of the previous samples as provided by summing the weights of the two previous samples stored in register 16 in summer 17 with the output of summer 17 and the present input sample being subtracted in subtractor 18. These weights, $w_1$ and $w_2$, are the filter parameters which must be transmitted to the receiver in addition to the delta coded filter output at the output of coder 6. The transmit filter has a nonrecursive form which means that the filter output depends on the present and previous input samples but not on any of the previous output samples. As pointed out in that section hereinabove entitled "Background of the Invention" the Atal and Schroeder technique made use of the previous output samples to adapt the transmit filter.

Figure 3:
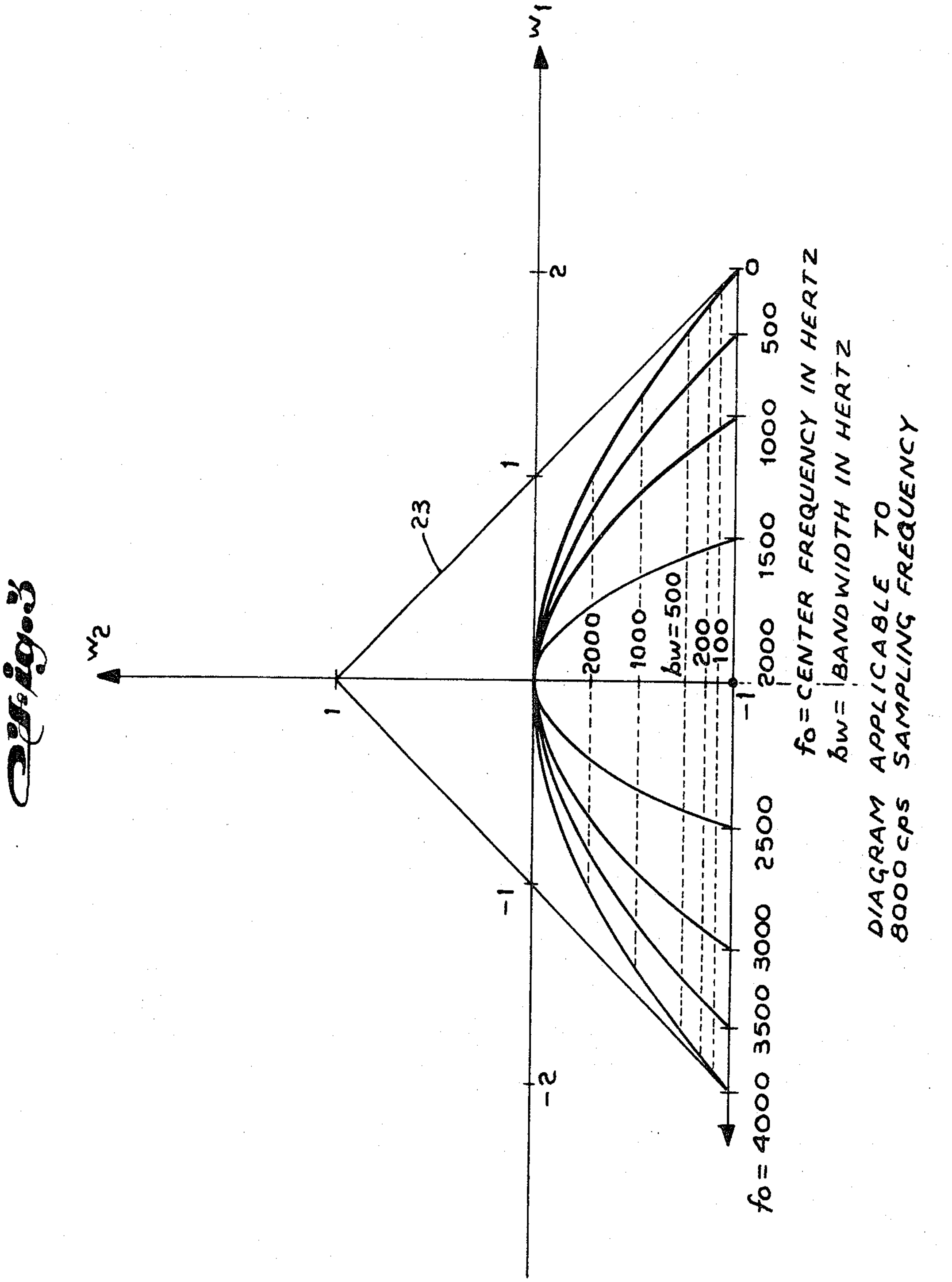
FIG. 3 is a curve useful in explaining the operation of the transmit and received filters of FIG. 2 illustrating the relationship between the weights $w_1$ and $w_2$ of the receive filter of FIG. 2 and the center, frequency and bandwidth of the single resonances of the receive filter of FIG. 2.

Receive filter 12 is exactly inverse to transmit filter 3. To achieve this requires the recursive or feedback form shown. As illustrated, receive filter 12 includes register 19 for the reconstructed immediately preceeding speech samples, register 20 to store the weighting parameter for these preceeding samples, summer 21 to provide the weighted sum of the previous samples and adder 22 to add the output of summer 21 to the output of delta decoder 11. Ideally, the response of receive filter 12 should closely approximate the short term spectrum of the original speech. Actually, it is limited to a response with a single resonance because it only has two parameters. The relation between the center frequency and bandwidth of this resonance and the weights $w_1$ and $w_2$ are shown in FIG. 3. Transmit filter 3 is stable for any pair of weights but, because of its recursive form, receive 12 is only stable if the weights fall inside the triangle 23.

If $w_2$ is more negative than $-w_1{}^2 14$, receive filter 12 will exhibit a resonance with center frequency and bandwidth as shown in FIG. 3. The bandwidth becomes less and less as $w_2$ approaches $-1$. In this case, filter 12 is stable as long as $w_2$ is more positive than $-1$. If $w_2$ is more positive than $-w_1{}^2/4$, the response corresponds to a cascade of two low pass filters, two high pass filters or a low pass filter and a high pass filter.

As mentioned above, transmit and receive filters 3 and 12 are inverse. If receive filter 12 enhances a particular frequency by, say 10db, the transmit filter 3 will reduce that frequency by 10db. More elaborate filters can exhibit several resonances, a four tap filter can have two resonances, a six tap filter can have three resonances and so forth. However, tests have shown that most speech sounds can be well approximated by a single resonance and little advantage is realized by the more complex fiters.

The method of adapting or adjusting the filter parameters to the input signal is essentially the same as that described in the above cited Atal and Schroeder article. Instead of measuring the short term spectrum, a short-term "correlation function" is computed from the input samples. The best fit of the filters response to the input spectrum is obtained by minimizing the mean square value of transmit filter 3 output signal with respect to each of the weights. This results in a pair of simultaneous equations which can be solved for the optimum weights. The equations for the optimum weights involved several short-term correlation coefficients as shown as shown in TABLE I below:

TABLE I $$d_n = s_n - w_1 s_{n-1} - w_2 s_{n-2}$$
$$D = E\, d_n{}^2$$

Choose $w_k$ to minimize $D$:

$$\delta D/\delta w_k = 2Ed_n \cdot (\delta\, dn/\delta w_k) = -2\, Ed_n\, s_{n-k} = 0$$
$$(E\, s_{n-1}s_{n-k})\, w_1 + (E\, s_{n-2}s_{n-k})\, w_2 = Es_n\, s_{n-k}\ ,\ k = 1{,}2$$

Define $$r_{ii} = Es_{n-i}\, s_{n-1}\ ,\ r_i = Es_n s_{n-i}$$

then $$r_{11}w_1 + r_{12}\, w_2 = r_1$$
$$r_{12}w_1 + r_{22}\, w_2 = r_2\ ,$$

where $$r_{21} = r_{12}$$

Let $$\text{den} = r_{11}r_{22} - r_{12}{}^2$$

then $$w_1 = (r_1 r_{22} - r_2\, r_{12})/\text{den}$$
$$w_2 = (r_2 r_{11} - r_1 r_{12})/\text{den}$$

The short-term time average is denoted by the linear operator E. The resulting equations for $w_1$ and $w_2$ involve the coefficients $r_1$, $r_2$, $r_{11}$, $r_{12}$ and $r_{22}$. If the input signal were a stationary random process and E were the ensemble average, $r_1$ would be the usual covariance function and we would have the simplification such as $r_{22} = r_{11}$ and $r_{12} = r_1$. When the time varying signal, such as speech, such simplifactions are no longer correct.

The time average can be chosen in different ways. The Atal and Schroeder technique used an average of a finite (5ms) block of data stored in a buffer. The weights which are computed in this way are then optimum for the period of time that this block of data is passing through the transmit and receive filters. In accordance with the present invention there has been chosen an exponential time average as follows:

$$y_n = ex_n + (1\_e)\, y_{n-1}$$
$$= y_{n-1} + e(x_n - y_{n-1})$$

This technique has the advantage that it is not necessary to store any data with the exception of the two previous input samples stored in transmit filter 3. It should be noted that the weights computed with the exponential average are optimum in the sense that D would be a minimum at the time the weights are computed if those weights had been in use all along. The technique of the present invention relies on the fact that the optimum weights change slowly with time so that when weights are computed, they are used for the next 5ms time average instead of using them with past data. As indicated in the equations immediately above the data to be averaged is equal to $x_n$ and the updated equation is equal to $y_n$. The time constant of the equation is determined by the positive constant $e$. If $e$ is an integral power of ½, the mechanization is particulary simple. For example, if $e = 2^{-5}$, $y_{n-1}$ is subtracted from $s_n$, the result is then shifted five places to the right and that result is added to $y_{n-1}$, giving $y_n$.

Each of the coefficients is calculated in this manner, for instance, $$r_i\ (\text{new}) = es_n\, s_{n-1} + (1-e)\, r_i\ (\text{old})$$

$$r_{ii}\ (\text{new}) = es_{n-1}\, s_{n-i} - (1-e)\, r_{ii}\ (\text{old})$$

However, only $r_1$, $r_2$ and $r_{11}$ must actually be calculated since it turns out that $$r_{12}\ (\text{new}) = r_1\ (\text{old})$$

$$r_{22}\ (\text{new}) = r_{11}\ (\text{old})$$

The sequence of calculations which must be performed by the system of the present invention every sample are summarized in Table II and those performed every 5ms are summarized in Table III.

TABLE II

I. Transmit Calculations
- A. Correlation Update
  - $r_{12} = r_1$
  - $r_{22} = r_{11}$
  - $r_1 = e_6\ (s_0 s_1 = r_1) + r_1$
  - $r_2 = e_6\ (s_0\, s_2 = r_2) + r_2$
  - $r_{11} = e_6\ (s_1 s_1 - r_{11}) + r_{11}$
- B. Transmit Filter
  - $d_0 = s_0 - w_1 s_1 - w_2 s_2$
  - $s_2 = s_1$
  - $s_1 = s_0$
- C. Coder Level Update
  - $q^{n+1} = q^n + 2^{-4} q^n$ if $B_0{}^n = B_0{}^{n-1} = B_0{}^{n-2}$, where $B_0 = \Delta$—mod Output Data
  - otherwise $q^{n+1} = q^n - 2^{-6}$
- D. Delta Coding
  - $w_0 = e_3\ (s_0 - a_0 - w_0) + w_0$
  - $b_0 = 1$, if $w_0 \geqq 0$
  - $= 0$, if $w_0 < 0$
  - $a_0 = q$, if $b_0 = 1$
  - $= -q$, if $b_0 = 0$ II. Receive Calculations
- $a_0' = q'$, if $b'_0 = 1$
- $= -q'$, if $b'_0 = 0$
- $y_0 = a_0' + w_1\ 'y_1 + w_2\ 'y_2$
- $y_2 = y_1$
- $y_1 = y_0$

TABLE III

I. TRANSMIT CALCULATIONS
- A. Weight Calculations
  - $\text{den} = r_{11} r_{22} - r_{12} r_{12}$
  - $w_1 = (r_1\, r_{22} - r_2\, r_{12})/\text{den}$
  - $w_2 = (r_{11}\, r_2 - r_{12}\, r_1)/\text{den}$
- B. Stability Check
  - $w_2 > -1$
  - $u_1 = w_1 + w_2 < 1$
  - $u_2 = w_1 - w_2 > -1$
- C. Coder Level Update
  - $q = q_1$ II. Receive Calculations
- A. Stability Check
  - $w_2' > -1$
  - $u_1' = w_1' + w_2' < 1$
  - $u_2' = w_1' - w_2' > -1$ In the above tables II and II, $e_6 = 2^{-6}$ and corresponds to a time constant of approximately 5ms. Also, $e_3 = 2^{-3}$, for a time constant of approximately 1ms. The binary signal transmitted is denoted $b_n$ whereas its corresponding decoded value with proper level $q$ is denoted $a_n$. The primes on the values used by the receiver indicate that these values are received from the distant transmitter rather than the local arrangement.

Figure 4A:
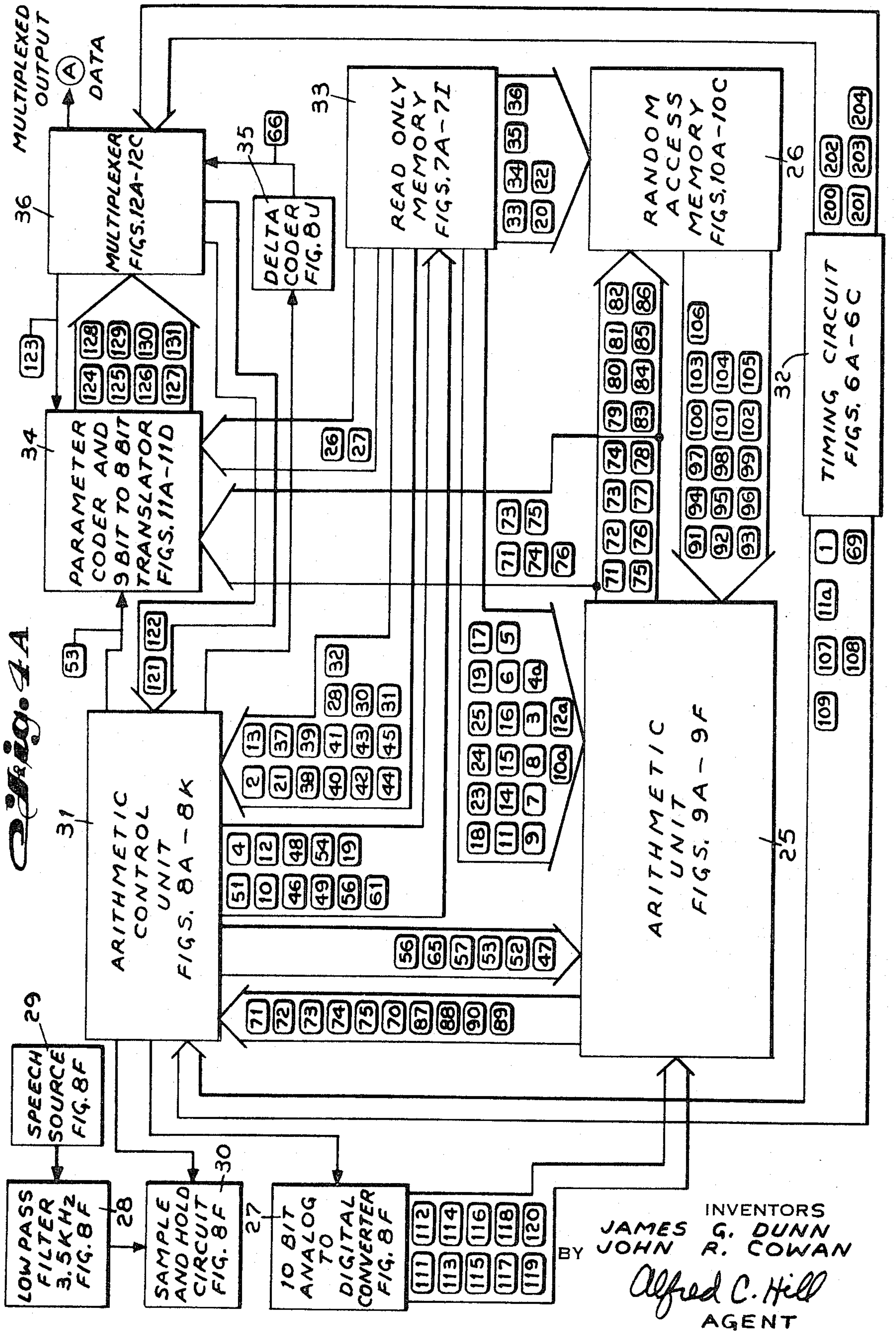
FIGS. 4A and 4B when organized as shown in FIG. 4C illustrates a general overall block diagram of one embodiment of the narrow band digital speech communication system in accordance with the principles of the present invention.
Figures 4B, 4C:
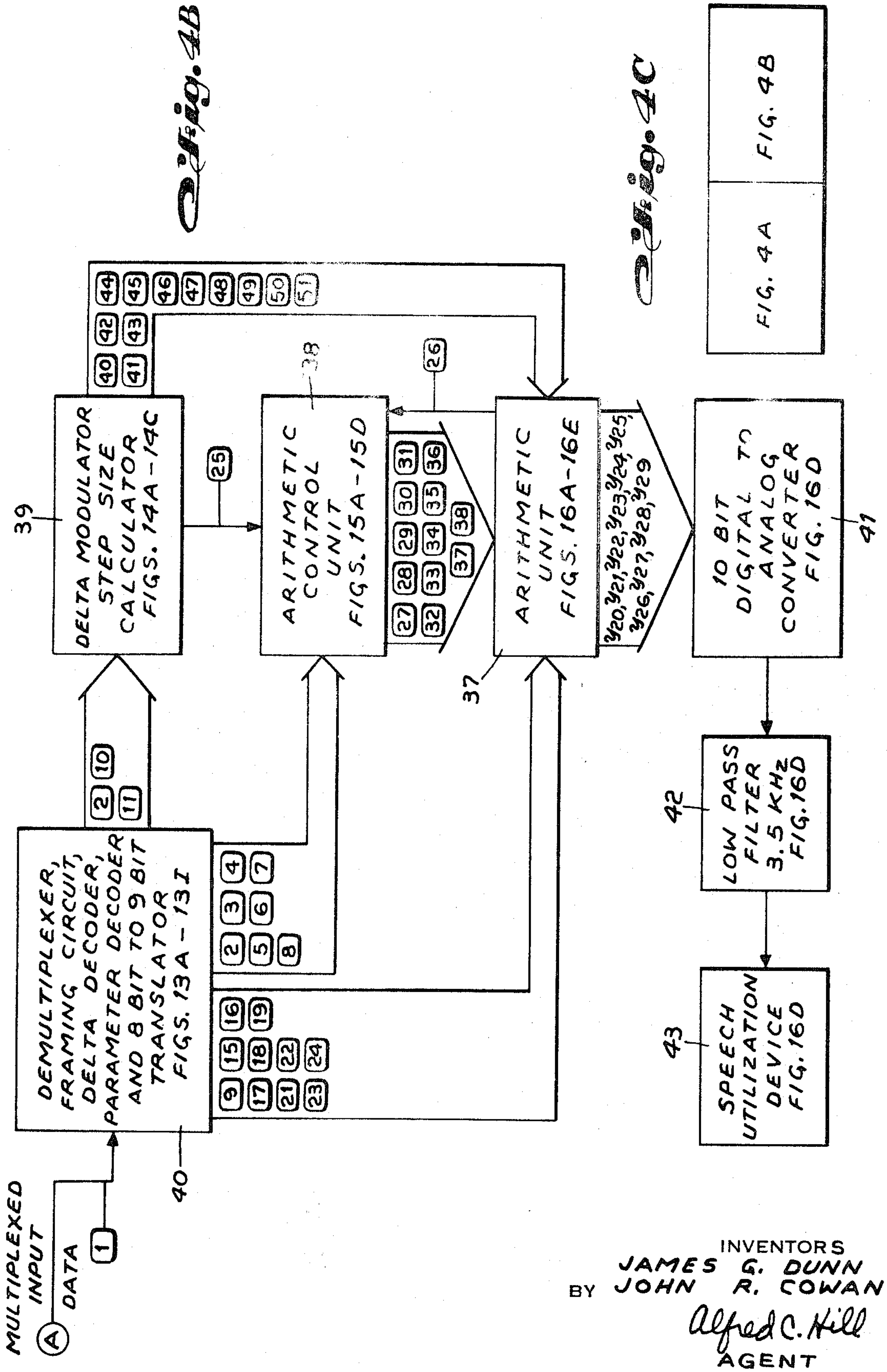

Referring to FIGS. 4A and 4B, organized as shown in FIG. 4C, there is disclosed one embodiment of the narrow band digital speech communication system in accordance with the present invention. It will be noted that intercommunications between the various blocks are labeled with circled numbers. A conductor with a single circled number indicates a single conductor while a broad arrow containing several cited numbers therein indicate plural conductors. The circled numbers correspond to similarly numbered conductor in the logic diagrams of FIGS. 6 through 16. FIGS. 4A and 4B serve not only the purpose of illustrating the overall system in accordance with the principles of this invention, but also indicates the interconnections between the logic circuitry of FIGS. 6 through 16.

The system as illustrated in FIGS. 4A and 4B is an actual reduction to practice of the narrow band digital speech communication system of the present invention with the transmitter being shown in FIGS. 4A and the receiver being shown in FIG. 4B with an intercommunication between these components being provided by the conductor labeled with a circled A.

Referring now with greater particularlity to the transmitter of FIG. 4A it has been determined that the most efficient way of performing all the functions required in the system was to organize the transmitter logic along the lines of a special-purpose computer. One all-purpose arithmetic unit 25 performs all the necessary calculations sequentially. A random access memory 26 is used to store parameters, data samples, and the intermediate and final results of calculations.

A 10 bit analog-to-digital converter 27 is used as the input interface device for entering the speech data samples into the transmitter at a 8khz rate. A 3.5 khz low-pass filter 28 coupled to speech source 29 is used to prevent foldover distortion and a sample and hold circuit 30 is used before converter 27 to maintain the sampled vltage at a constant level while the conversion takes place.

Arithmetic unit 25 under control of arithmetic control unit 31, timing circuit 32 and read only memory 33 performs addition, subtraction, multiplications, division and shifting operation and also transfers data between memory 26 and other registers. Arithmetic unit 25 operates at a clock rate of 9.984 mhz (megahertz) and bit parallel-word serial, two's complement arithmetic is used throughout.

Random access memory 26 is a 16 word bipolar integrated circuit and has 16 bits per word. It is composed of 4 dual-in-line packages each of which has 16 words of four bits each. The read or write time is typically 50 nanoseconds (ns). Memory 26 stores the last three speech samples ($s_0$, $s_1$, $s_2$), the correlation coefficients ($r_{11}, r_{22}, r_1, r_{12}, r_2$), the digital filter weights ($w_1$ and $w_2$), the delta modulation residual output ($s_0$), the delta coder step size ($q$), and provides two locations ($T_1$ and $T_2$) for temporarily storing the intermediate results of calculations by arithmetic unit 25.

Read only memory 33 is used to store a program of instructions which will cause the arithmetic unit 25 to perform all the required calculations. The first four bits of each instruction determine the operation to be performed, for instance, add, multiply, load, etc., and the last four bits determine the address of the operand in the random access memory 26. The operations that are performed are listed in Table IV.

TABLE IV

Input Speech Samples:

$s_1^{n+1} = s_0^n\, d^{-1}$ $s_2^{n+1} = s_1^n\, d^{-1}$

Correlation Coefficents:

$r_{11}^{n+1} = r_{11}^n + (s_1 s_1 - r_{11}^n)\, 2^{-6}$ $r_{01}^{n+1} = r_{01}^n + (s_0 s_1 - r_{01}^n)\, 2^{-6}$ $r_{02}^{n+1} = r_{02}^n + (s_0 s_2 - r_{02}^n)\, 2^{-6}$ $r_{22}^{n+1} = r_{11}^n d^{-1}$ $r_{12}^{n+1} = r_{01}^n\, d^{-1}$

Filter Weights:

$w_1 = (r_{01}r_{22} - r_{12}r_{02})/(r_{11}r_{22} - r_{12}r_{12})$ $w_2 = (r_{11}r_{02} - r_{01}r_{12})/(r_{11}r_{22} - r_{12}r_{12})$

Residual (Filter Output):

$A^n = s_0 - w_1 s_1 - w_2 s_2$

Coder Level:

$q^{n+1} = q^n + 2^{-4} q^n$ if $B_o = B_0^{n-1} = B_0^{n-2}$ where $B_o$ =Δ–Mod Output Data otherwise $q^{n+1} = q^n - 2^{-6}$ Arithmetic control unit 31 generates the timing signals which are necessary to control the operation of arithmetic unit 25, random access number 26, other registers and other logic circuitry so that instructions indicated by the read only memory program can be performed. Control unit 31 is implemented with standard integrated circuits using conventional logic and counters. Additional read only memories could be used to implement this logic and thereby reduce the package count. A minimum of three clock pulses are allowed for each operation. At the 9.984 mhz clock rate, this is 300ns. This time is required because of the worst case propagation delays through the transmitter logic. During the multiplication and division operations, each addition or subtraction is allowed two clock pulses (200ns) and each shift is allowed one clock pulse (100ns).

The digital filter weights $w_1$ and $w_2$ are calculated as five bit and four bit words, respectively. However, there is redundancy in the coding and before the weighting parameters are transmitted to the output of the weighting parameter coder and 9 bit to 8 bit translator 34 the redundancy is eliminated by replacing the nine bit code for $w_1$ and $w_2$ with an eight bit code. The receiver of FIG. 4B expands the eight bits back to the original nine bit representation of $w_1$ and $w_2$. Translator 34 detects the combinations of values for $w_1$ and $w_2$ which will cause instability in the recursive digital filter in the receiver of FIG. 4B. Normally, the range of values for $w_1$ is $-2<w_1<2$ and for $w_2$ is $-1<w_2<1$. Conditions for instability occur when $/w_1/+w_2 \geq 1$ or when $w_2 \leq -1$. The weighting parameter translator 34 detects the condition $/w_1/+w_2=+1$ and reduce $/w_1/$ by 0.125. When $w_1+w_2>1$, it forces values value of $w_1 = w_2 = 0$. It also limits the value of $w_2$ to $w_2>-1$.

Since both the residual delta coder signal as produced by delta coder 35 and the coded representation of weights $w_1$ and $w_2$ must be transmitted under the same channel, they must be multiplexed in multiplexer 36 and a frame sync signal must be inserted before transmission. Each frame is 5ms long and is comprised of 40 delta coder bits and 8 filter parameter bits. An eight bit shift register buffer is used in the multiplexer 36 to store delta coder bits while the weights are being transmitted. Frame sync bits are not actually inserted, but advantage is taken of a characteristic of the eight bit weighting parameter code to provide a recognizable frame sync signal. This characteristic is that $/w_1/+w_2 \neq +1$. The weighting parameter codes produced in translator 34 insures that this condition ($/w_1/+w_2 \neq +1$) does not exist. The random nature of the delta coder signal prevents synchronization on any eight bits other than the weighting parameters.

Turning now to the receiver as shown in FIG. 4B, it should be noted that the receiver has a lesser number of calculations to perform and, therefore, the computer-like organization of the transmitter is not required. Arithmetic functions are performed in arithmetic unit 37 using simple control logic eliminating the necessity of random access memories and read only memories. The arithmetic unit operates under control of the arithmetic control unit 38 and the delta modulation step size calculator 39. During each sampling interval (125 microseconds) the receiver must make the calculation indicated in the following table.

TABLE V

Coder Level $q^{n+1} = q^n + 2^{-4}\, q^n$ if $B_0^n = B_0^{n-1} = B_0^{n-2}$ otherwise $q^{n+1} = q^n - 2^{-6}\, q^n$

[BO is the Received Delta Mod Data]

Receive Filter $y_0 = B_0^n\, q^n + w_1 y_1 + w_2 y_2$ $y_1 = y_0 d^{-1}$ $y_2 = y_1\, d^{-1}$ The receiver receives the multiplexed input data on the line identified by A circled or 1 circled. This input is applied to circuitry 40 which includes the demultiplexer, the framing circuit, the delta modulator, parameter decoder and eight bit to nine bit translator. In circuit 40, the receiver recovers clock signal from the received delta coder data signal by using a digital phase locked loop. The transistions of the data signal are compared in time with the transistions of a local clock which is derived from an oscillator and binary divider. The binary divider is varied by a phase comparison circuit so as to bring the clock into the correct phase relationship with the data so that the data can be correctly retimed. The receiver acquires frame sync by assuming that an eight bit sequence of data bits is a weighting parameter code and detects the absence of the condition $/w_1/+w_2=+1$. This assumption will be valid only if the absence of the condition exists over a lon g period of time. When $/w_1/+w_2=+1$, the locally generated frame is made to slip by one bit with respect to the received data and another eight bit sequence is tested as to whether it is the weighting parameter code and whether frame sync has been acquired.

When frame has been acquired, the demultiplexer of circuit 40 separates the coded weighting parameters $w_1$ and $w_2$ from delta coder data bits. The eight bit code for $w_1$ and $w_2$ is then expanded back to its original nine bits (five bits for $w_1$ and four bits for $w_2$) in the weighting parameter decoder and translator circuit contained in circuit 40. The delta coder data bits are applied to an eights bit shift register buffer which acts as a data smoothing circuit. This circuit reconstructs the original 8kps data stream. The data is applied to logic in calculator 39 which calculates the delta coder step size.

The calculations for the receive filter are carried out by arithmetic unit 37 and its control logic found in control unit 38. The arithmetic unit 37 performs the following numbers and types of operations.

2 Additions
1 Subtraction
2 Multiplications
10 Shift Rights

The arithmetic operation in unit 37 is carried out at a clock rate of 1.5312 mhz and bit-parallel word-serial, two's complement arithmetic is used. The output of the arithmetic unit 37 is a 10 bit word representing the reconstructed speech sample which is applied to 10 bit digital-to-analog converter 41. The output of converter 41 is passed through a 3.5khz low-pass filter 42 to change the samples of speech to the original speech for use in speech utilization device 43.

The narrow band digital speech communication system illustrated in FIGS. 4A and 4B, described immediately above, has been actually reduced to practice to providing a 9.6 khz speech encoding system. The logic diagrams for the transmitter of FIG. 4A of this reduction to practice are illustrated in FIGS. 6–12 and the logic diagrams for the receiver of FIG. 4B of this reduction to practice are illustrated in FIGS. 13–16.

All of the processing functions are performed digitally using TTL (transistor-transistor logic) integrated circuits with the exception of the interface between the analog and digital representations of speech as provided by converters 27 and 42. Commercially available analog-to-digital and digital-to-analog converters provide the interface at the transmitter input and receiver output.

As can be seen from FIG. 4A and the logic circuitry of FIGS. 6 through 12 the transmitter is more complex than the receiver as shown in FIG. 4B and the associated logic diagrams of FIGS. 13–16. This is because transmitter must make many more calculations as illustrated in Table IV above.

It should be noted that in the major blocks of the logic diagrams of FIGS. 6 through 16 there is included in each of the blocks a plurality of numbers and letters enclosed within parenthesis. The prefix letter or letters identify the manufacturer and the following letters and numbers identified the specific integrated circuit component employed in the reduction to practice. The key to the manufacturer's name and the handbooks, bulletins or catalogs employed to select the various integrated circuit components are outlined as follows:

A. Texas Instruments, Inc. identified in the logic diagram by the prefix letters SN
  a. Catalog CC201 dated Aug. 1, 1969
  b. Catalog CC301 dated Mar. 15, 1970

B. Signetics Corp. identified in the logic diagrams by a prefix letter N
  a. "MSI Specification Handbook, Series 8000 Designer Choice Logic," DCL Volume II, September 1969
  b. "DCL Specification Handbook", Volume I Logic Elements dated 1969.

C. Varadyne Systems, a Division of Varadyne Inc. formally known as DATEL identified in the logic diagrams by the prefix letters DATEL
  a. Digital-to-Analog Converter — Bulletin Number 52157010K, dated Aug. 15, 1970.
  b. Analog-to-Digital Converter — Bulletin Number 72157010K dated Aug. 15, 1970.

D. National Semiconductors Corp. identified in the logic diagrams by the prefix letters DM
  a. Bulletin DM7570-Shift Register, dated June 1969.
  b. Bulletin DM8570-Shift Register, dated June 1969.

E. Raytheon Co., Semiconductor Operation identified in the logic diagrams by the prefix letters RR.
  a. Bulletin "64 Bit Random Access Memory RR6100," dated January 1970.

Figure 5:
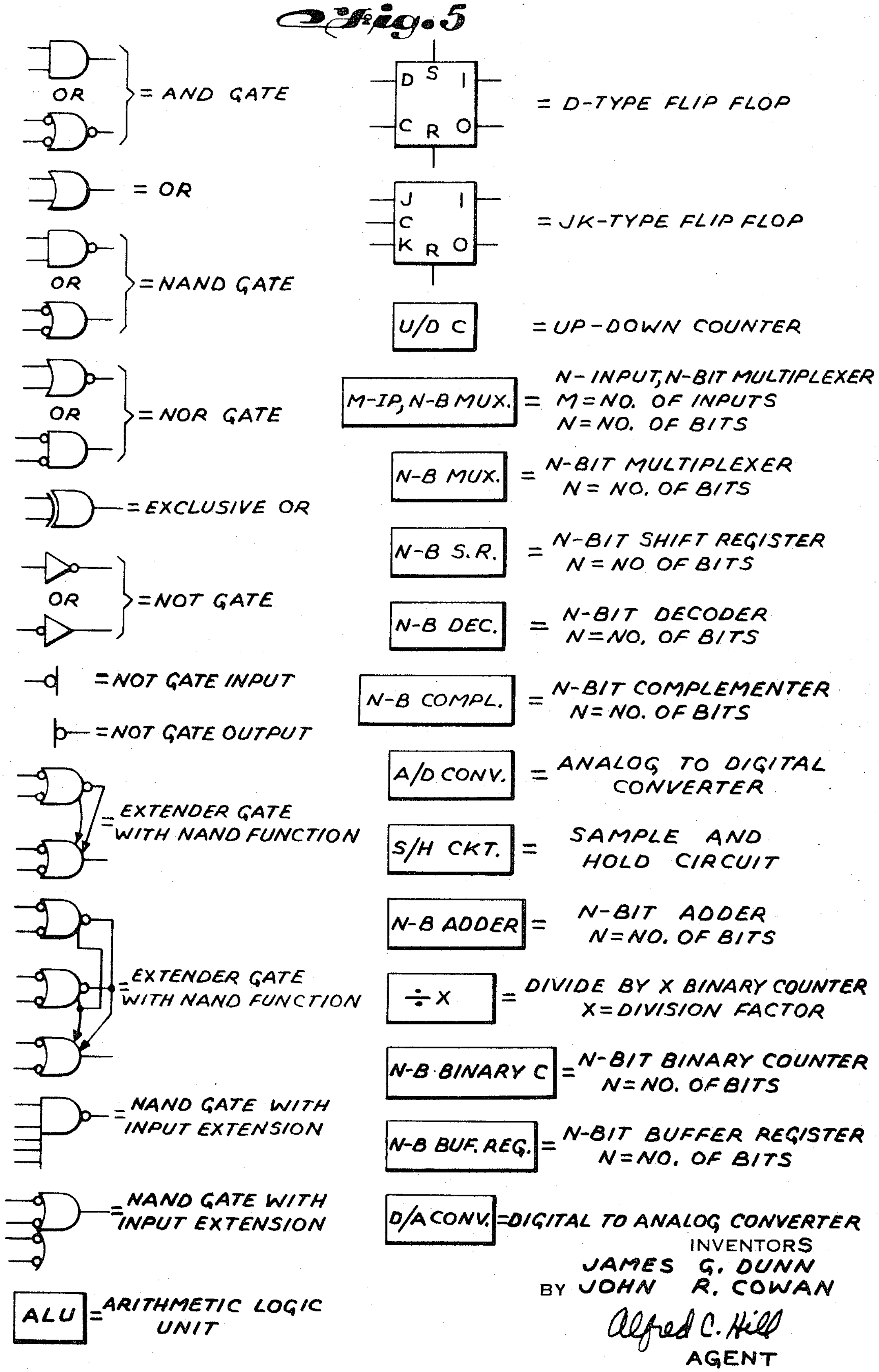
FIG. 5 is a key to the logic symbols and integrated circuit board employed in the logic diagrams of FIGS. 6-16.
Figure 6A:
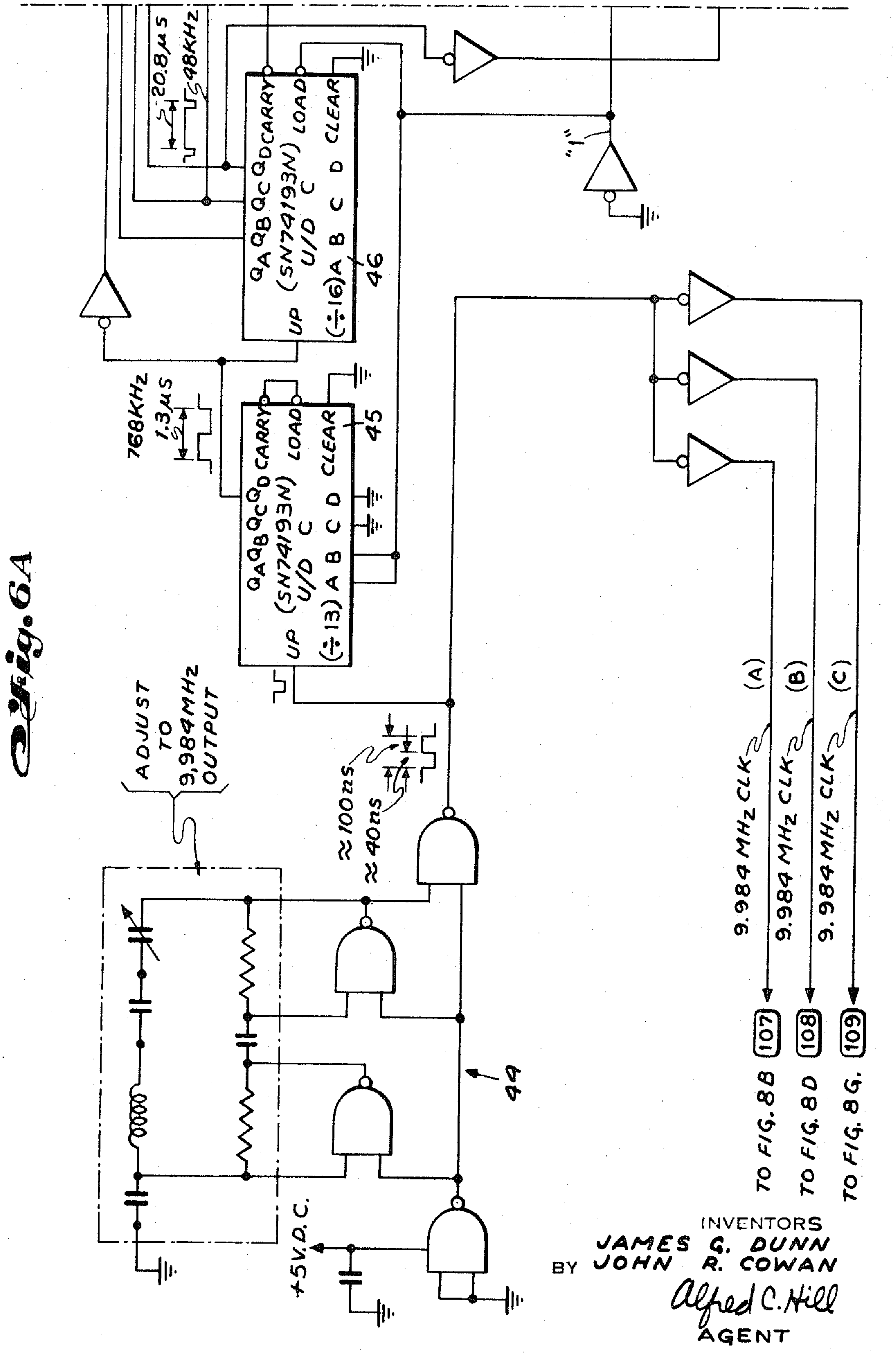
FIGS. 6A and 6B when organized as shown in FIG. 6C illustrates one embodiment of the logic diagram of the timing circuit of FIG. 4A.
Figures 6B, 6C:
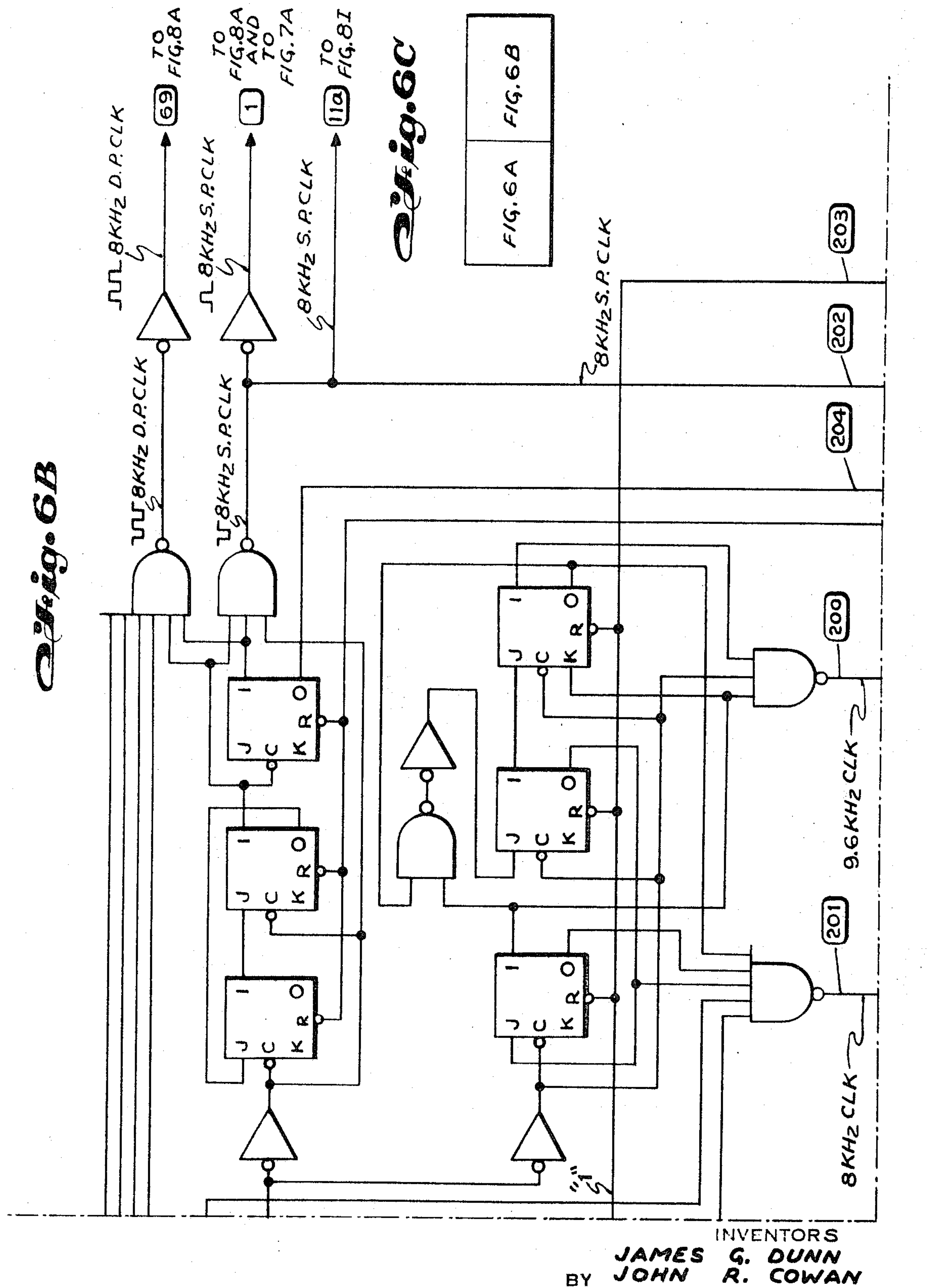

Employing the above list of catalogs, handbooks and bulletins it will be possible to reconstruct the logic diagrams of FIGS. 6 through 16. The logic gate symbols in the logic diagrams are illustrated and identified in FIG. 5 and may be selected from the appropriate one of the above identified handbooks, catalogs and bulletins or other available logic gate handbooks as may best suit the situation. It should also be noted that the major blocks do not have their legends completely spelled out. Rather an abbreviated form of legend is employed with the abbreviation included in blocks and the full identification thereof being found in FIG. 5. To assist in understanding the abbreviations of various signals and logic components together with their function and a table of mnemonic set forth in the following table:

TABLE VI

| MNEMONIC | FUNCTION |
|---|---|
| "1" or 1 | Logic 1 |
| "0" or 0 | Logic 0 |
| ACC | Accumulator |
| ACC CLEAR | Clear Accumulator |
| ACC SHIFT | Shift Accumulator |
| ACC LOAD | Load Accumulator |
| ACC CLK | Accumulator Clock |
| ACC & MQ REG. CLK | Accumulator and Multiplier - Quotient Register Clock |
| AD | Analog-Digital Converter Output Bits |
| ADD | Add |
| ADD -DI | Add During Division Operation |
| ADD -D2 | Add During Division to Test Dividend Size |
| ADD-M | Add During Multiplication Operation |
| ADD OR SUBT PERΔ-MOD | Add or Subtract Per Delta Modulator Output |
| ADD-ROM | Add-Read Only Memory |
| ADD-S | Add Per Delta Modulator Output |
| ALU | Arithmetic Logic Unit |
| AnFF | Delta Modulation Data From Flip Flop AnFF |
| 8KHZ D.P. CLK | 8KHZ Double Pulse Clock |
| 8KHZ S.P. CLK | 8KHZ Single Pulse Clock |
| 9.6KHZ CLK | 9.6KHZ Clock |
| 9.984 MHZ CLK(A) | 9.984 MHZ Clock (A) |
| 9.984 MHZ CLK (B) | 9.984 MHZ Clock (B) |
| 9.984 MHZ CLK (C) | 9.984 MHZ Clock (C) |
| CAC | Clear Accumulator |
| CLK INH | Clock Inhibit |
| CMQ | Clear Multiplier – Quotient Register |

| | |
|---|---|
| COMPL | Complement |
| DATA COMPL. | Complement Data |
| Δ-MOD | Delta Modulation |
| Δ-MOD DATA | Delta Modulation Data |
| DEMUX | Demultiplexed |
| DIV (A) | Divide (A) |
| DIV (B) | Divide (B) |
| HI | Logical High |
| LACC | Load Accumulator |
| LAD | Load Accumulator from A/D Converter |
| LCN | Load Accumulator from Constant |
| LEFT SHIFT -D | Left Shift During Division Operation |
| LMQ | Load Accumulator from Multiplier-Quotient Register |
| LRAM | Load Accumulator from Random Access Memory |
| LSB | Least Significant Bit |
| MQ | Multiplier-Quotient Register |
| MQ-LOAD | Load Multiplier-Quotient Register |
| MQLSB | Multiplier-Quotient Register Least Significant Bit |
| MQ-SHIFT | Shift Multiplier-Quotient Register |
| MQ-$S_0$ | Store Accumulator Multiplier-Quotient Register |
| MSB | Most Significant Bit |
| MULT | Multiply |
| MUX $S_1$ | Multiplex input Selection Control Signal |
| MUX $S_0$ | Multiplex input Selection Control Signal |
| P.B. | Pushbutton |
| PROG. SHIFTS | Programmed Shifts |
| RAM | Random Access Memory |
| RM | Random Access Memory Output Bits |
| $RMUXS_1$ | Add $Y_2$ to Accumulator |
| $RMUXS_0$ | Add $Y_1$ to Accumulator |
| ROM | Read Only Memory |
| ROM-C-SS-FF | Read Only Memory Counter Start-Stop Flip Flop |
| ROM PRO. COUNT. CLK | Read Only Memory Program Counter Clock |
| SAFF | Store Accumulator in An FF |
| SAM | Shift Accumulator M-Time |
| SAR 6 | Shift Right 6-Times |
| SHIFT LEFT -D | Shift Left During Division |
| SHIFT LEFT -S | Shift Left During Programmed Shifts |
| SHIFT RIGHT -S | Shift Right During Programmed Shifts |
| SHIFT PERΔ-MOD | Shift Per Delta Modulation |
| SHL | Shift Left |
| SHRM | Shift Right M-Times |
| SHR | Shift Right |
| SIR2 | Shift Accumulator Twice If Required |
| SL2X | Shift Left Twice |
| SMQ | Store in Multiplier-Quotient Register |
| S.R. | Shift Register |
| SRAM | Store Accumulator in Random Access Memory |
| SR2X | Shift Right Twice |
| SUBT | Subtract |
| SUBT-D1 | Subtract During Division Operation |
| SUBT-D2 | Subtract During Division to Test Dividend Size |
| SUBT-M | Subtract During Mult. Operation |
| SUBT-ROM | Subtract — Read Only Memory |
| SUBT-S | Subtract Per Delta Modulator Output |
| SWR1 | Store Accumulator in $w_1$ Register |
| SWR2 | Store Accumulator in $w_2$ Register |
| TMGR | Test Magnitude of $r_{11}$ |

Turning now to FIGS. 6 through 12, there is disclosed therein the logic diagram of the reduction to practice described hereinabove with respect to the transmitter of FIG. 4A. The description of FIG. 4A sets forth the major operation of each of the blocks thereof. The following description will be merely for the purpose of highlighting each of these blocks with respect to the logic diagrams themselves it being felt that the logic diagrams taken with the description of FIG. 4A are self explanatory. The timing signals from timing circuit 32 are generated as shown in FIGS. 6A and 6B when laid out according to FIG. 6C and includes as a major component thereof oscillator 44 together with up-down counters 45 and 46 together with other binary dividing circuits to produce the clock signals necessary in the operation of the transmitter. It should be noted that up-down counter 45 has to function to divide the output of oscillator 44 by a factor of 13 while the up-down counter 46 divides the output of up-down counter 45 by a factor of 16.

Figure 7A:
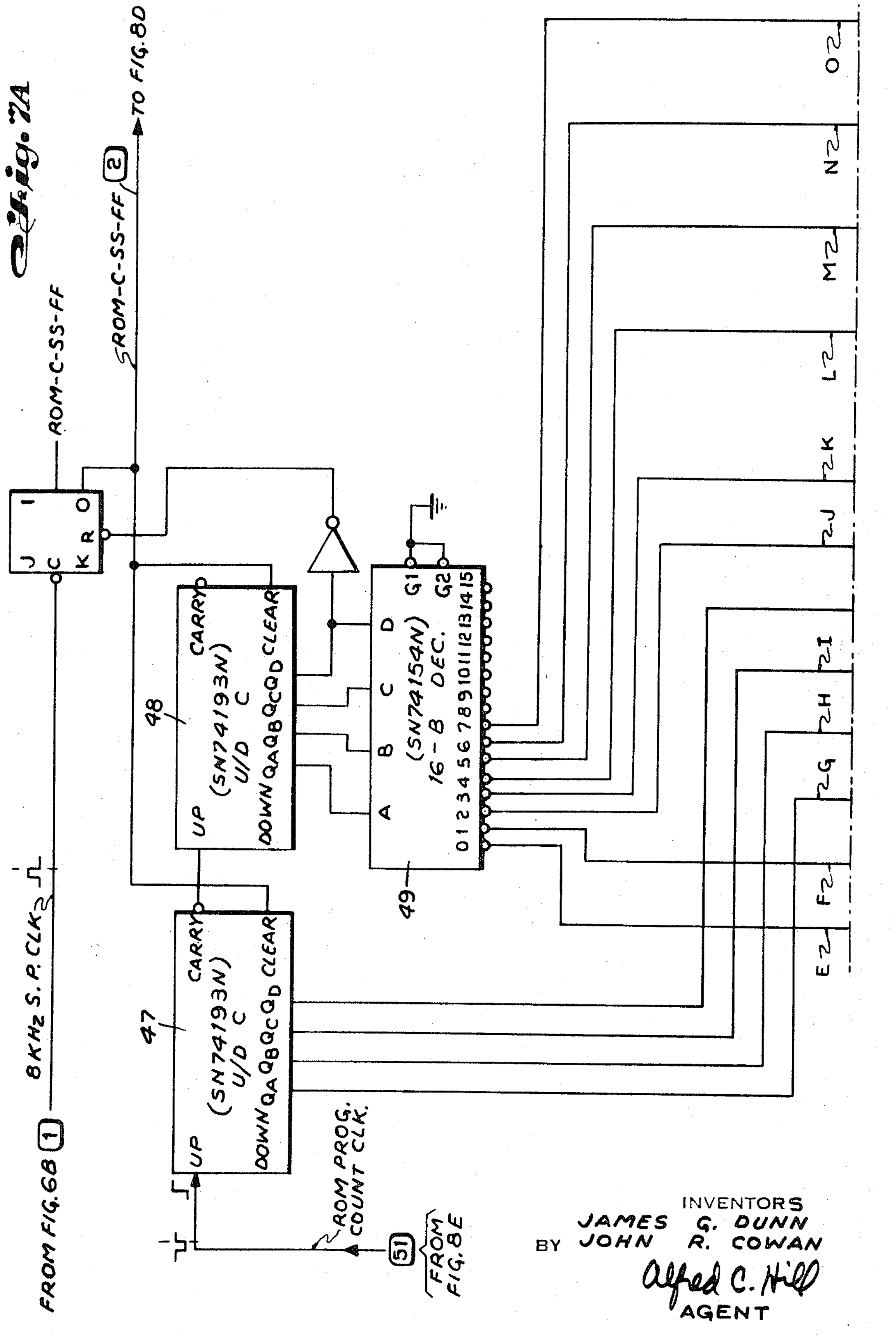
FIGS. 7A – 7H when organized as shown in 7I illustrates one embodiment of the logic diagram of the read only instruction memory of FIG. 4A.
Figure 7B:
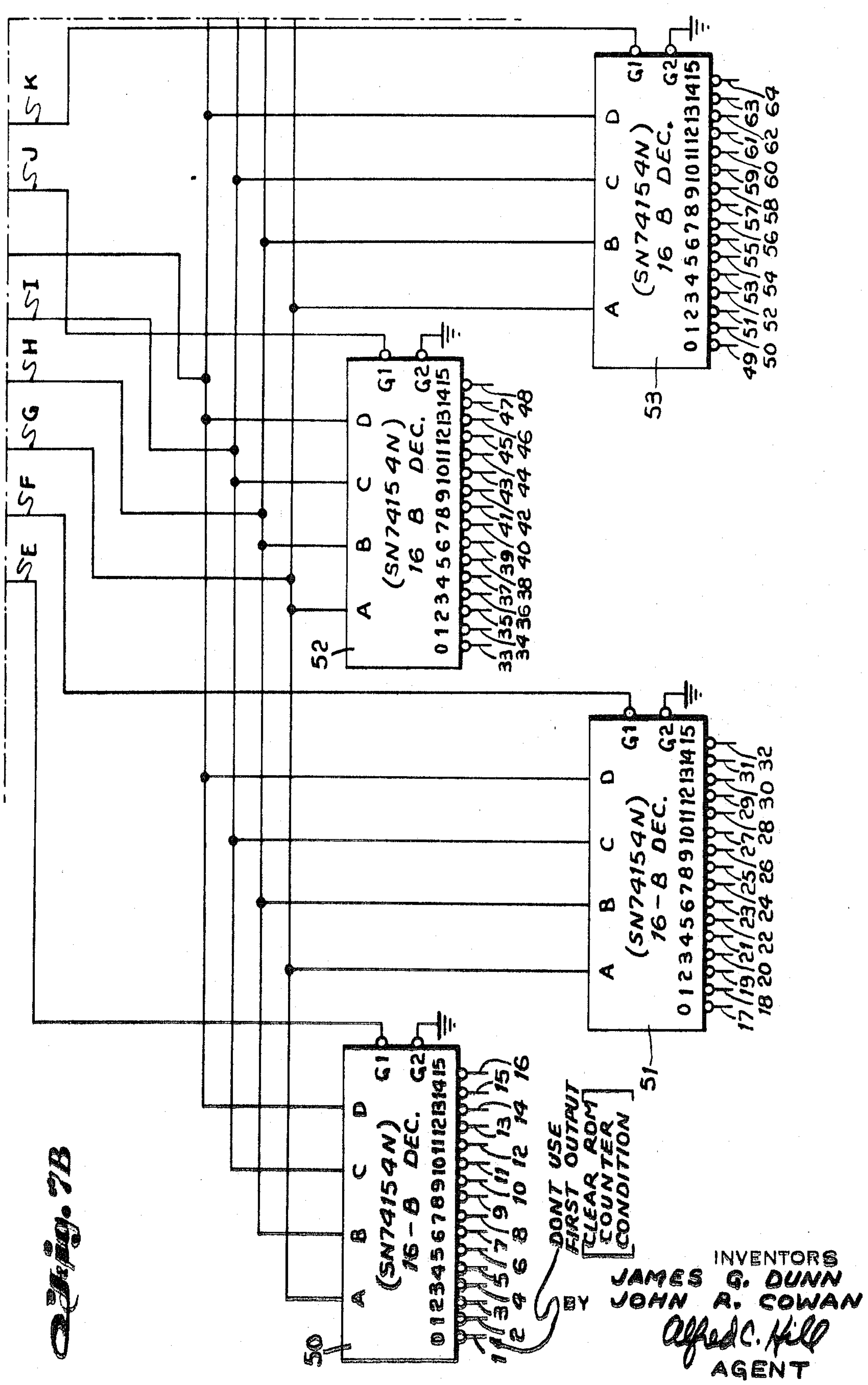
Figure 7C:
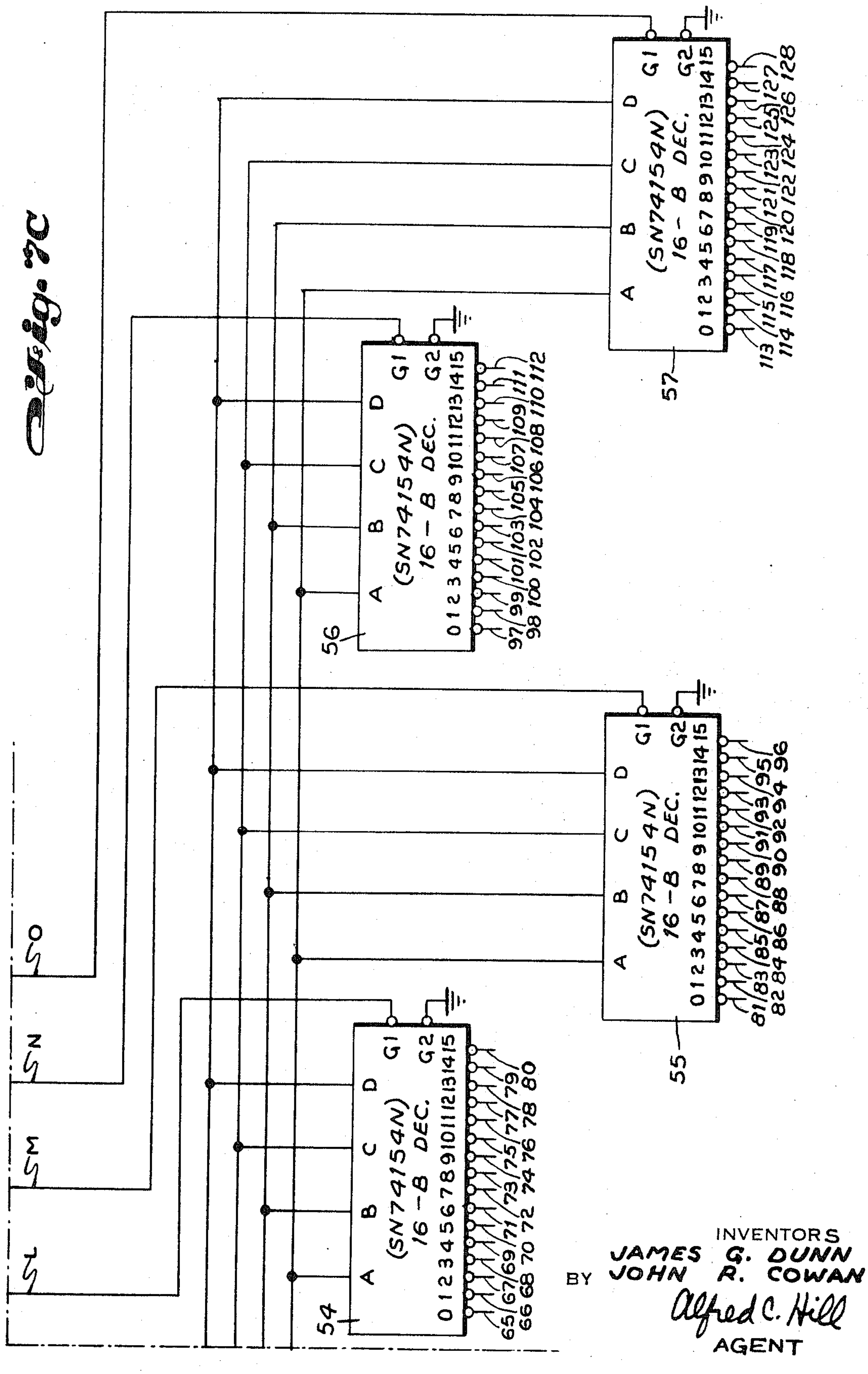
Figure 7D:
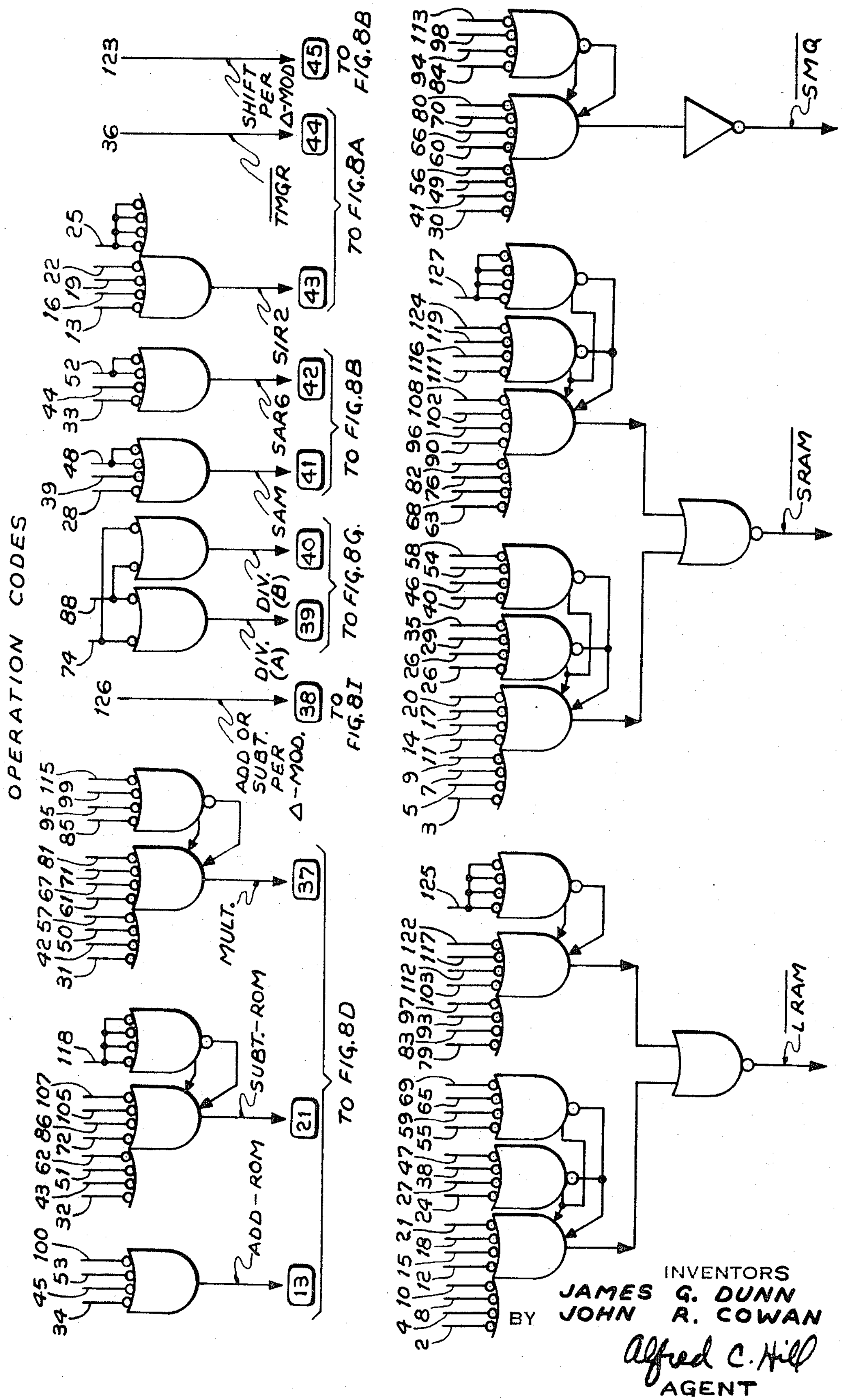
Figure 7E:
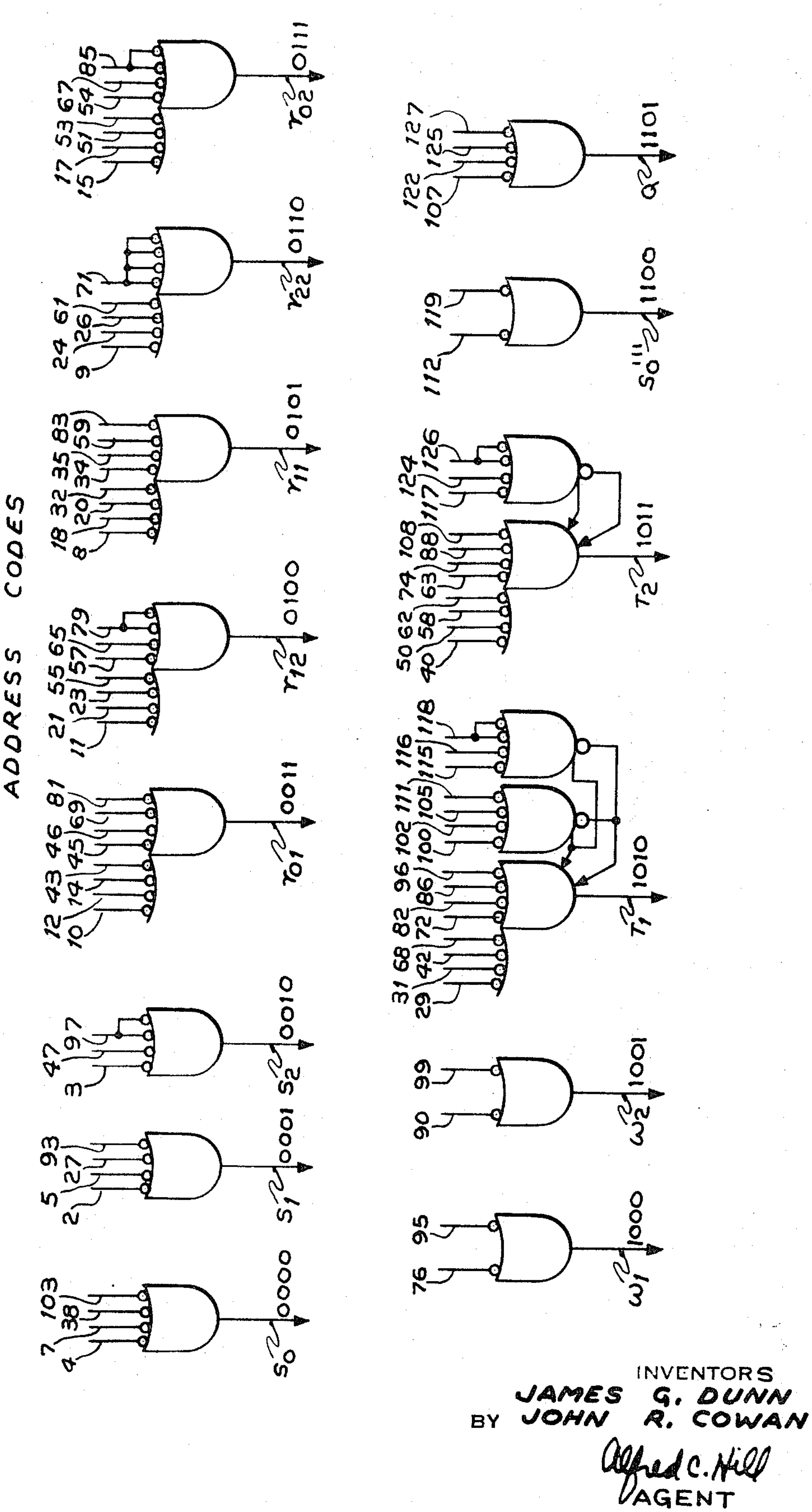
Figure 7H:
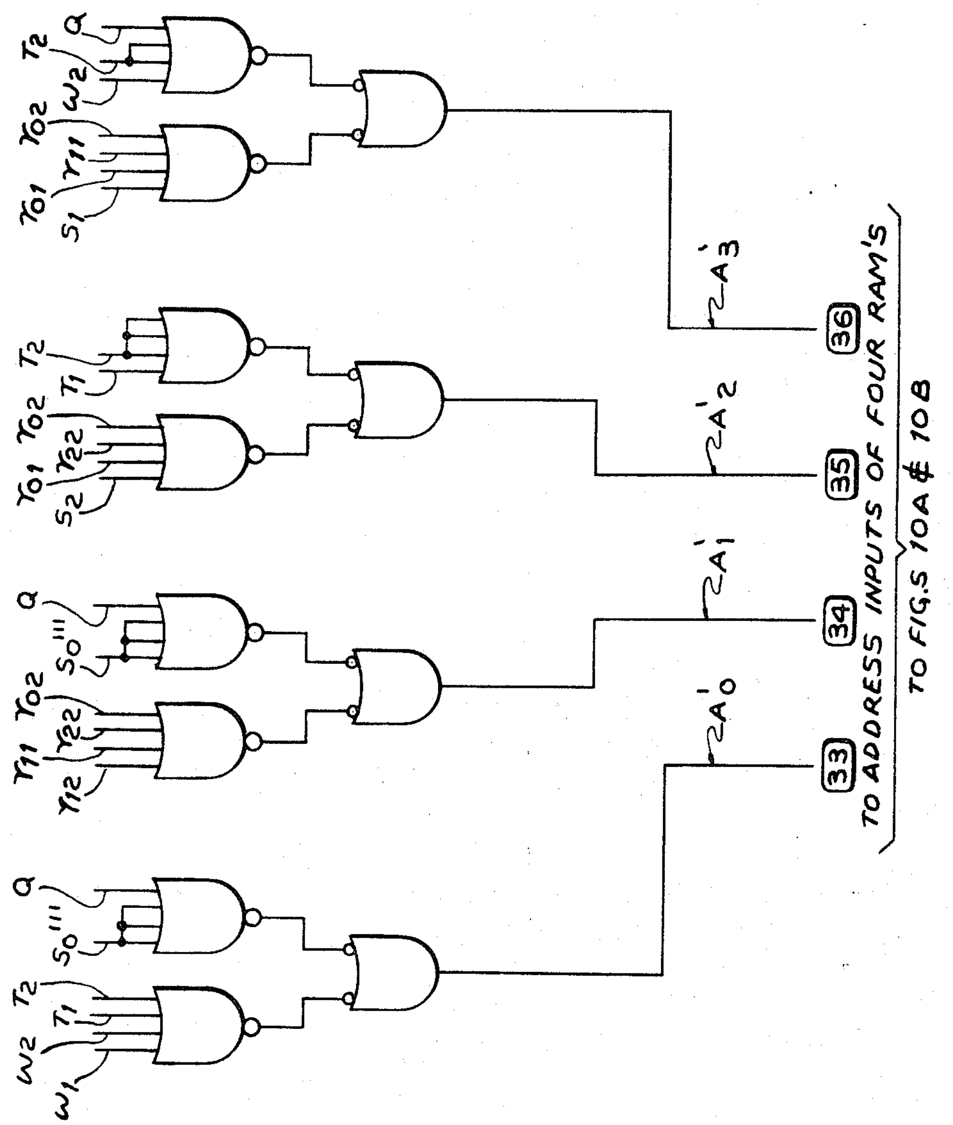
Figure 7I:
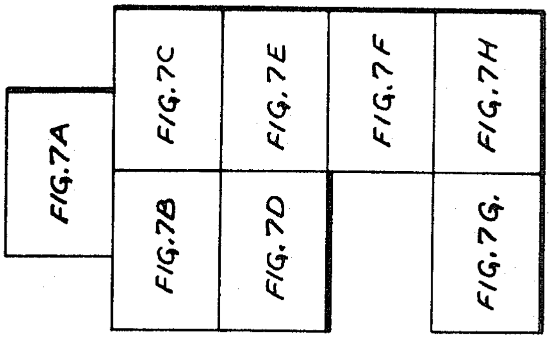
Figure 7G:
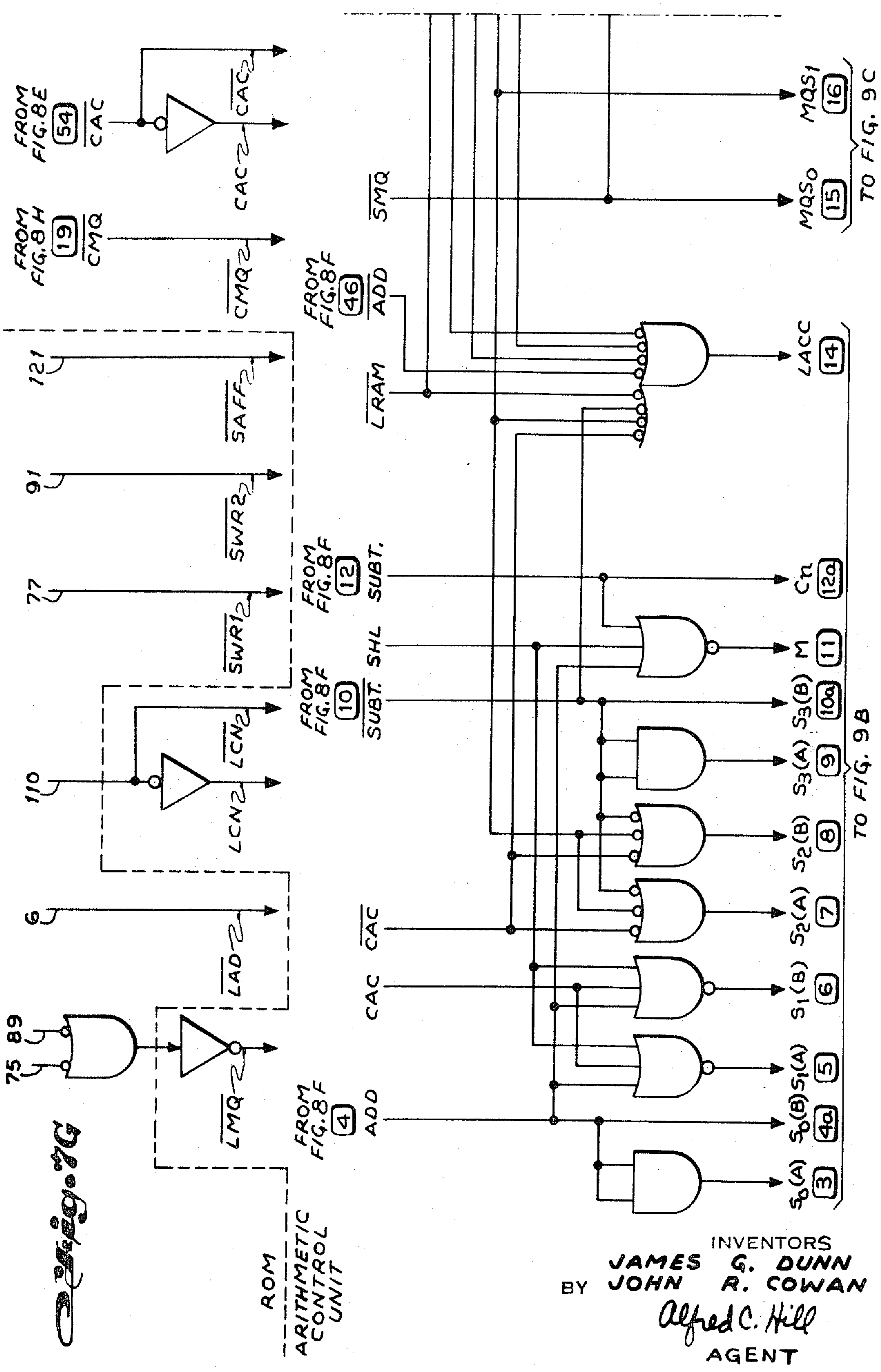
Figure 7H:
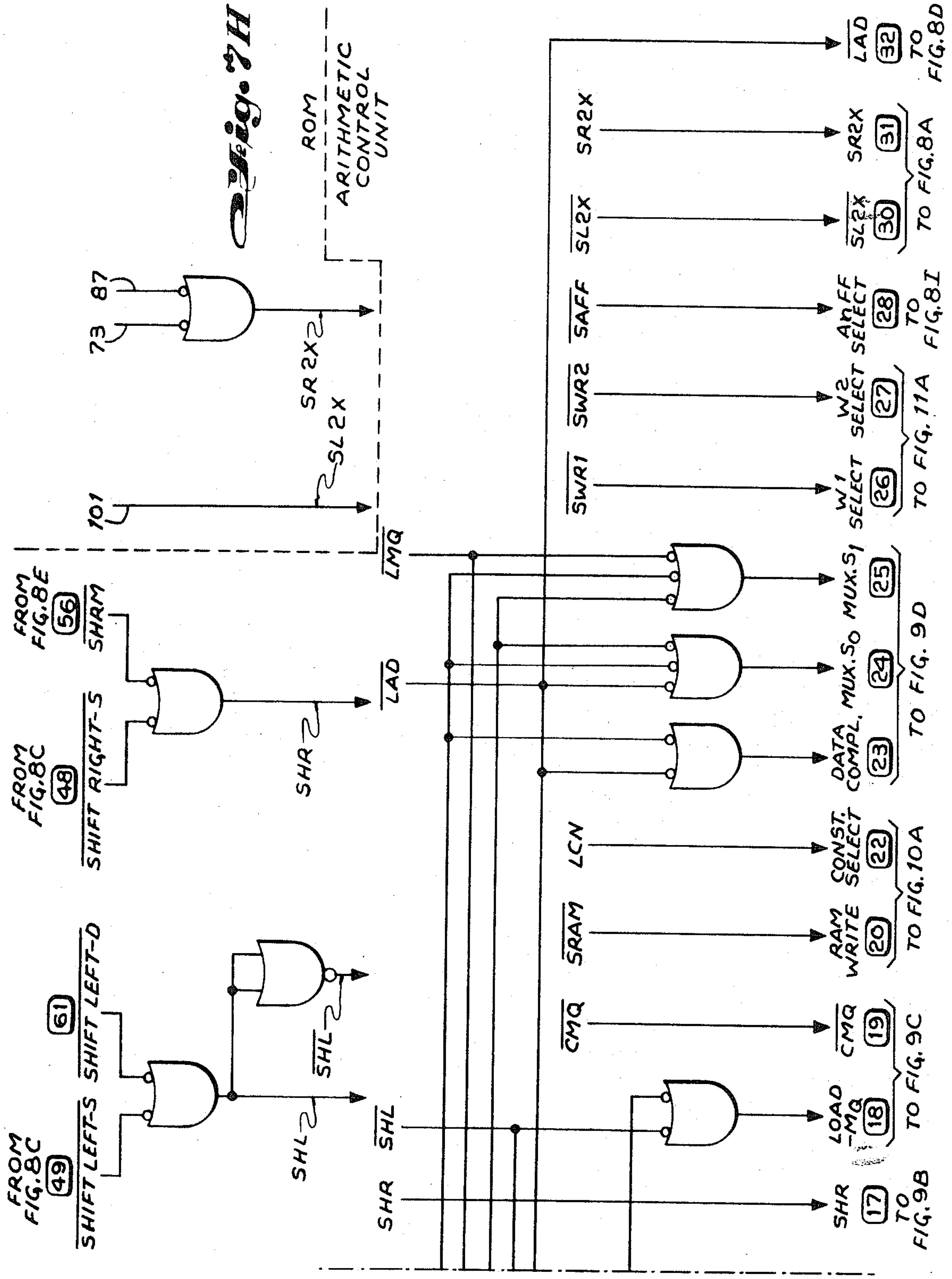

The logic diagram for read only memory 33 is showh in FIGS. 7A – 7H when laid out as illustrated in FIG. 7I. The principle components of memory 33 are up-down counters 47 and 48 and the nine 16 bit decoders 49–57. It should be noted that the outputs of decoders 50–57 are numbered 1 through 128. These outputs are connected to various gate circuits as indicated by the number on the input of this gate circuit to provide the control signal in accordance with the program necessary to carry out the operation of the transmitter. The resultant control signals are found on FIGS. 7D, 7F, 7G and 7H.

As pointed out the major part of the calculation necessary in the transmitter of FIG. 5A is carried out in arithmetic unit 25. The logic diagram of arithmetic unit 25 is shown in FIGS. 9A-9E when laid out as illustrated in FIG. 9F. The major component in the arithmetic unit is the arithmetic logic units 58–62 which are an off-the-shelf item of Texas Instrument, Inc. identified as SN74181N. Arithmetic logic units 58–62 perform the required multiplication, division, addition and subtraction in bit parallel-word serial-two's complement arithmetic employing the techniques disclosed in the following reference books. Multiplication is carried out in accordance with the teaching at page 311–314 of "Logical Design of Digital Computers" by Montgomery Phister, Jr. 1958 edition. Addition, subtraction and division in units 58–62 is carried out as taught in "Digital Computer Design Fundamental" by Yaohan Chu, First Edition. The operations of addition and subtraction are as described at pages 18–22 and pages 430–436. The technique described at pages 430–436 which is in signed magnitude type arithmetic as was modified for two's complement arithmetic. The operation of division is found at pages 39–43.

Figure 9A:
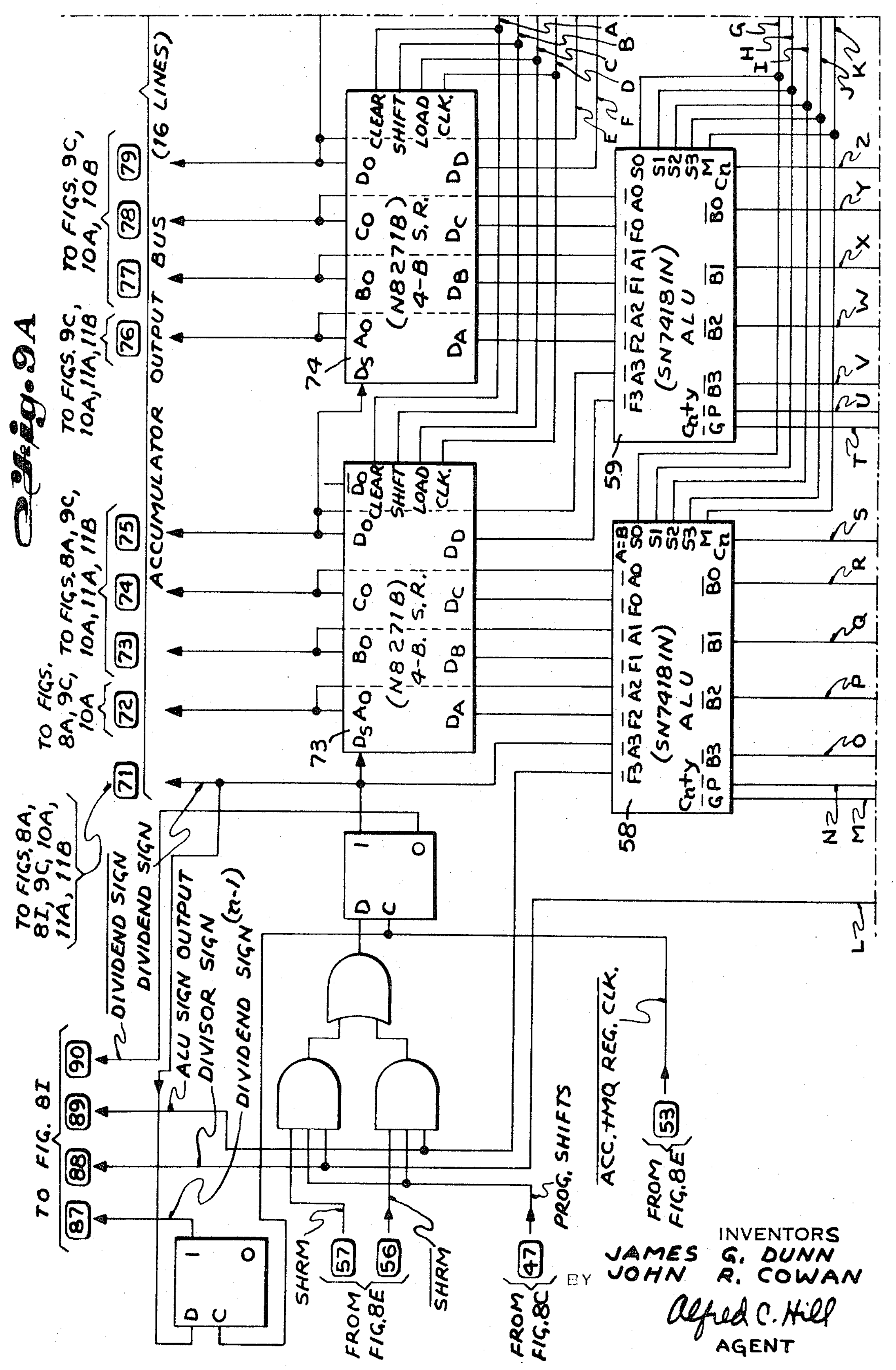
FIGS. 9A – 9E when organized as shown in FIG. 9F illustrates one embodiment of the logic diagram of the arithmetic unit of FIG. 4A.
Figure 9B:
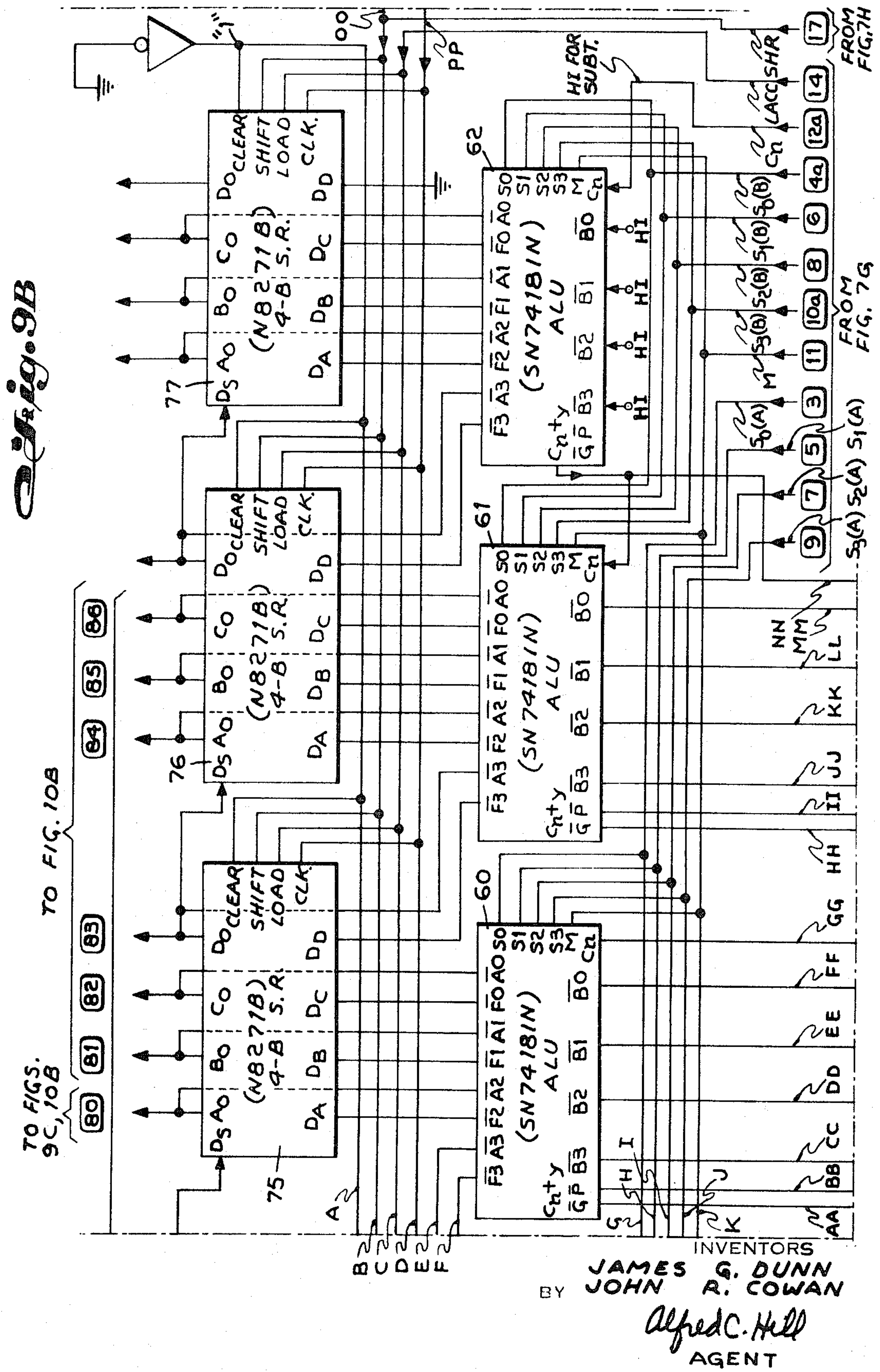
Figure 9C:
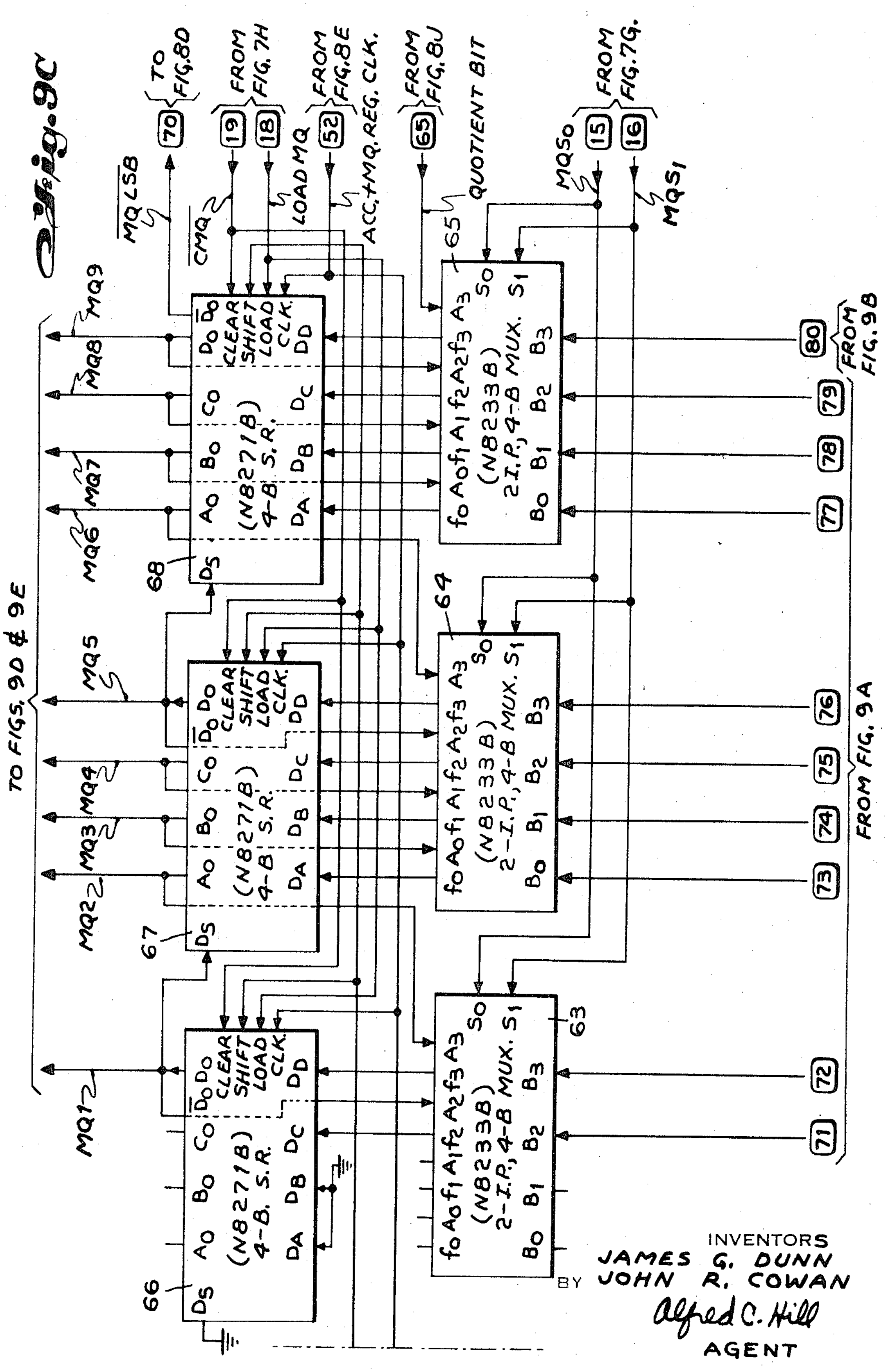
Figure 9D:
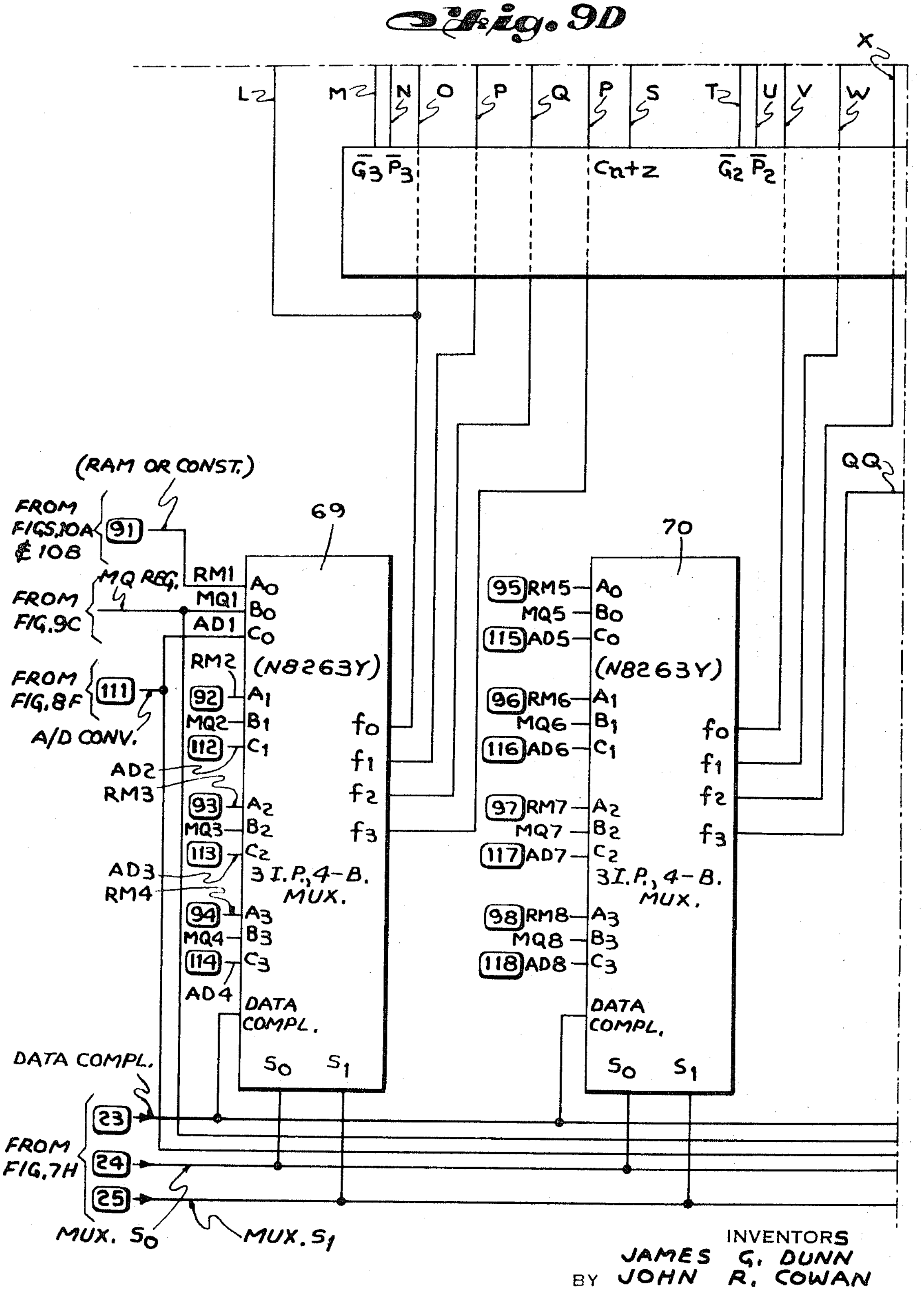
Figures 9E, 9F:
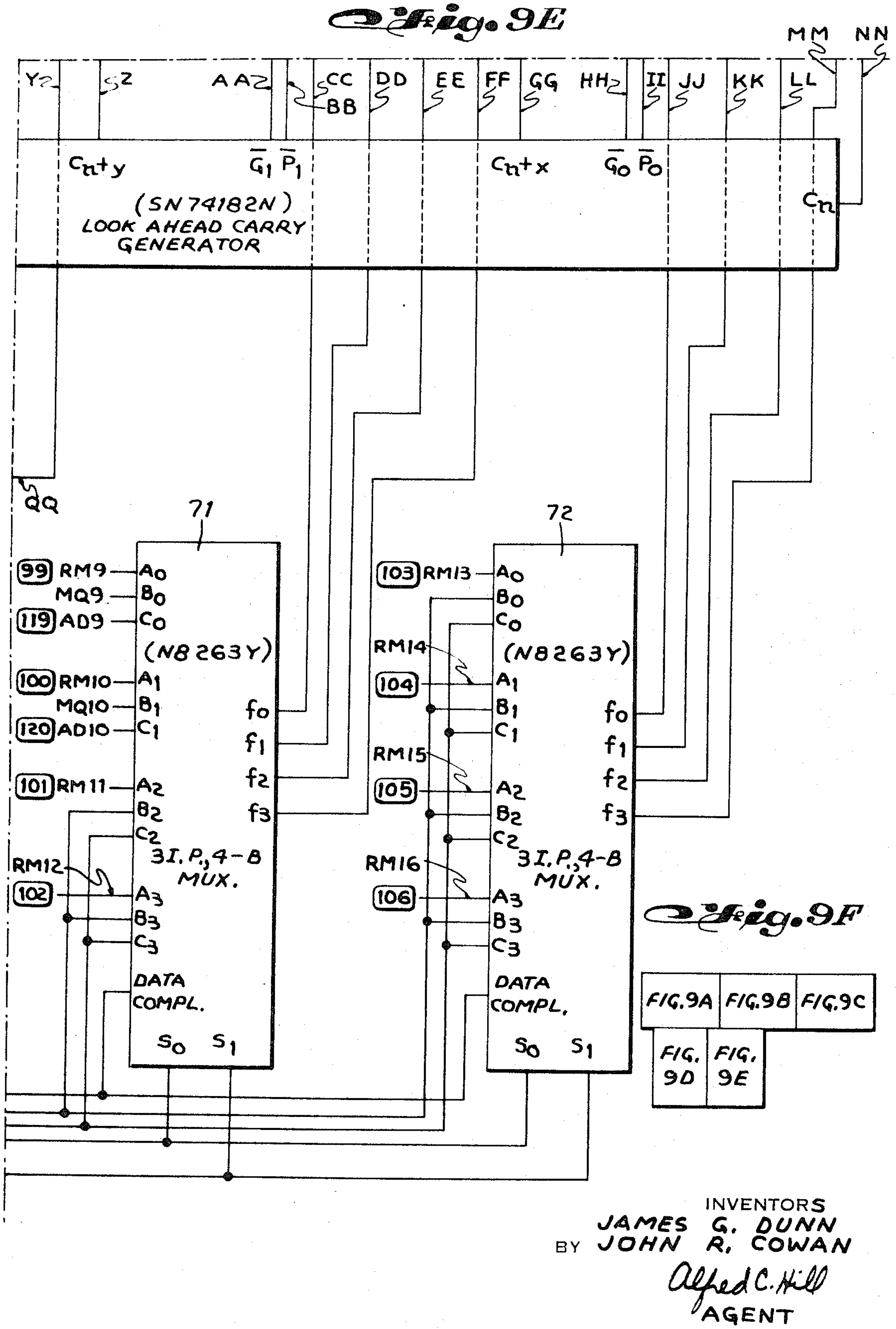
Figures 10A, 10C:
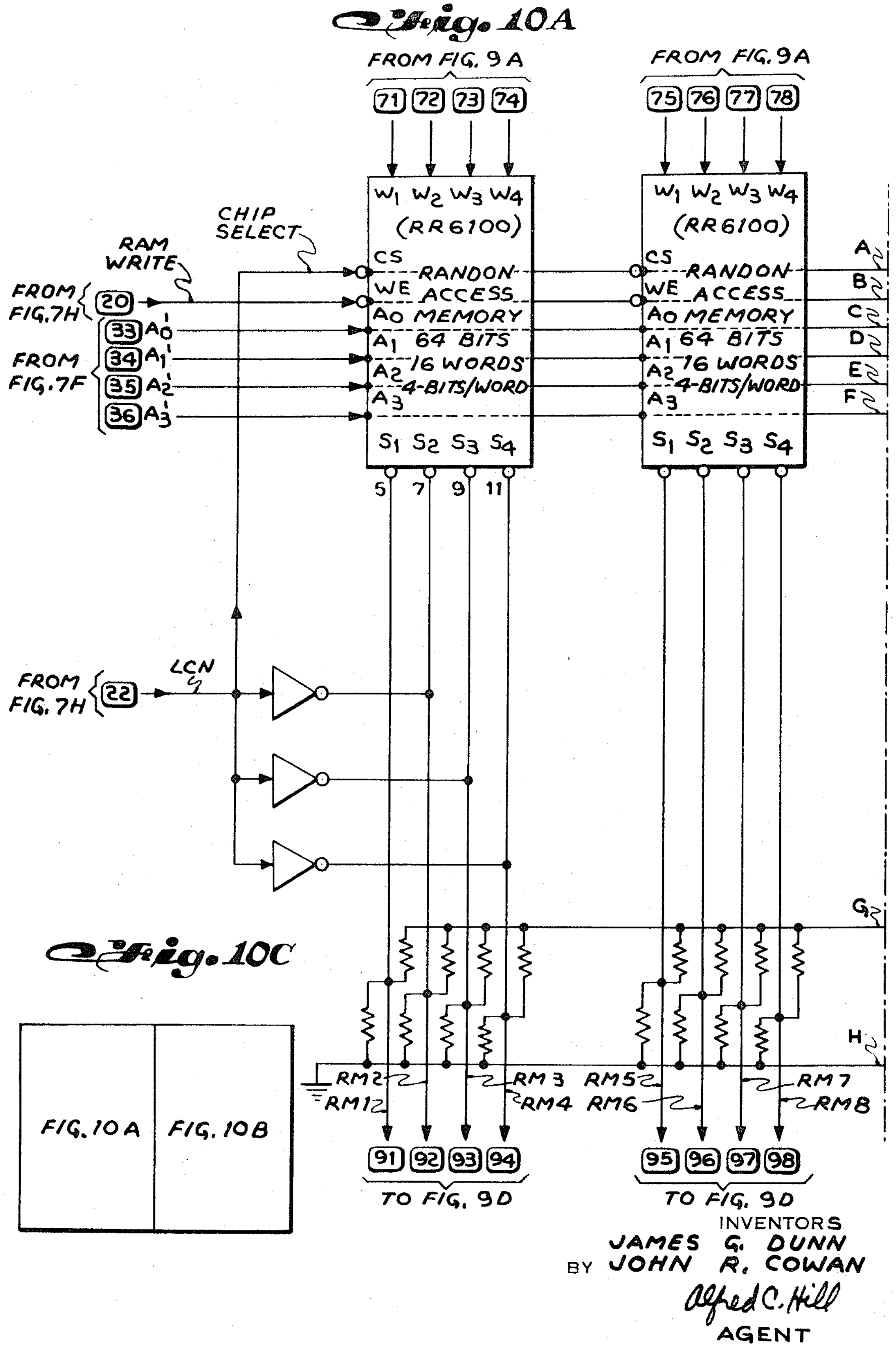
FIGS. 10A and 10B when organized as shown in FIG. 10C illustrates one embodiment of the logic diagram of the random access memory of FIG. 4A.
Figure 10B:
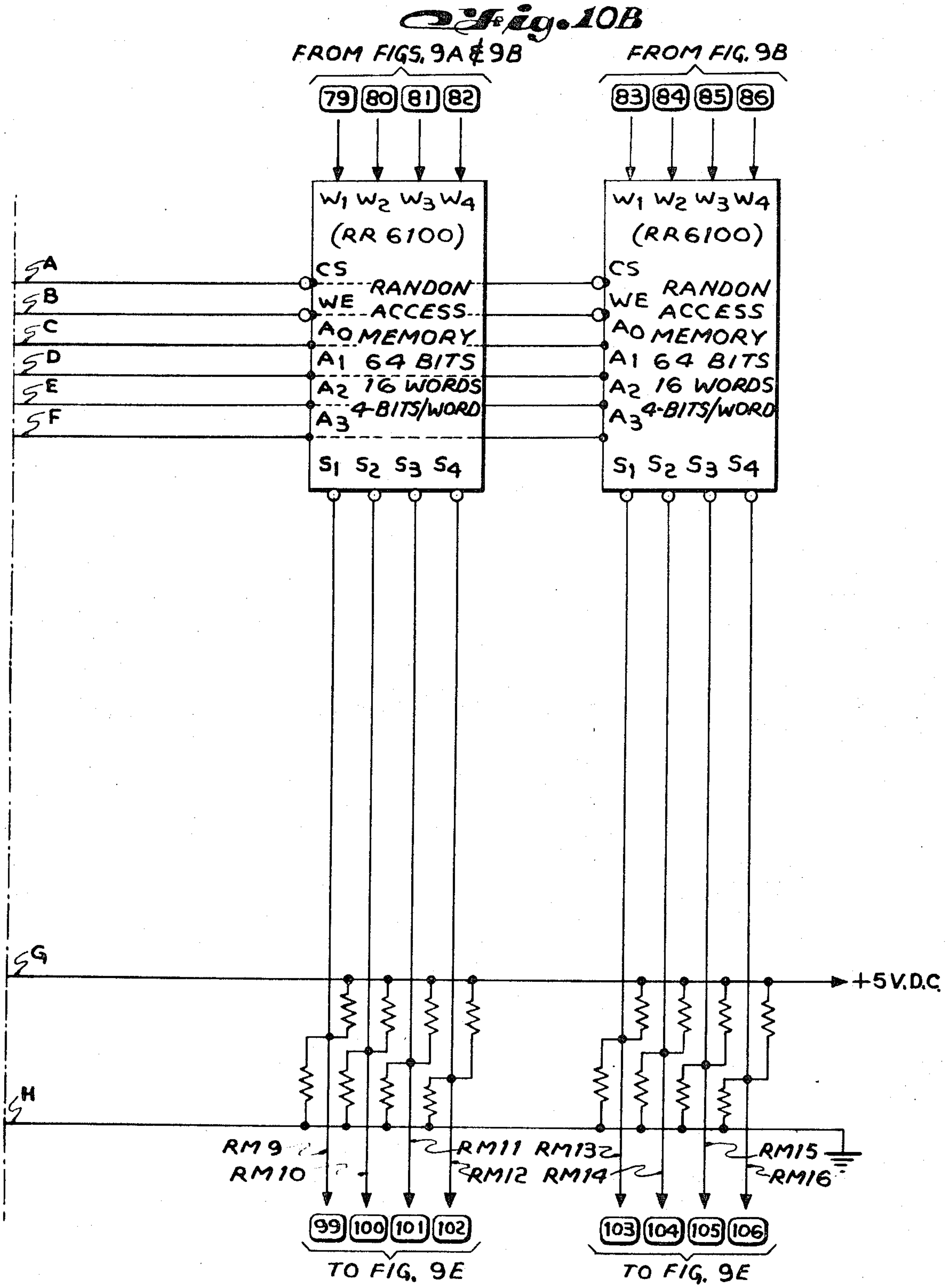
Figure 11A:
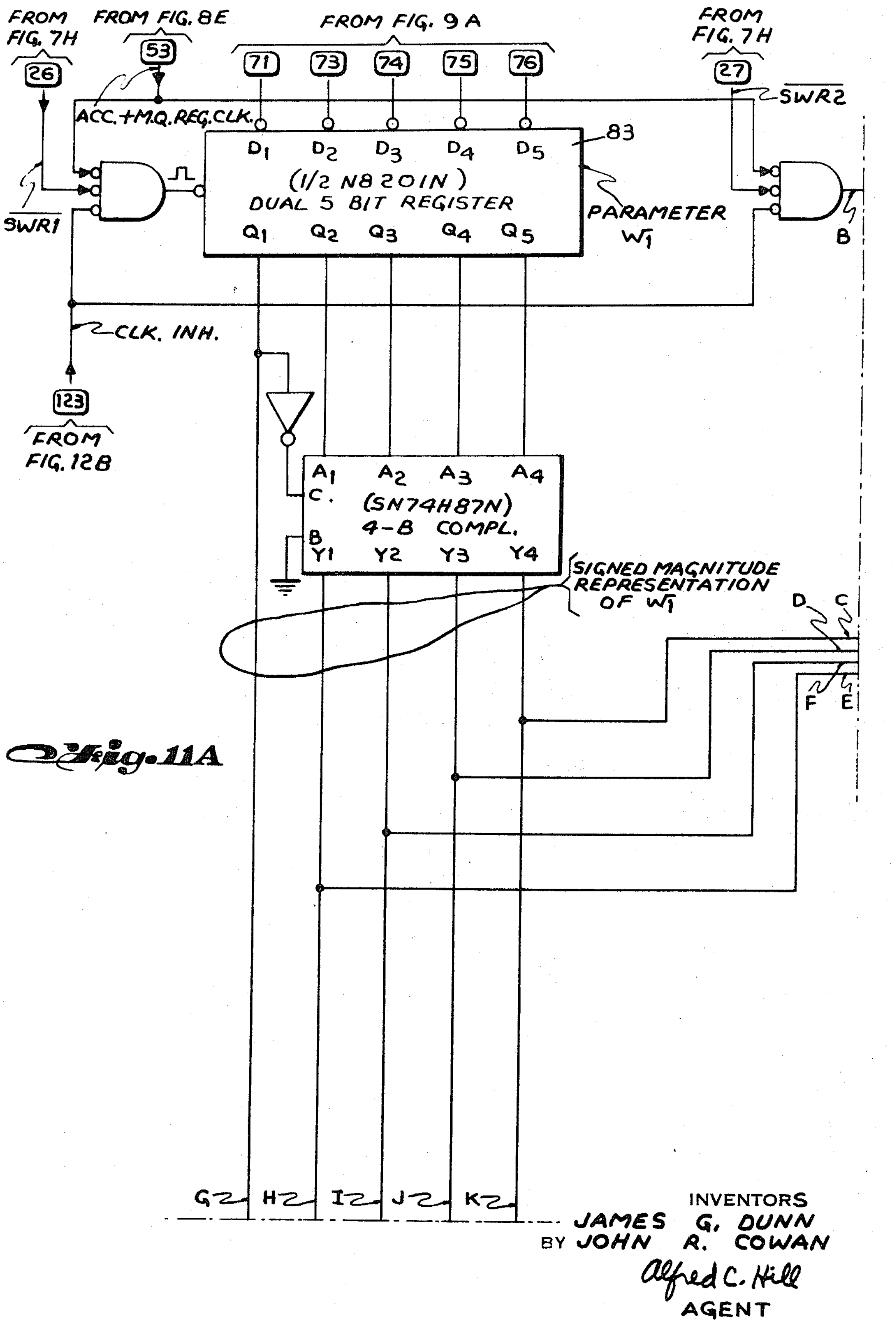
FIGS. 11A – 11C when organized as shown in FIG. 11D illustrates one embodiment of the logic diagram of the parameter coder and 9 bit to 8 bit translator of FIG. 4A.
Figures 11B, 11D:
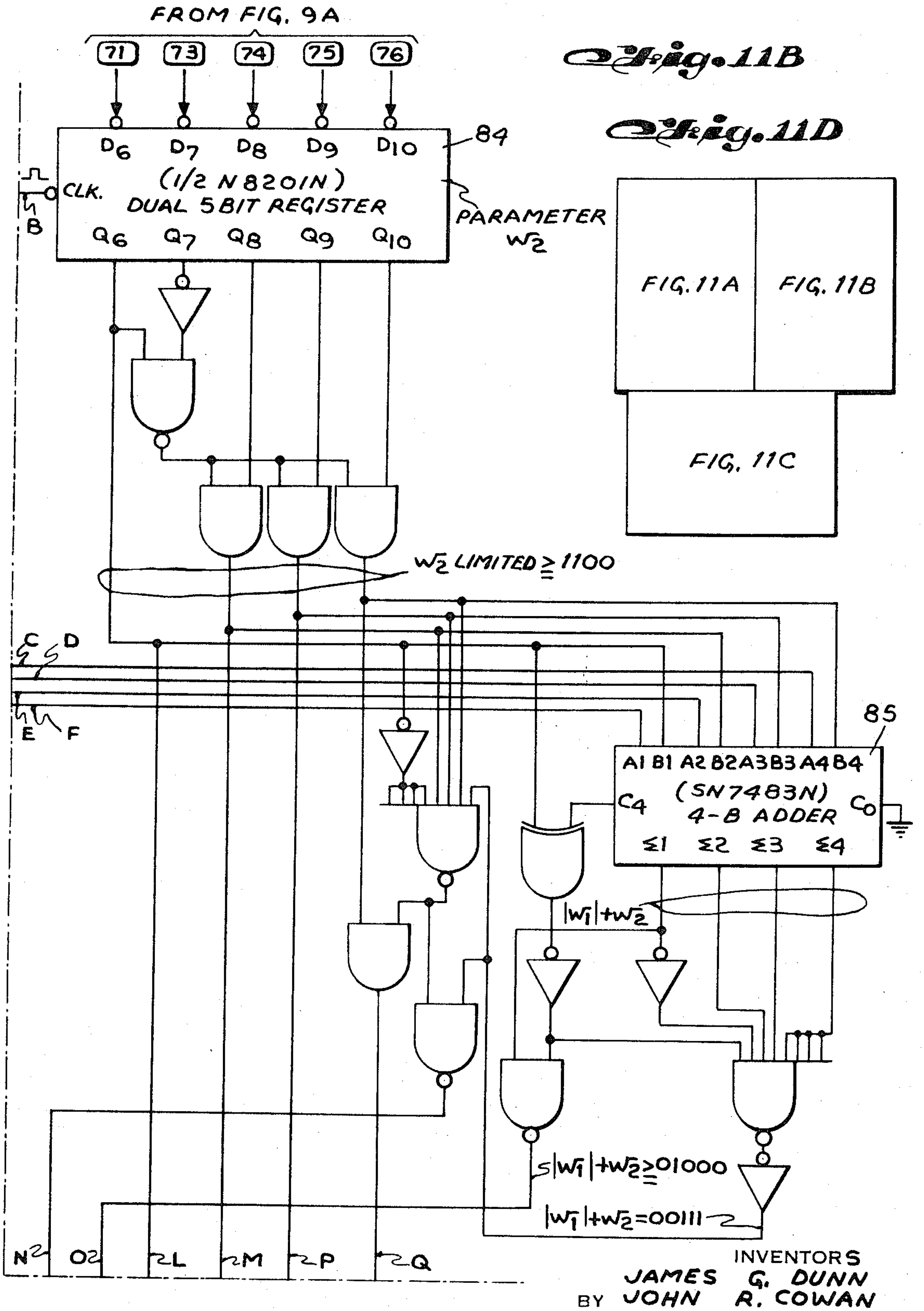
Figure 11C:
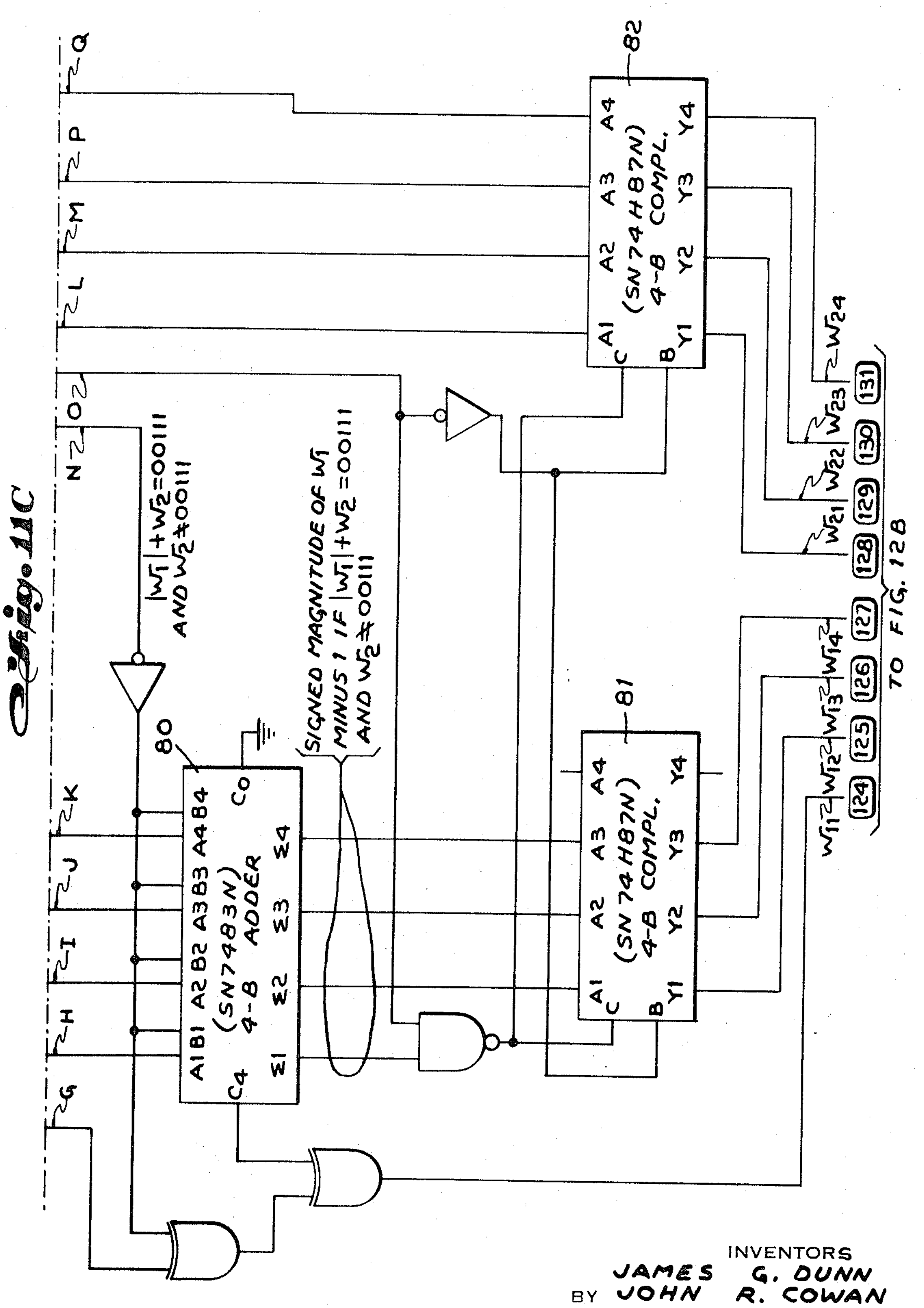

One of the inputs to arithmetic logic units 58–62 are obtained from the quotient memory register in the form of two input, four bit multiplexer 63–65 and four bit shift registers 66–68 of FIG. 9C. Other inputs required for the proper operation of the arithmetic logic units 58-62 are the parallel bit outputs from converter 27 (see FIG. 8F) and the bit outputs RM1-RM16 of the random access memory of FIGS. 10A and 10B. These three signals are coupled to the arithmetic logic units 58–62 by means of the three input, four bit multiplexers 69–72 as found in FIG. 9E. The outputs from arithmetic logic units 58–62, after completing the necessary arithmetic operations are coupled to an accumulator in the form of the four bit shift registers 73–77. The output from these shift registers are coupled to the input of the random access memory 29, as illustrated in FIGS. 10A – 10B, the quotient memory of FIG. 9C and the parametric encoder and translator 34 as shown in FIGS. 11A – 11C.

Figure 8A:
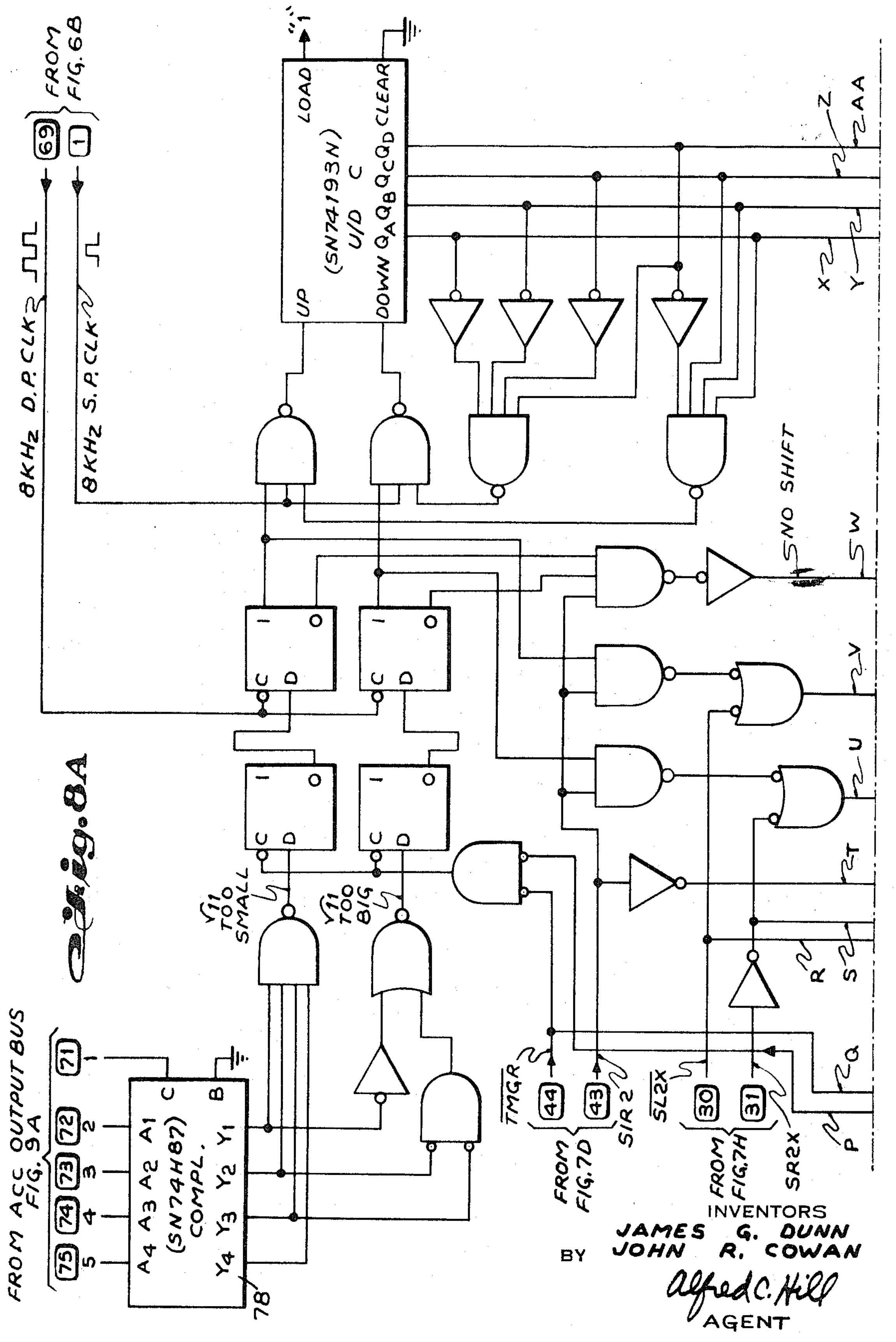
FIGS. 8A – 8J when organized as shown in 8K illustrates one embodiment of the logic diagram of the arithmetic control unit, speech source, low-pass filter, sample and hold circuit, analog-to-digital converter and delta coder of FIG. 4A.
Figure 8B:
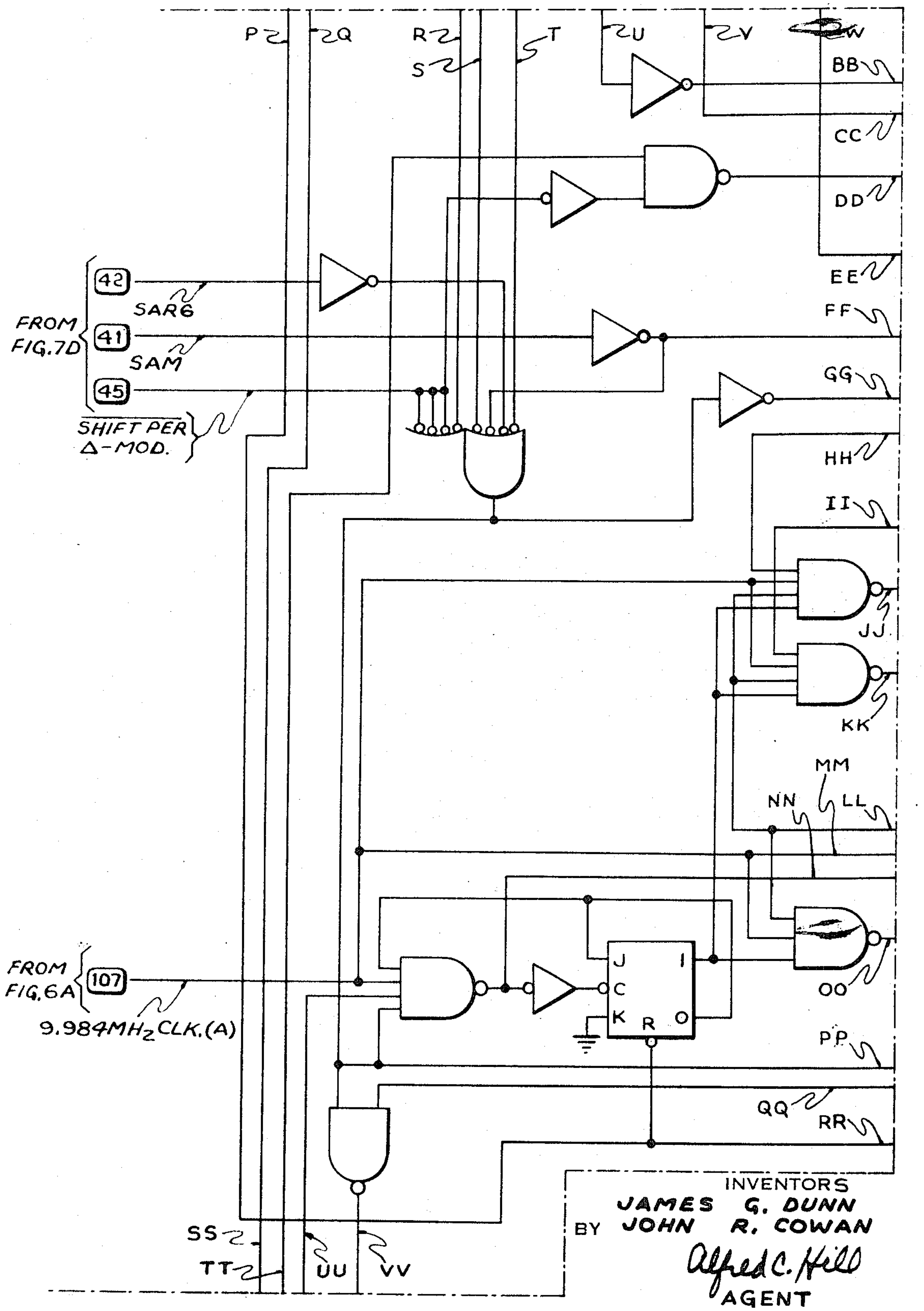
Figures 8C, 8K:
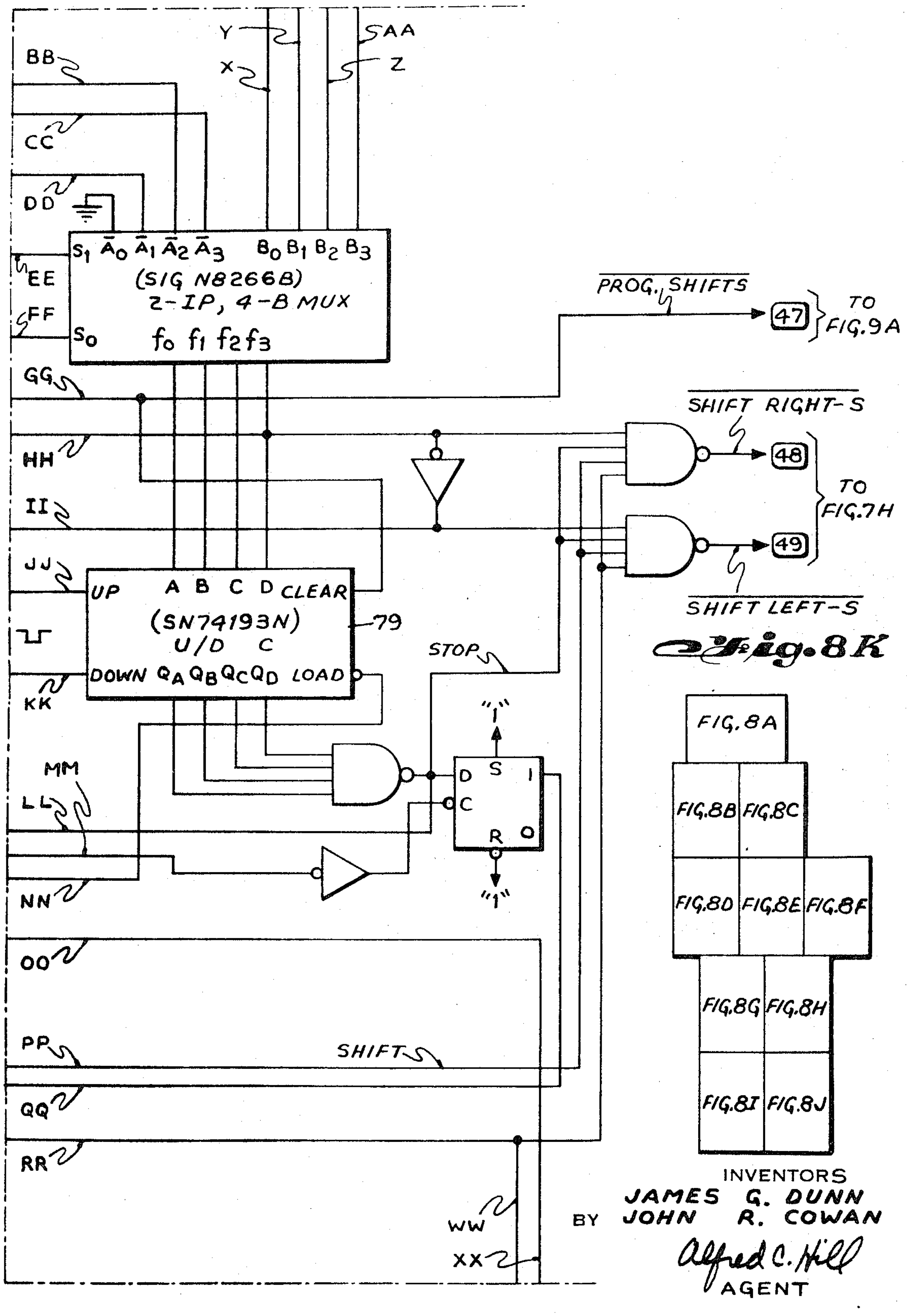
Figure 8D:
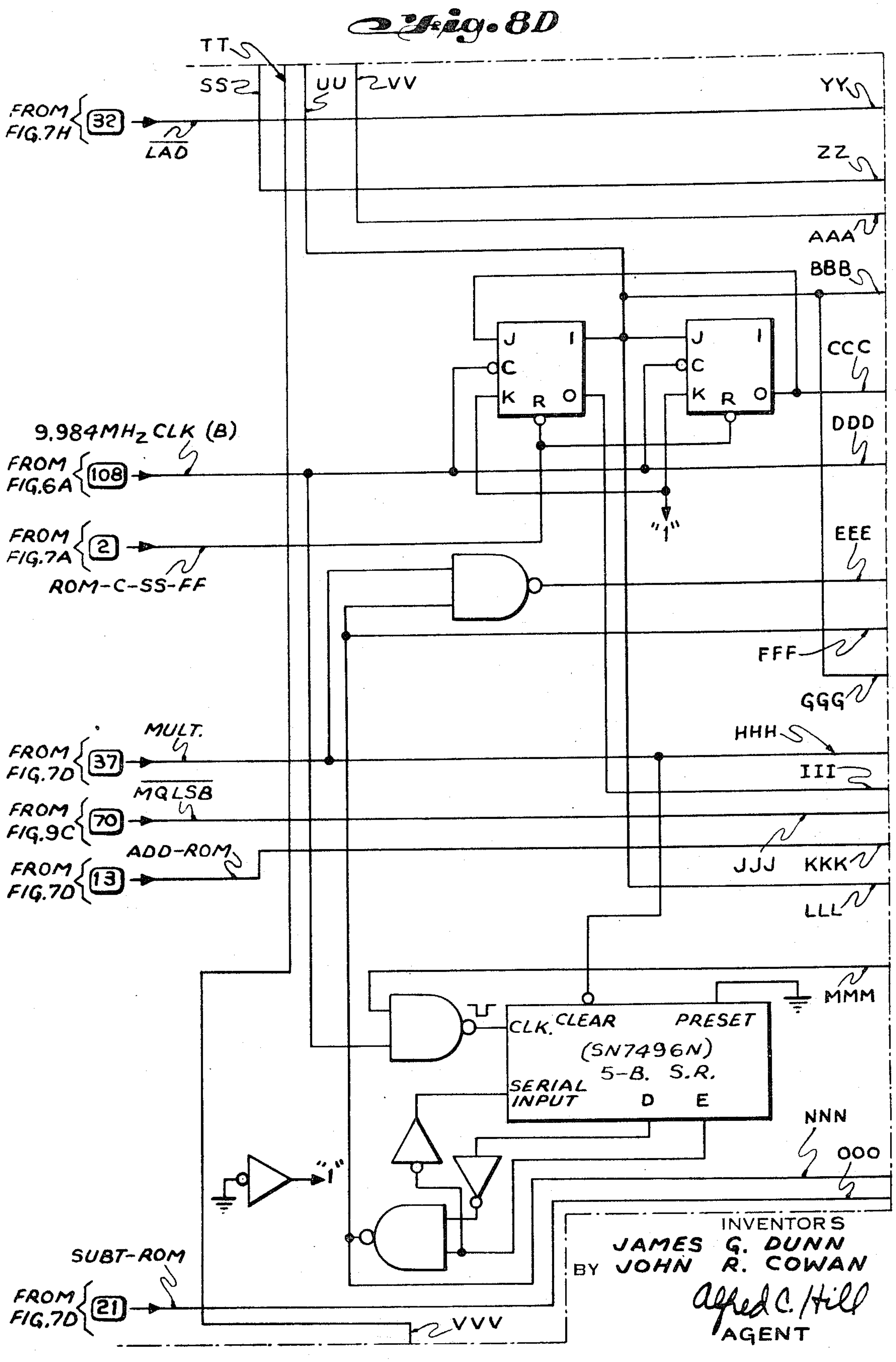
Figure 8E:
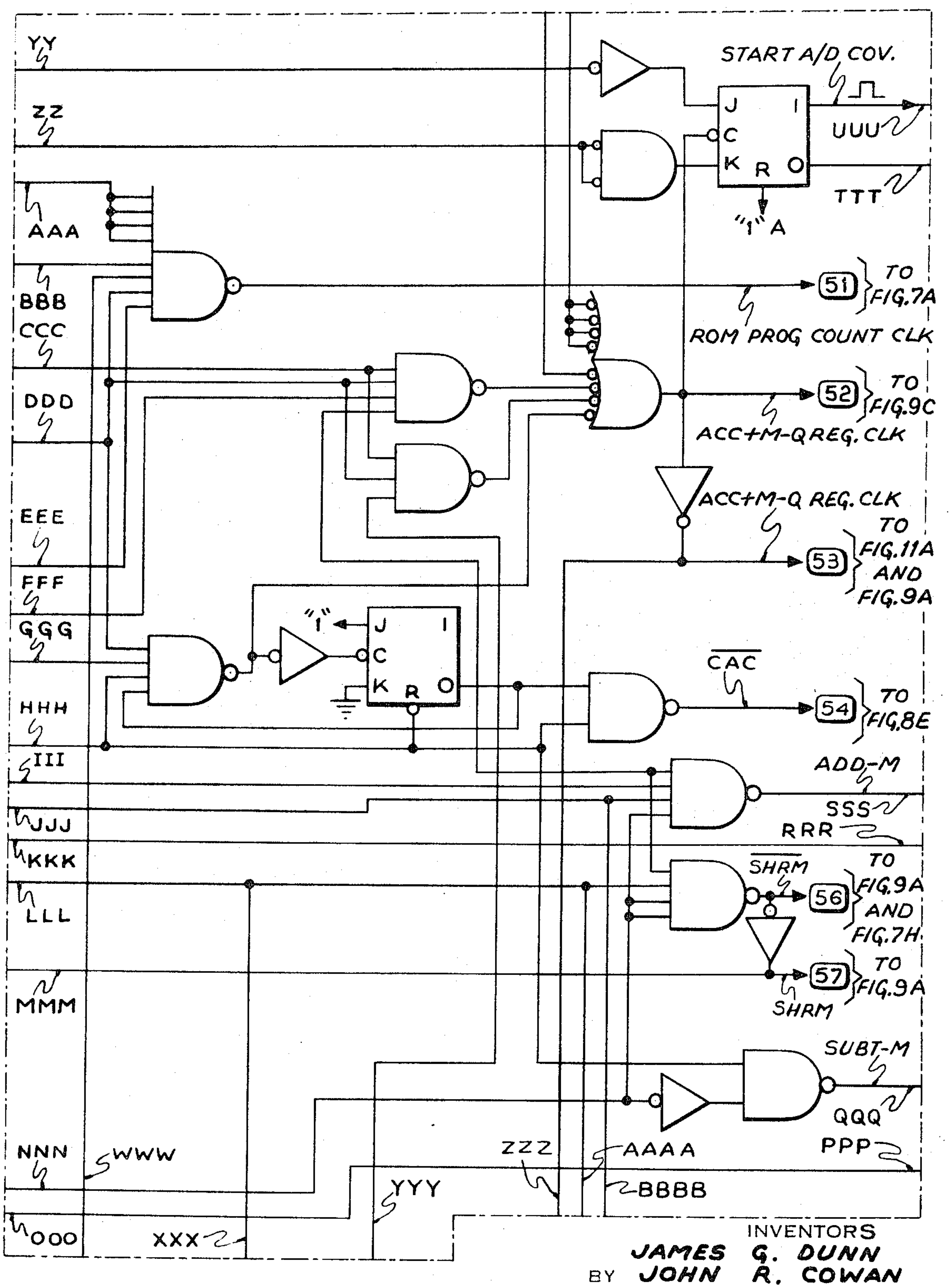
Figure 8F:
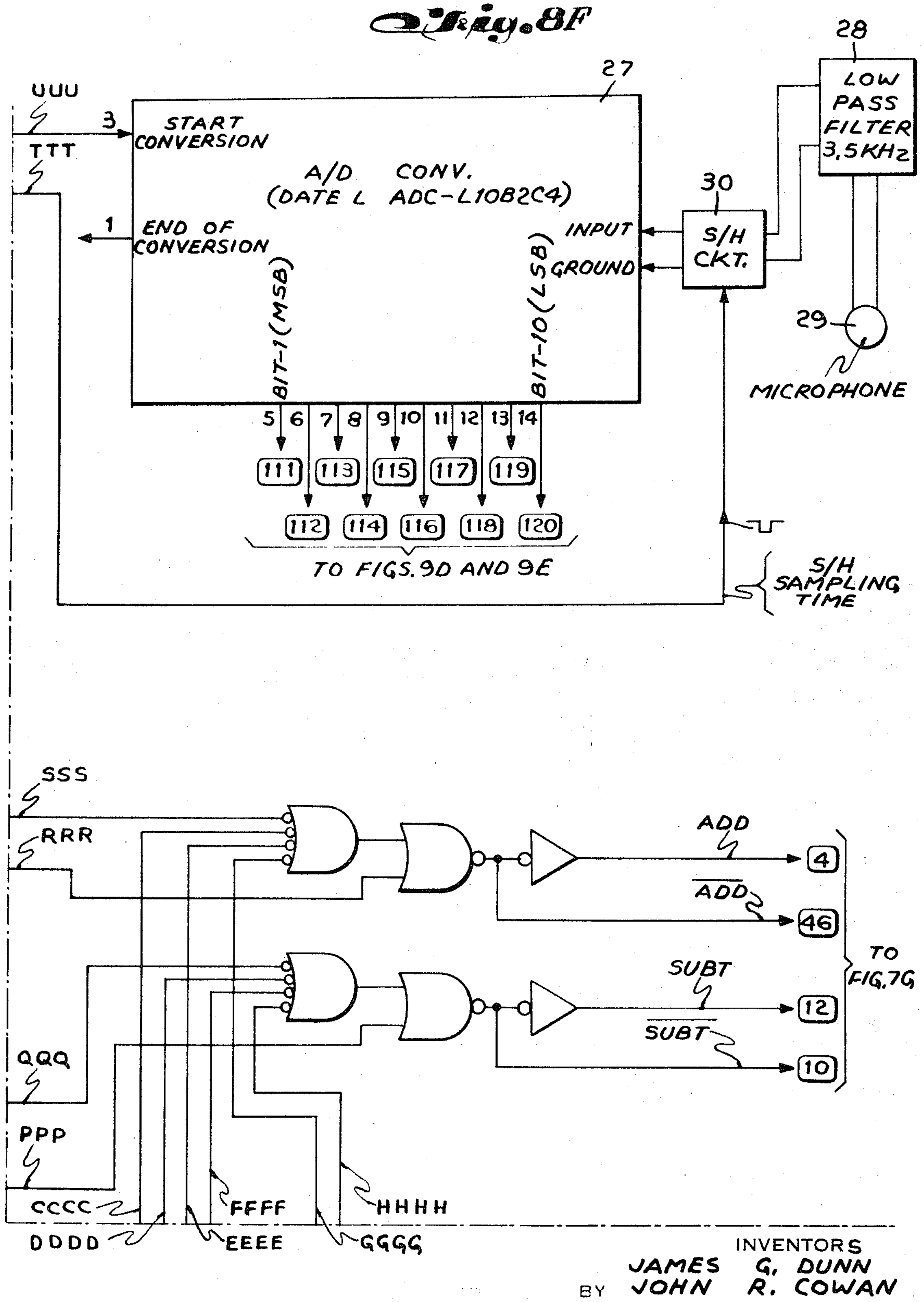
Figure 8G:
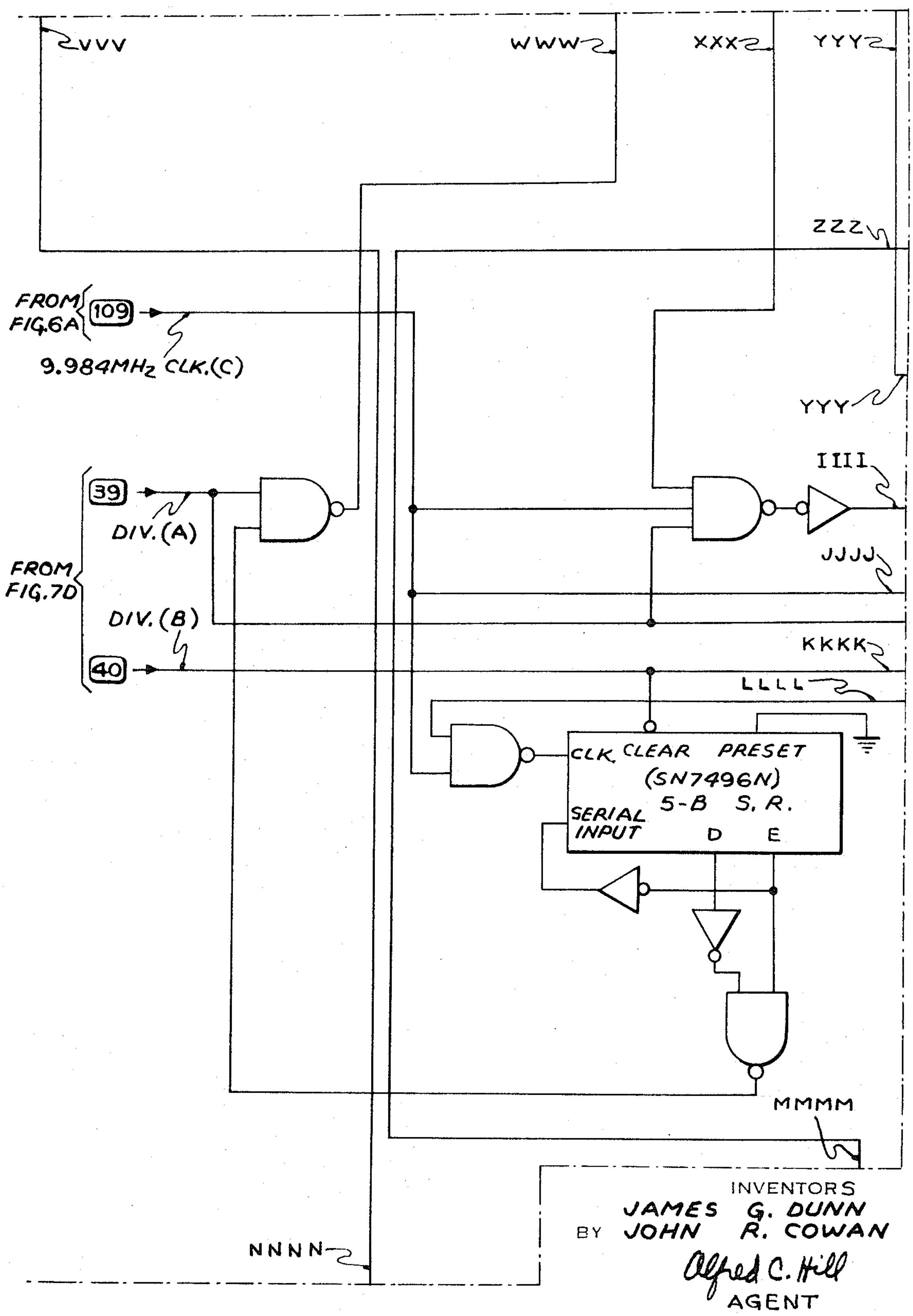
Figure 8H:
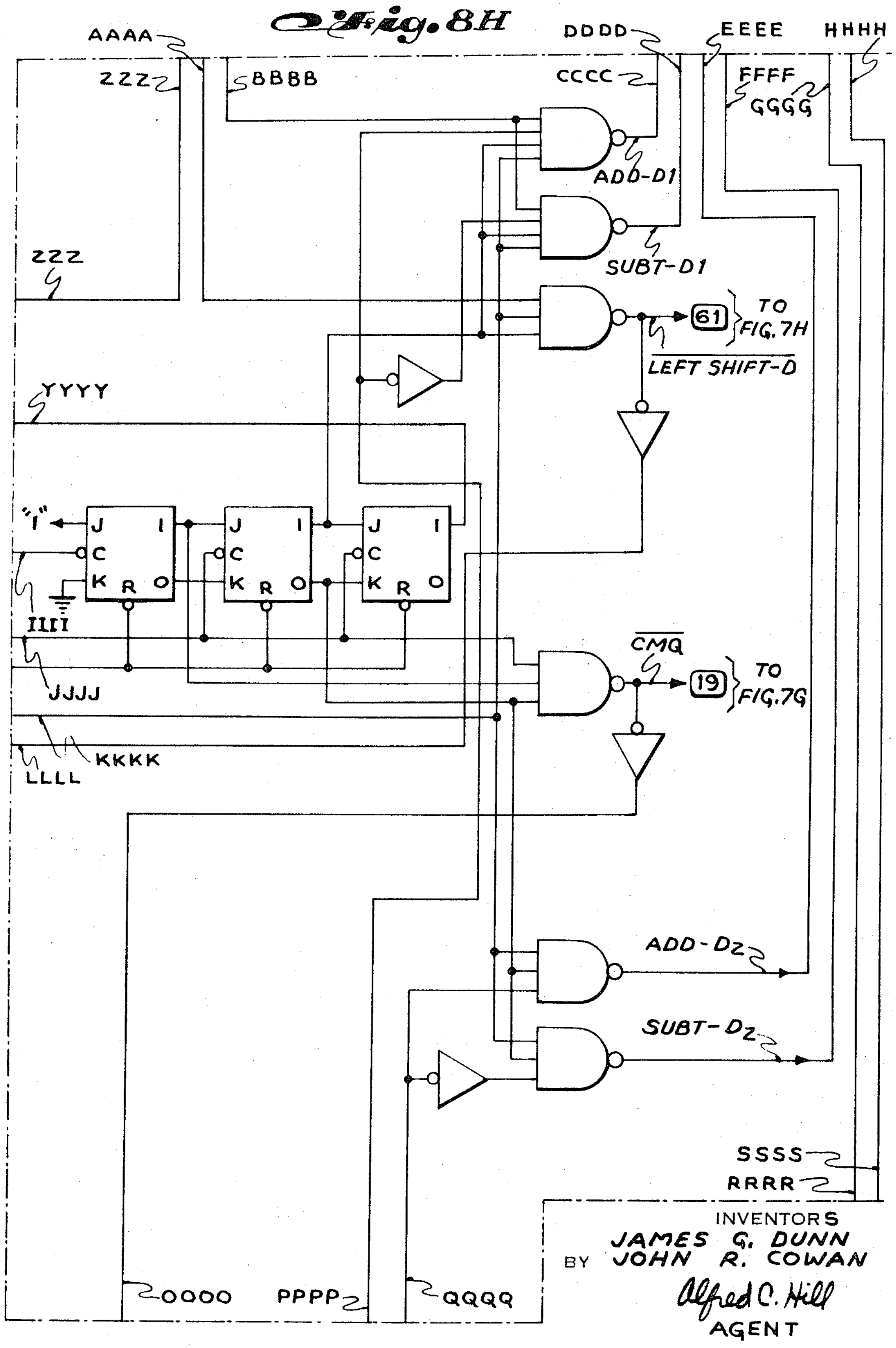
Figure 8I:
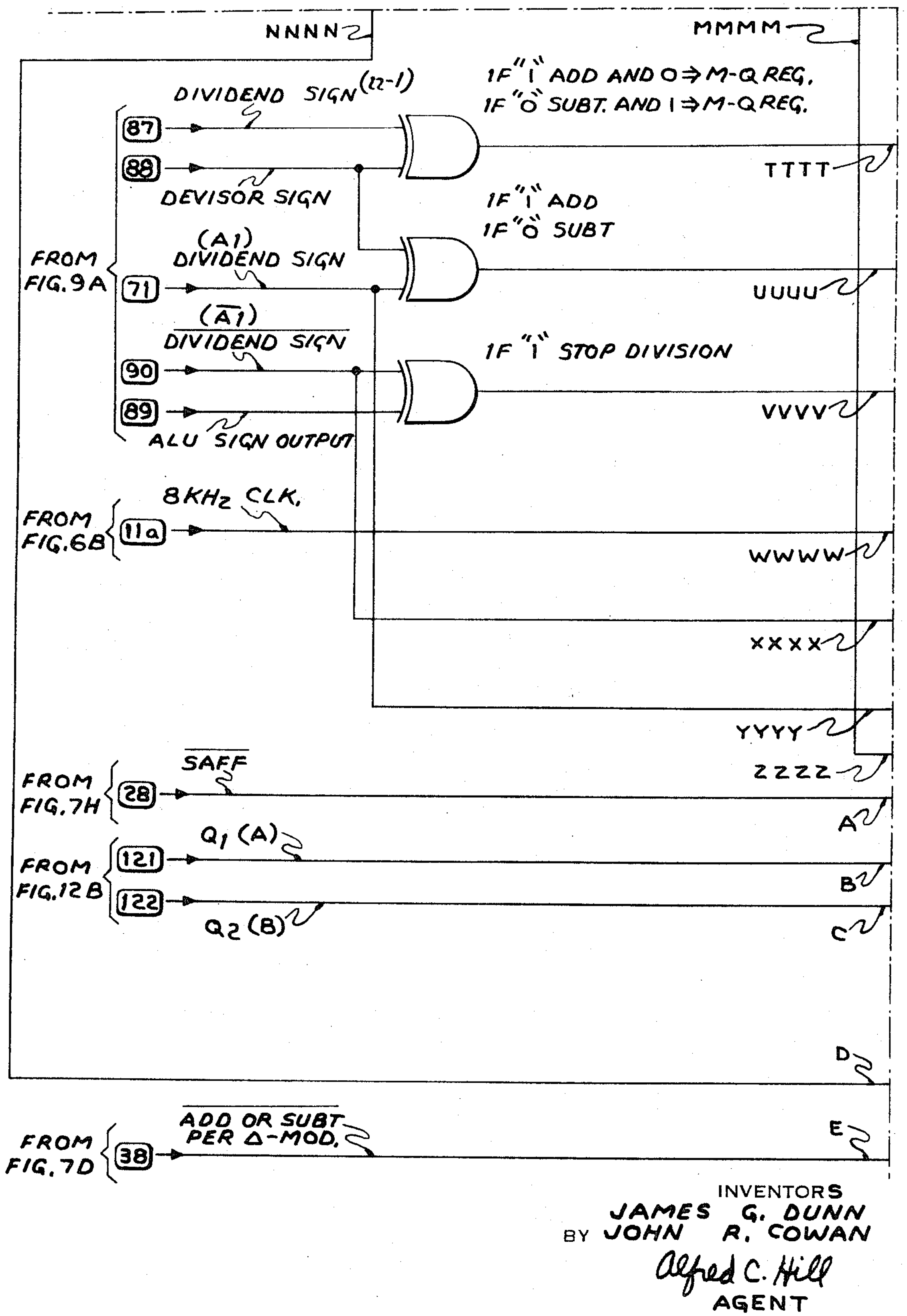
Figure 8J:
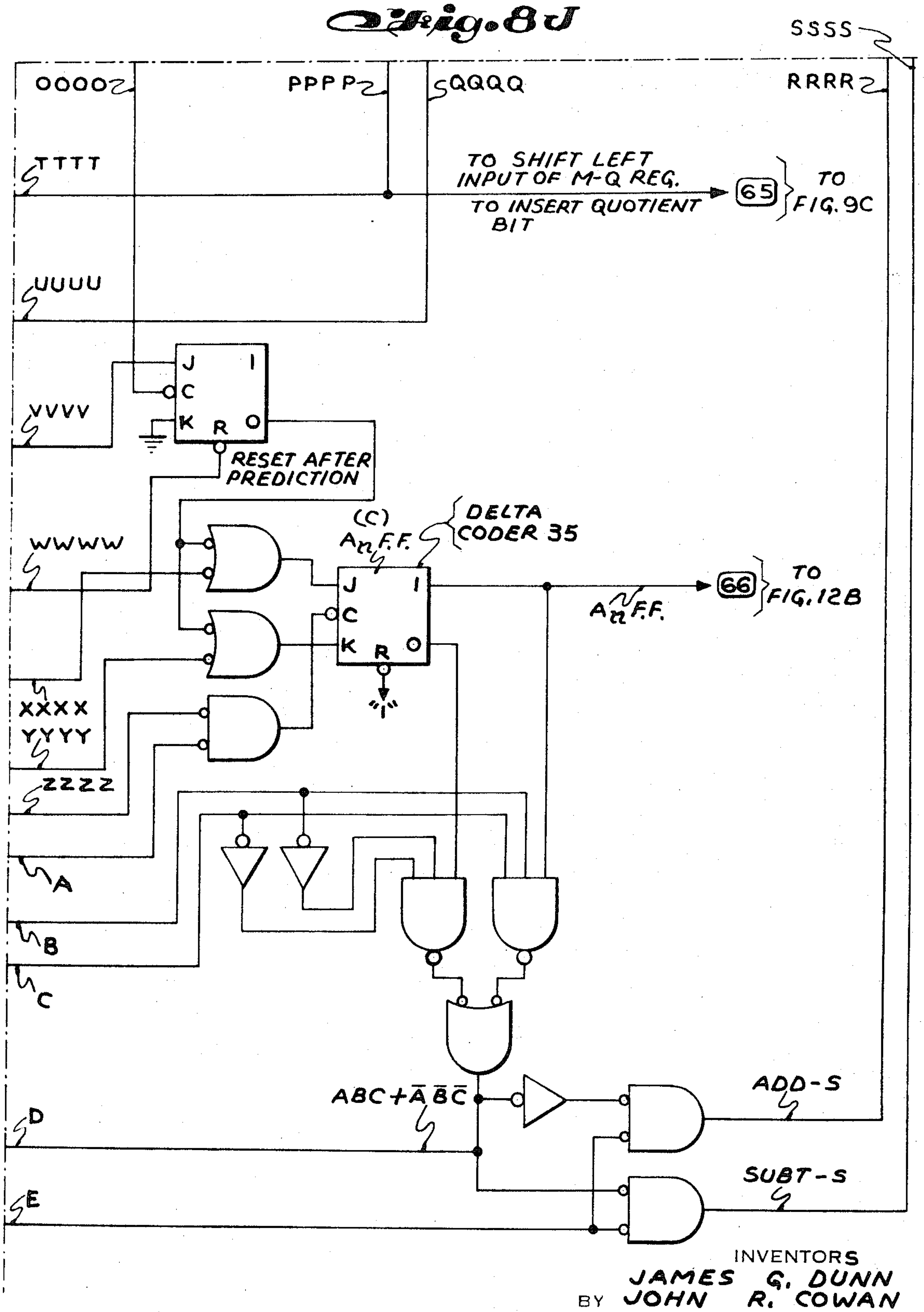

Arithmetic control unit 31 of FIG. 4A has its logic diagram shown in FIGS. 8A-8J when laid out according to FIG. 8K. This unit receives the first five bits at the output of the accumulator of FIG. 9B for application to the complementor 78 which together with the associated logic circuitry checks whether the correlation coefficent $r_{11}$ is too small or too big according to the conditions of the first five digits from the accumulator of FIG. 9B as shown in the following Table VII.

TABLE VII

| | 1 | 2 | 3 | 4 | 5 | 6 | 7 | 8 | 9 | 10 |
|---|---|---|---|---|---|---|---|---|---|---|
| $r_{11}$ Too Small | 0 | 0 | 0 | 0 | 0 | X | X | X | X | X |
| $r_{11}$ Too Big | 0 | X | 1 | 1 | X | X | X | X | X | X |
| | 0 | 1 | X | X | X | X | X | X | X | X |

The detected condition of $r_{11}$ will operate on up-down counter 78*a* and its associated logic gates to make the appropriate correction in the value of $r_{11}$. The X indicated in the above Table VII is a "dont's care condition." In other words, the digit can have either a 1 or 0 condition.

The operation of up-down counter 79, according to the condition of the binary input at its input A-D, determine the number and type of shift that is required in the arithmetic unit of FIGS. 9A – 9E. The following Table VIII indicates the various conditions to the input A-D of counter 79 and the resulting shift which is required to take place in the arithmetic unit of FIGS. 9A–9E.

TABLE VIII

| A | B | C | D | SHIFT |
|---|---|---|---|---|
| 1 | 1 | 1 | 0 | 8 times left |
| 0 | 1 | 1 | 0 | 7 times left |
| 1 | 0 | 1 | 0 | 6 times left |
| 0 | 0 | 1 | 0 | 5 times left |
| 1 | 1 | 0 | 0 | 4 times left |
| 0 | 1 | 0 | 0 | 3 times left |
| 1 | 0 | 0 | 0 | 2 times left |
| 0 | 0 | 0 | 0 | 1 times left |
| 1 | 1 | 1 | 1 | stop |
| 0 | 1 | 1 | 1 | 1 times right |
| 1 | 0 | 1 | 1 | 2 times right |
| 0 | 0 | 1 | 1 | 3 times right |
| 1 | 1 | 0 | 1 | 4 times right |
| 0 | 1 | 0 | 1 | 5 times right |
| 1 | 0 | 0 | 1 | 6 times right |
| 0 | 0 | 0 | 1 | 7 times right |

The control unit 31 further includes therein delta coder 35 which in the reduction to practice illustrated is JK type flip flop $A_nFF$ which provides the delta modulation output for the resultant residual speech signal.

In addition, the control unit of FIGS. 8 produce other control signals to enable the arithmetic control unit 25 of FIGS. 9 to perform the proper arithmetic operation such as addition, subtraction, multiplication and division.

FIGS. 11A – 11C when organized as shown in FIG. 11D illustrated the logic diagram for translator 34 and performs therein the translation of the 5 bit weight parameter $w_1$ and the 4 bit parameter $w_2$ to and eight bit code. This translation is accomplished by means of the adder 80, four bit complementors 81 and 82 together with the associated logic circuitry coupled to the five bit registers 83 and 84 which are used to store the five bit parameter $w_1$ and the four bit parameter $w_2$. It should also be noted that the various gates coupled to register 84 together with the four bit adder 85 and the gates coupled thereto perform the stability check to assure that $w_1$ is in the range of values of $-2<w_1<2$ and $w_2$ is in the range of $-1<w_2<1$ as described hereinabove with respect to FIG. 4A.

Figure 12A:
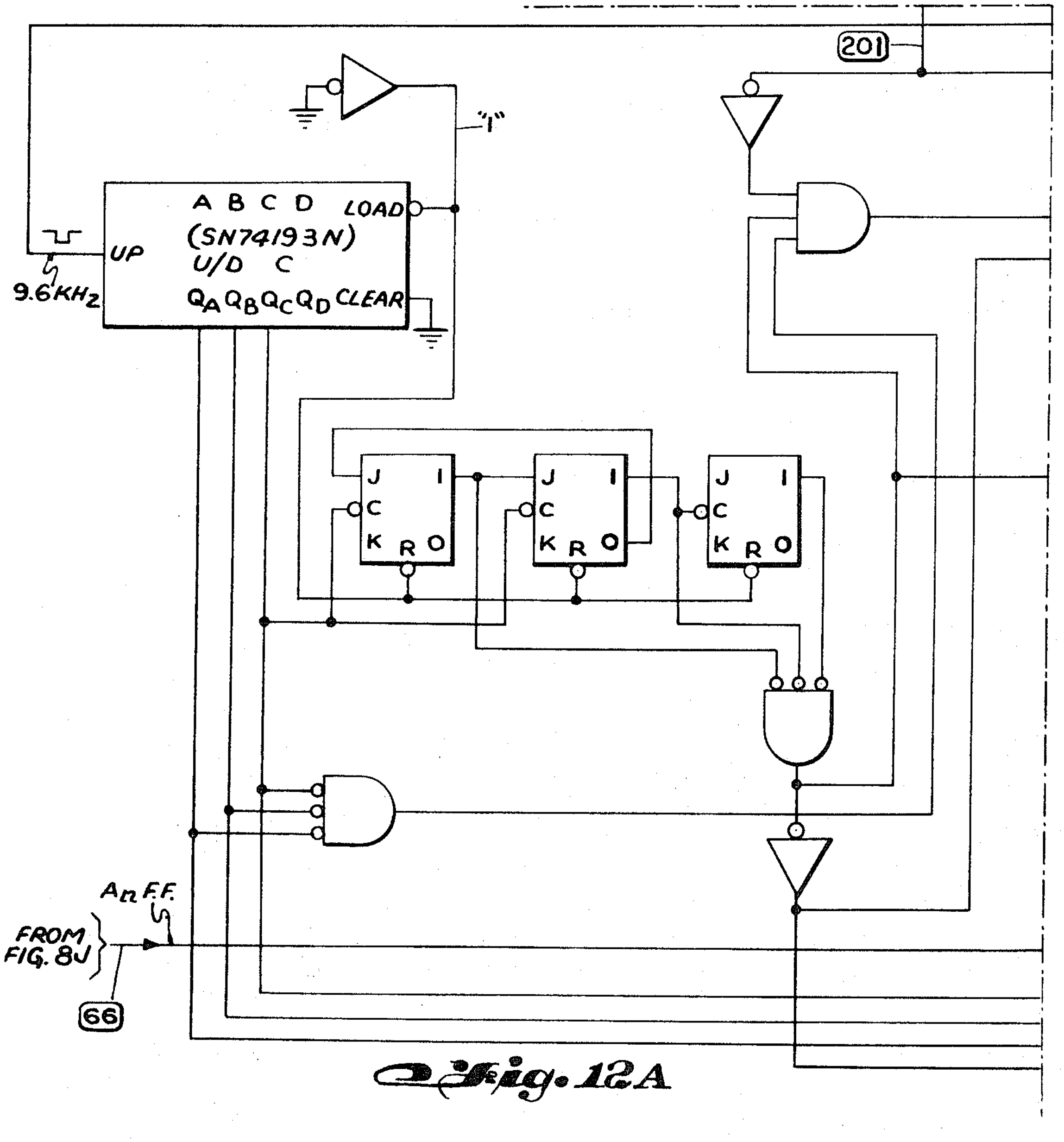
FIGS. 12A and 12B when organized as shown in FIG. 12C illustrates one embodiment of the logic diagram of the multiplexer of FIG. 4A.
Figure 12C:
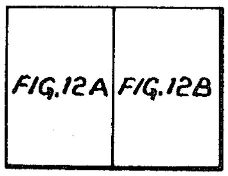
Figure 12B:
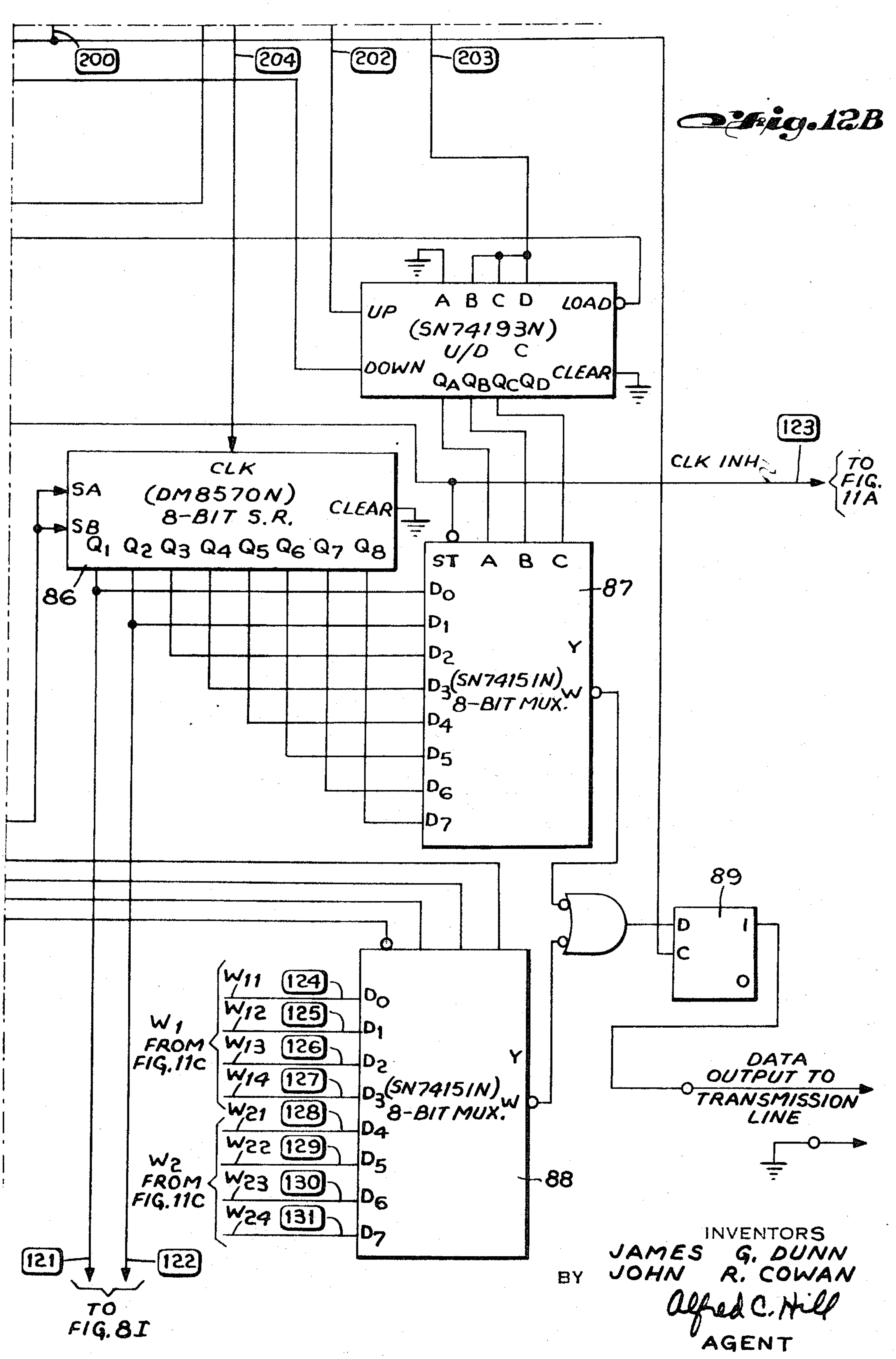

The logic diagram shown in FIGS. 12A and 12B when organized as shown in FIG. 12C illustrates the logic diagram for the multiplexer 36 of FIG. 4A. It should be recalled that an eight bit register buffer is used to store the delta coder bits while the coded weights are being transmitted. This register buffer is eight bit shift register 86. This permits the proper multiplexing of the coded parameters and the delta code through the means of the eight bit multiplexers 87 and 88 which provide the multiplexed data for application to the data transmission lines through the means of the D type flip flop 89 used for pulse regeneration.

Turning now to the receiver as illustrated in FIG. 4B and described with reference thereto the following description will be merely to high-light each of these blocks with respect to the logic diagrams. The logic diagram of circuit 40 is illustrated in FIG. 13A – 13H when organized as shown in 13I. This logic diagram performs the major function of demodulating and smoothing the delta data in shift register 90, separating the multiplexed data, translate the weighting parameter code, and to provide framing the clock signals which includes as a major component thereof oscillator 91. In addition, the clock signal circuitry includes four bit binary counters 92, 93 and 94 together wiht the associated logic circuitry. These components comprise the digital phase lock loop wherein the binary divider is controlled to provide the desired frame acquisition substantially as described hereinabove with respect to FIG. 4B. The D-type flip flop 100 in affect is the phase comparator for the digital phase locked loop and when there is a 1 output on the 0 output of this flip flop the count of the dividing chain is altered to cause the desired clock synchronization condition.

This circuit 40 also includes an eight bit shift register 95 together with an eight bit buffer register 96 which together with adder 97 and two input four bit multiplexers 98 and 99 convert the four bit parameter code into a nine bit parameter code wherein the parameter $w_1$ has five bits and the parameter $w_2$ has four bits.

Figure 14A:
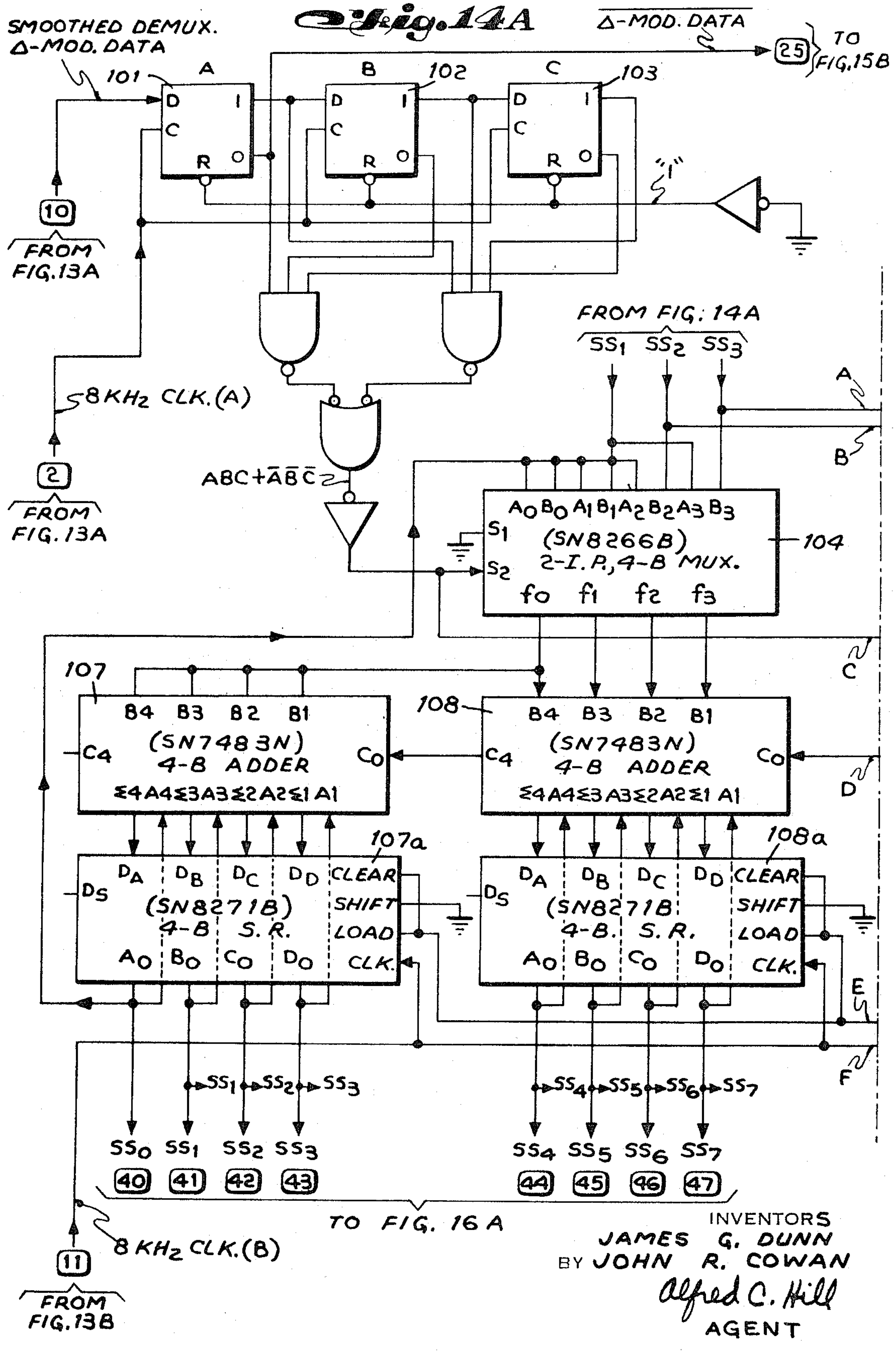
FIGS. 14A and 14B when organized as shown in FIG. 14C illustrates one embodiment of the logic diagram of the delta modulation step size calculator of FIG. 4B.
Figures 14B, 14C:
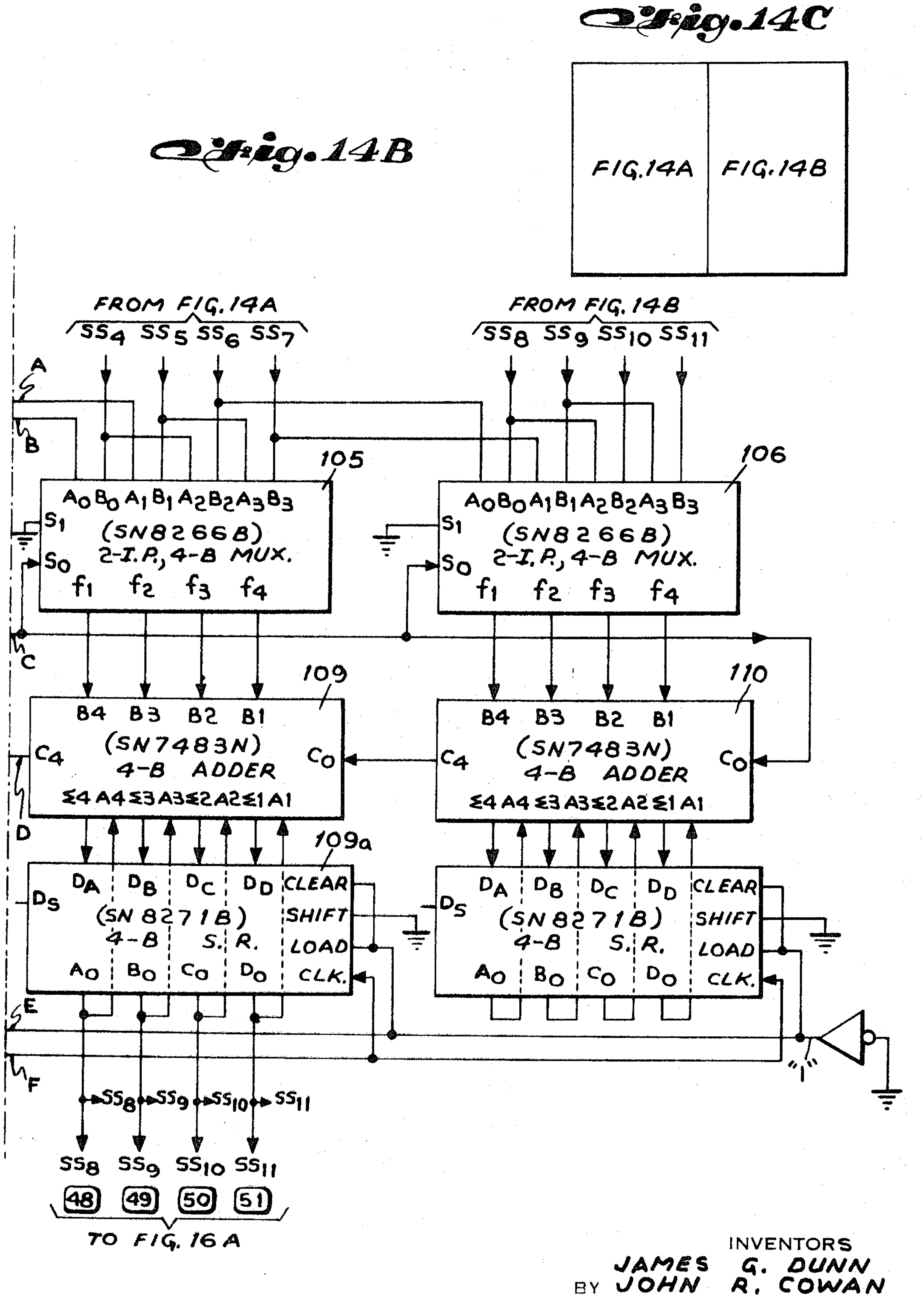

The logic diagram of calculator 39 of FIG. 4B is shown in FIGS. 14A and 14B when laid as illustrated in FIG. 14C. This step size calculator determines the step size according to the sequence of delta bits. When three delta bits having the same polarity are detected in D-type flip flops 101, 102 and 103 and their associated logic gates, an output is generated which controls, according to the polarity of the three delta bits, the operation of two bit input four bit complementers 104-106 and four bit adders 107–110 through means of adder 110. The operation of this step size calculator 39 is as follows:

The step size outputs from the three registers 107*a*, 108*a*, and 109*a* are shifted right four and six times and are connected back to the input of complementers 104, 105, 106. When three consecutive logic 1 or logic 0 delta bits are received, the complementers have no effect and the step size, shifted right 4 times, is passed through to the four bit adders 107–110. When any other combination of three delta bits is received a signal is sent to the complementers, causing the step size, shifted right six times, to be complemented and passed on to the adders 107–110. This complementing has the effect of making the adders perform a 2's complement subtraction.

Figure 13A:
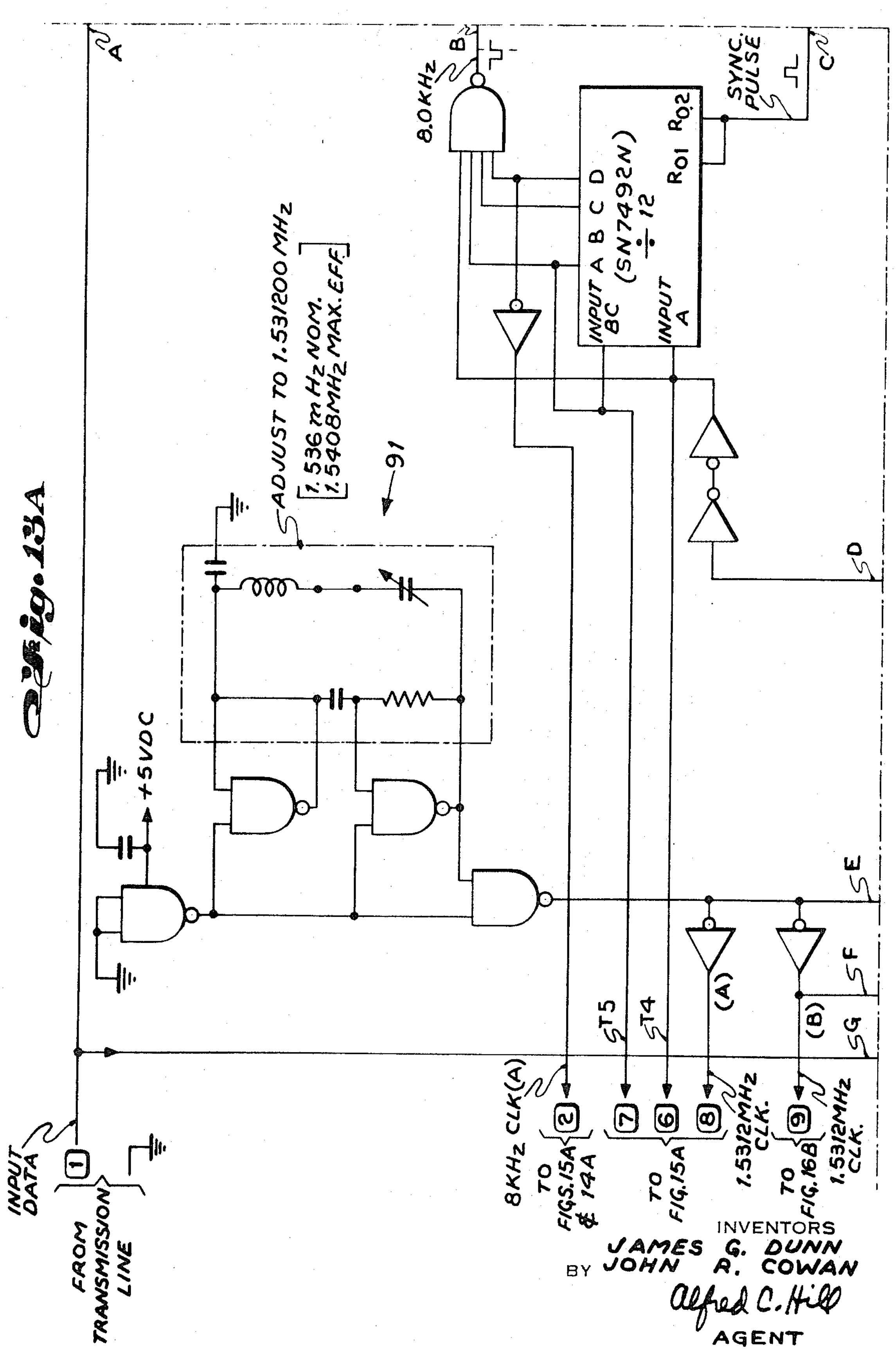
FIGS. 13A – 13H when organized as shown in 13I illustrates one embodiment of the logic diagram of the demultiplexer, framing circuit, delta decoder, parameter decoder and 8 bit to 9 bit translator of FIG. 4B.
Figure 13B:
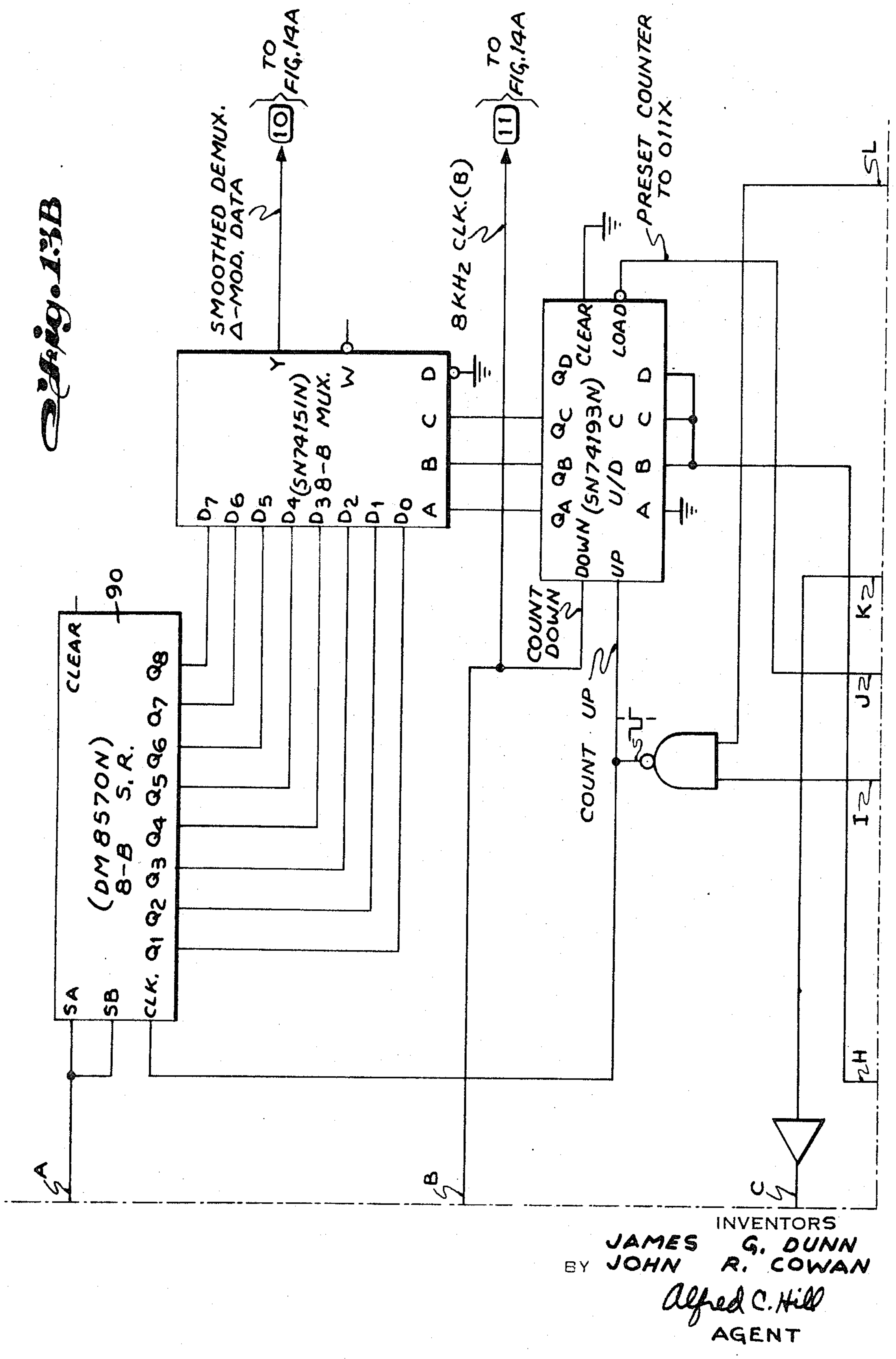
Figure 13C:
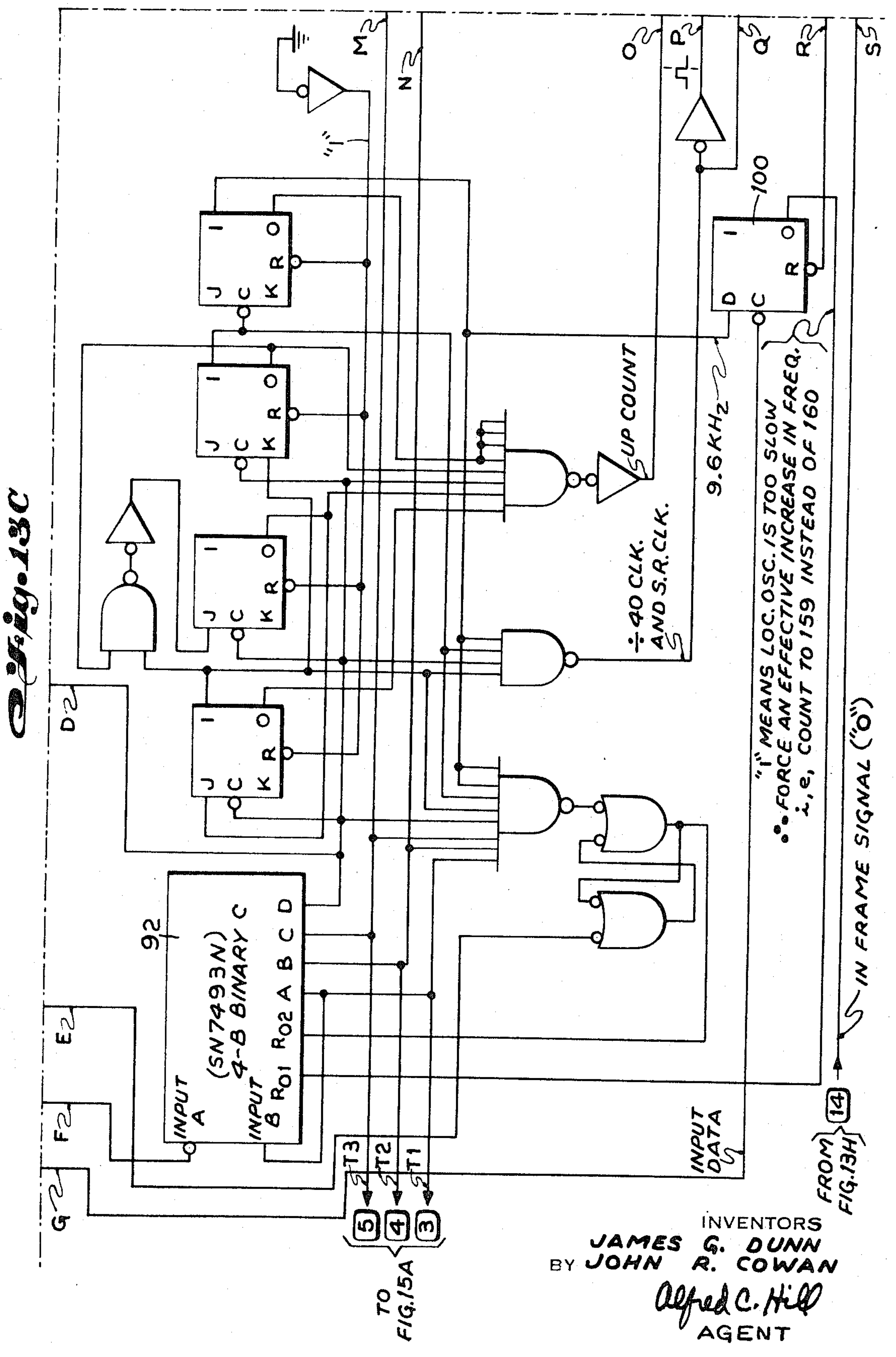
Figure 13D:
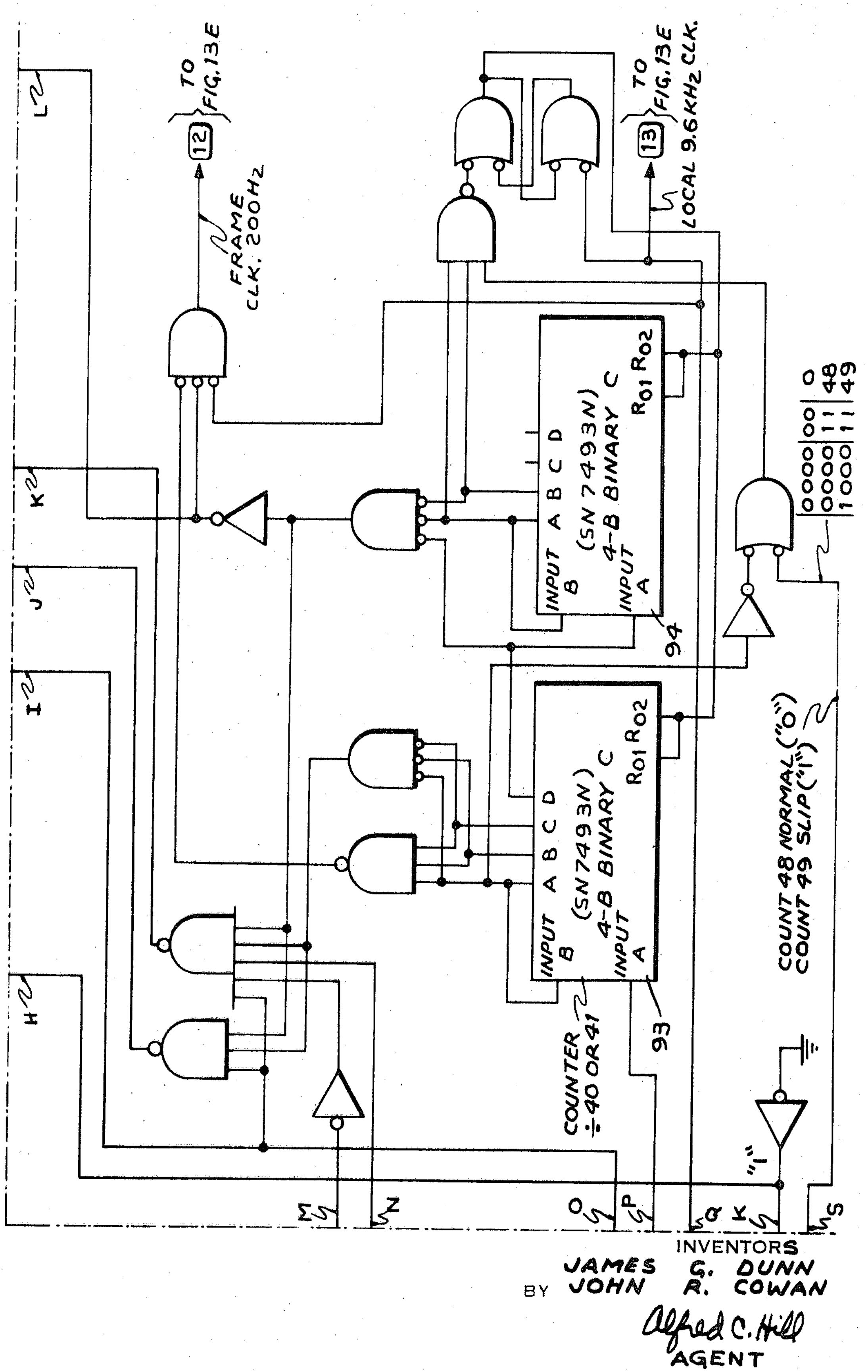
Figure 13E:
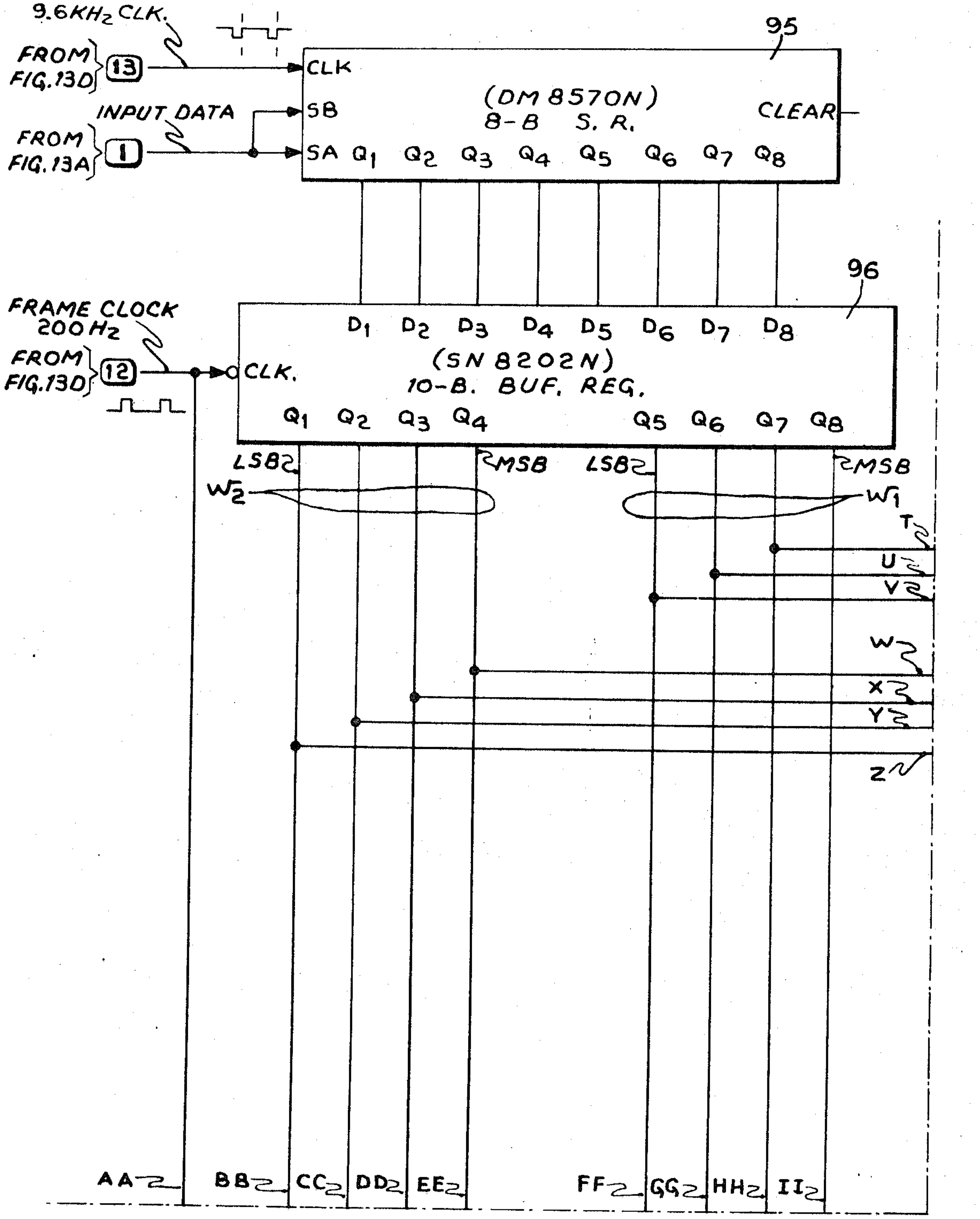
Figure 13F:
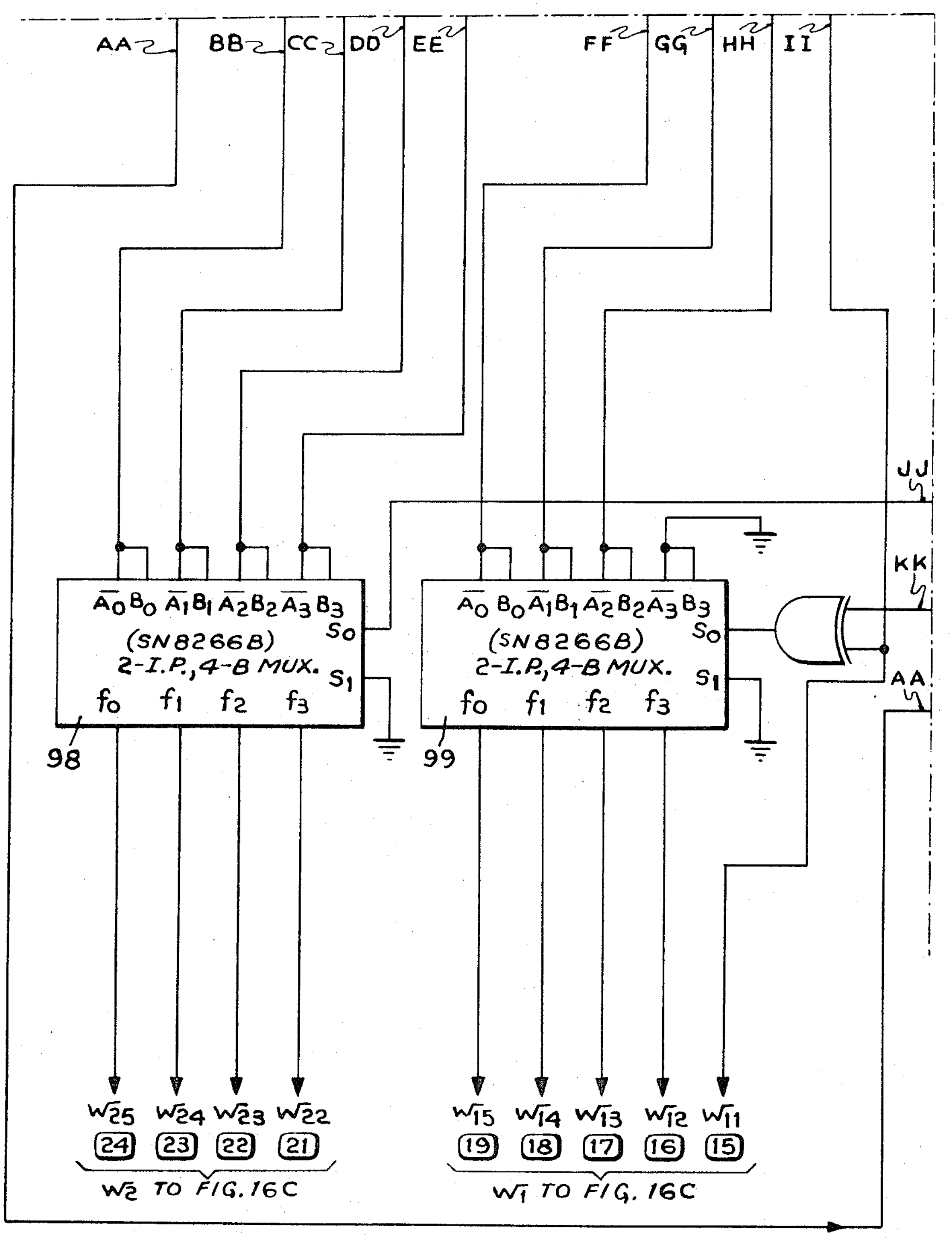
Figures 13G, 13I:
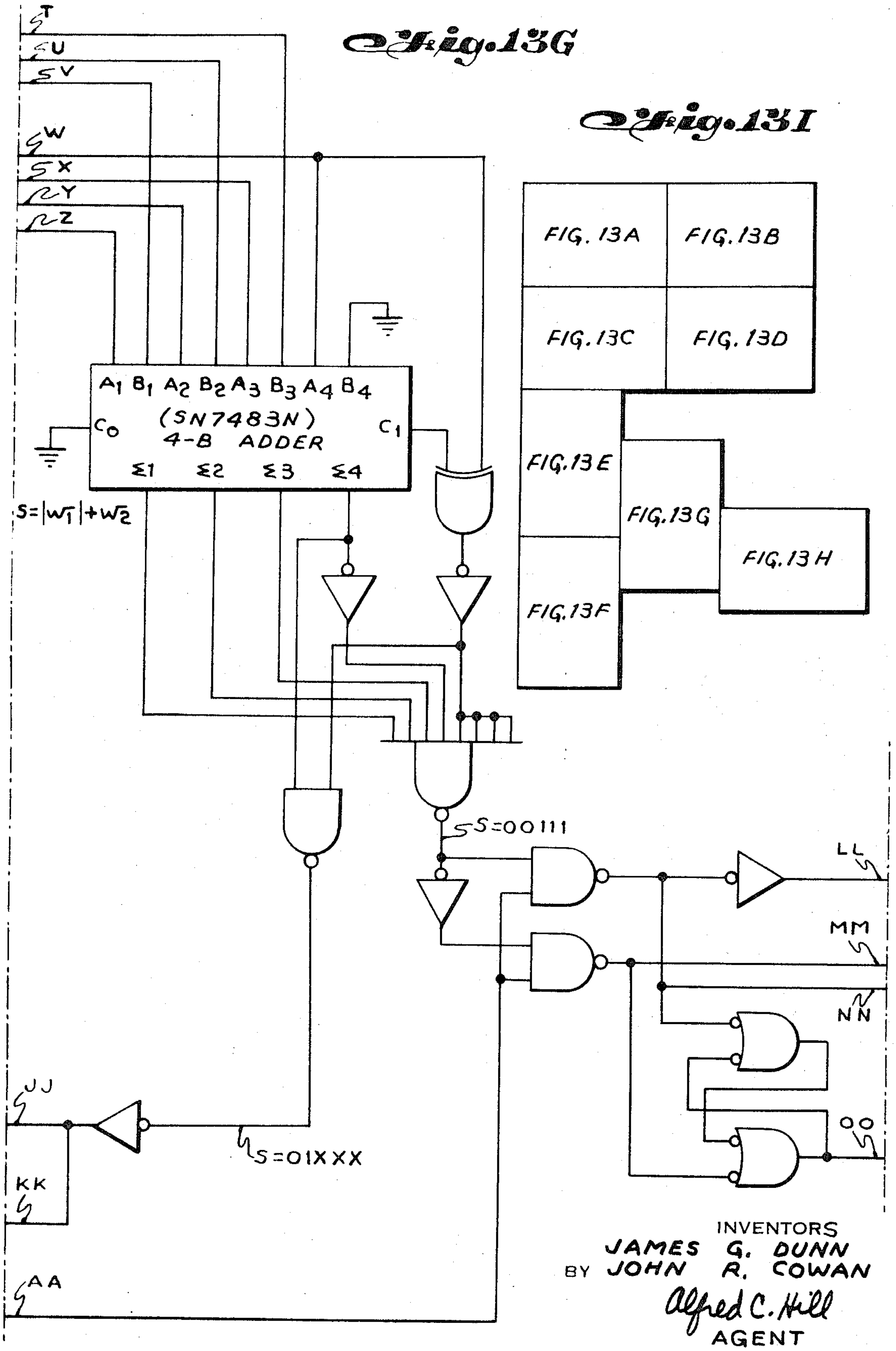
Figure 13H:
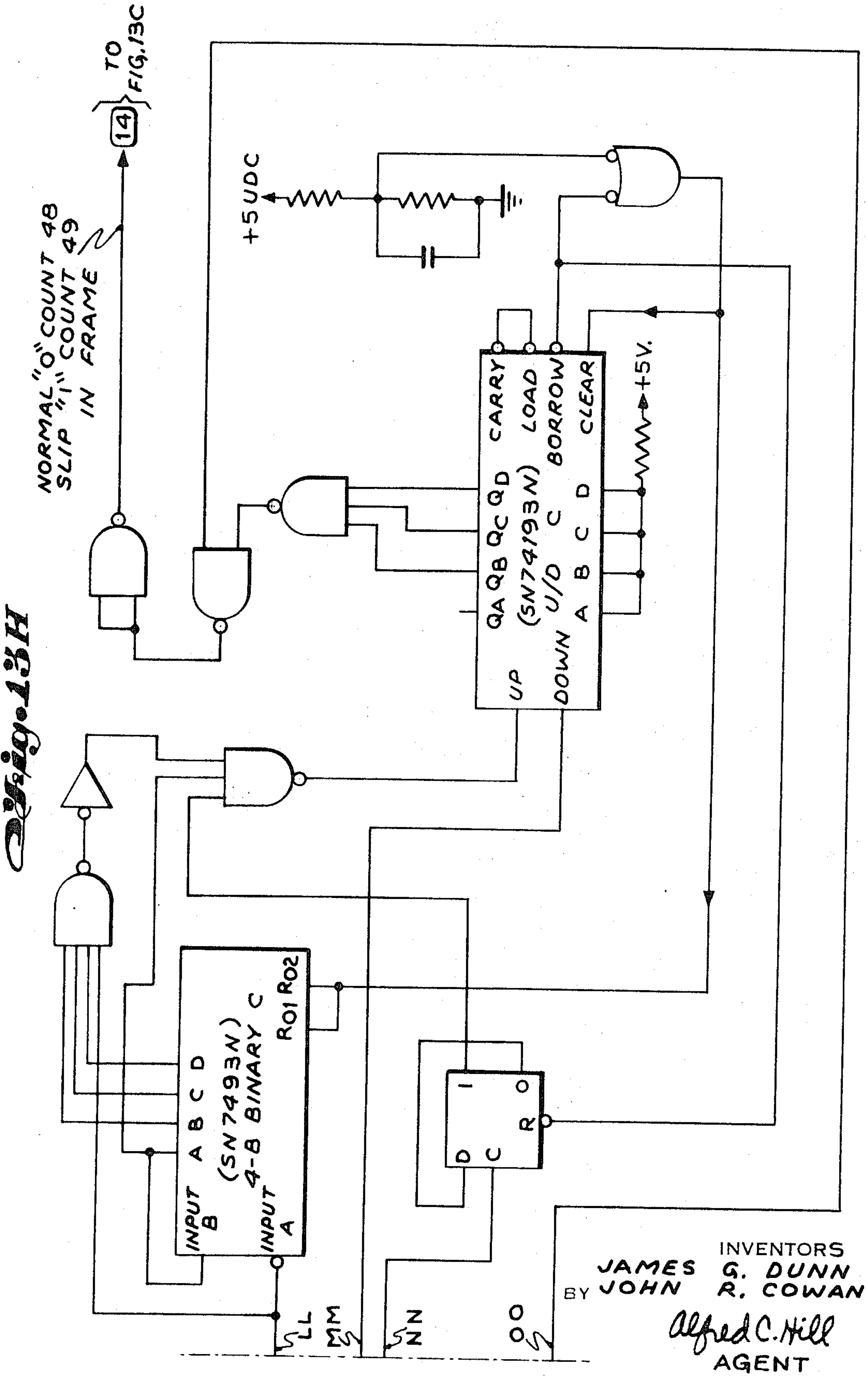
Figures 15A, 15D:
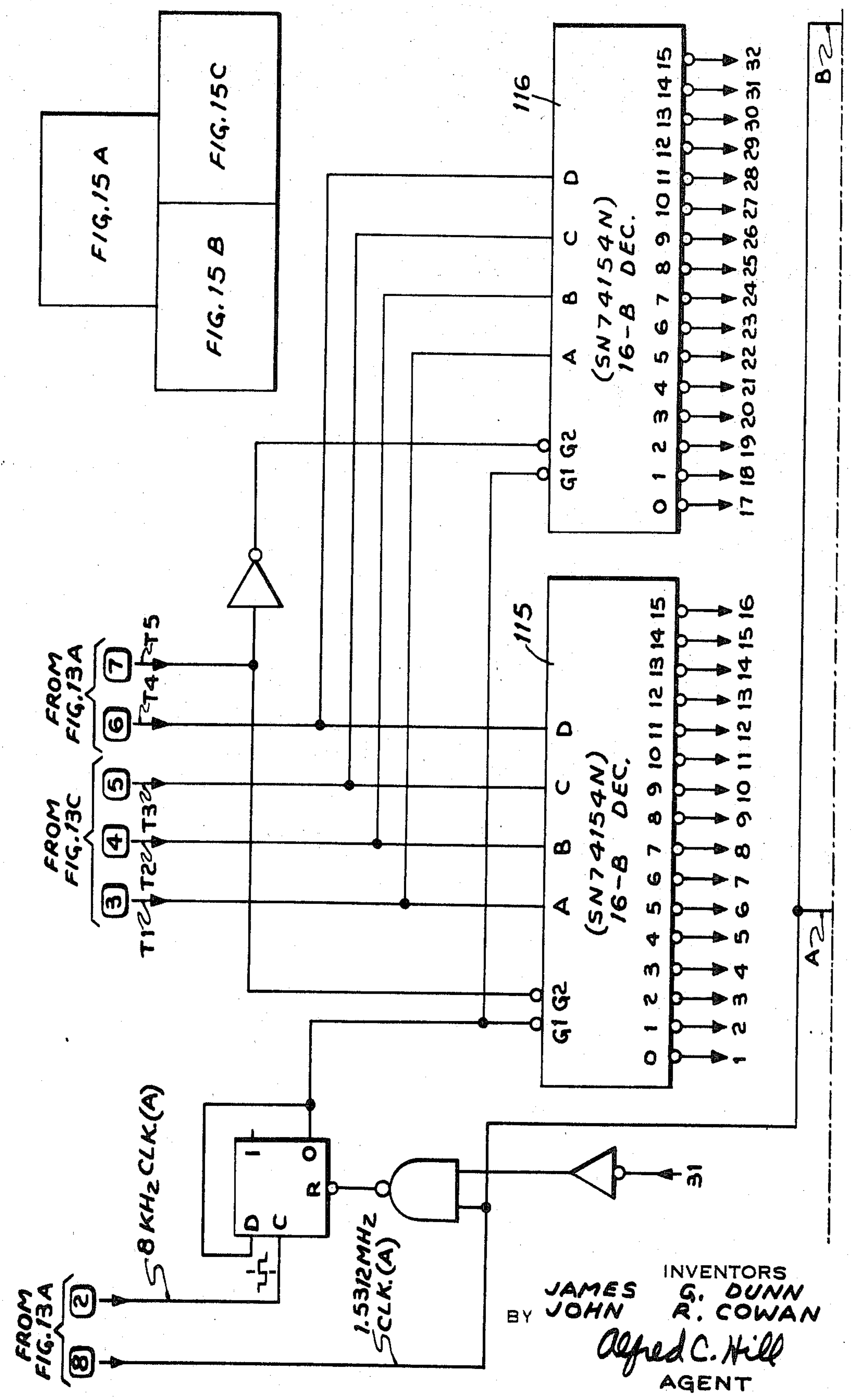
FIGS. 15A – 15B when organized as shown in 15D illustrates one embodiment of the logic diagram of the arithmetic control unit of FIG. 4B.
Figure 15B:
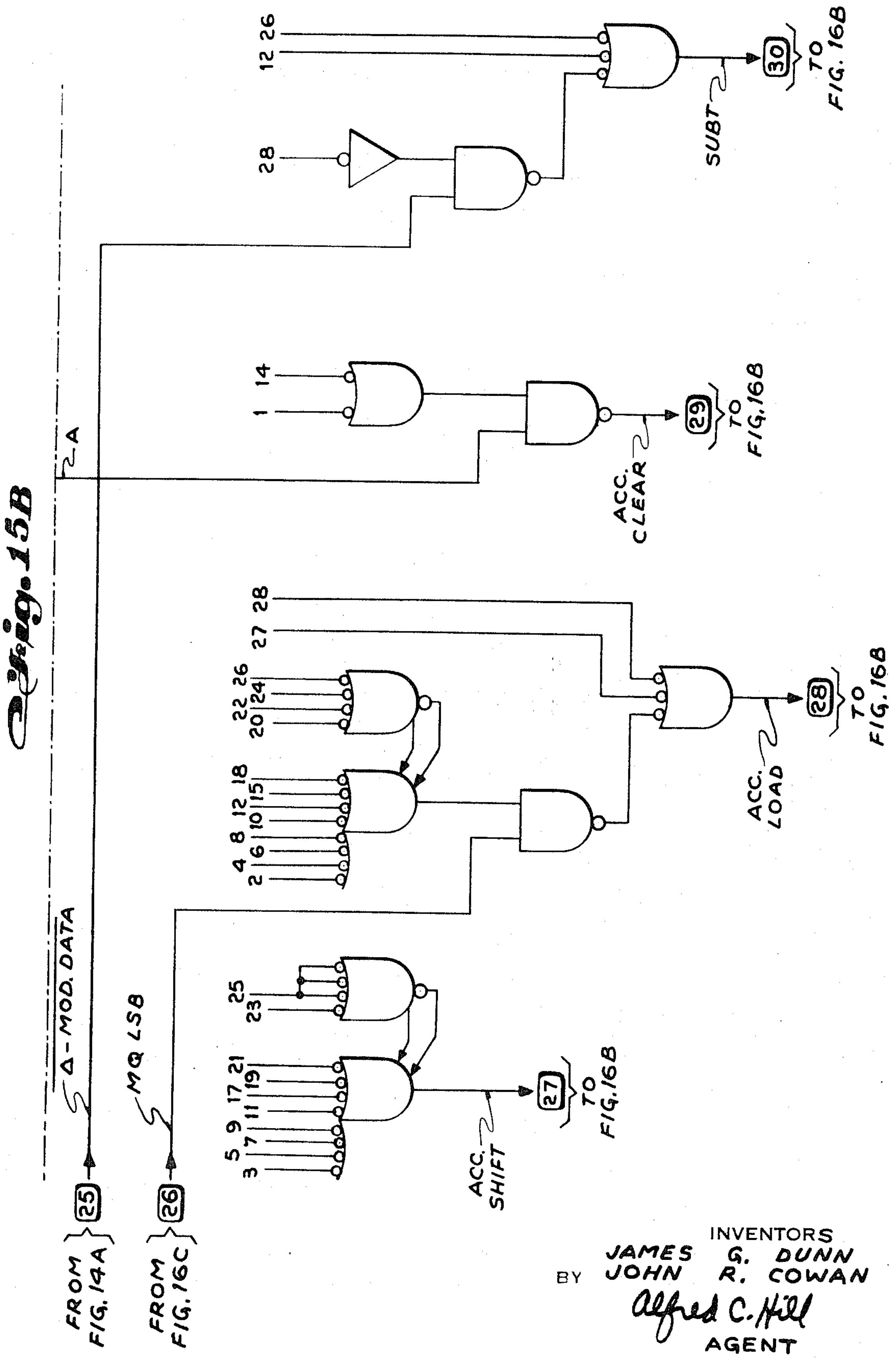
Figure 15C:
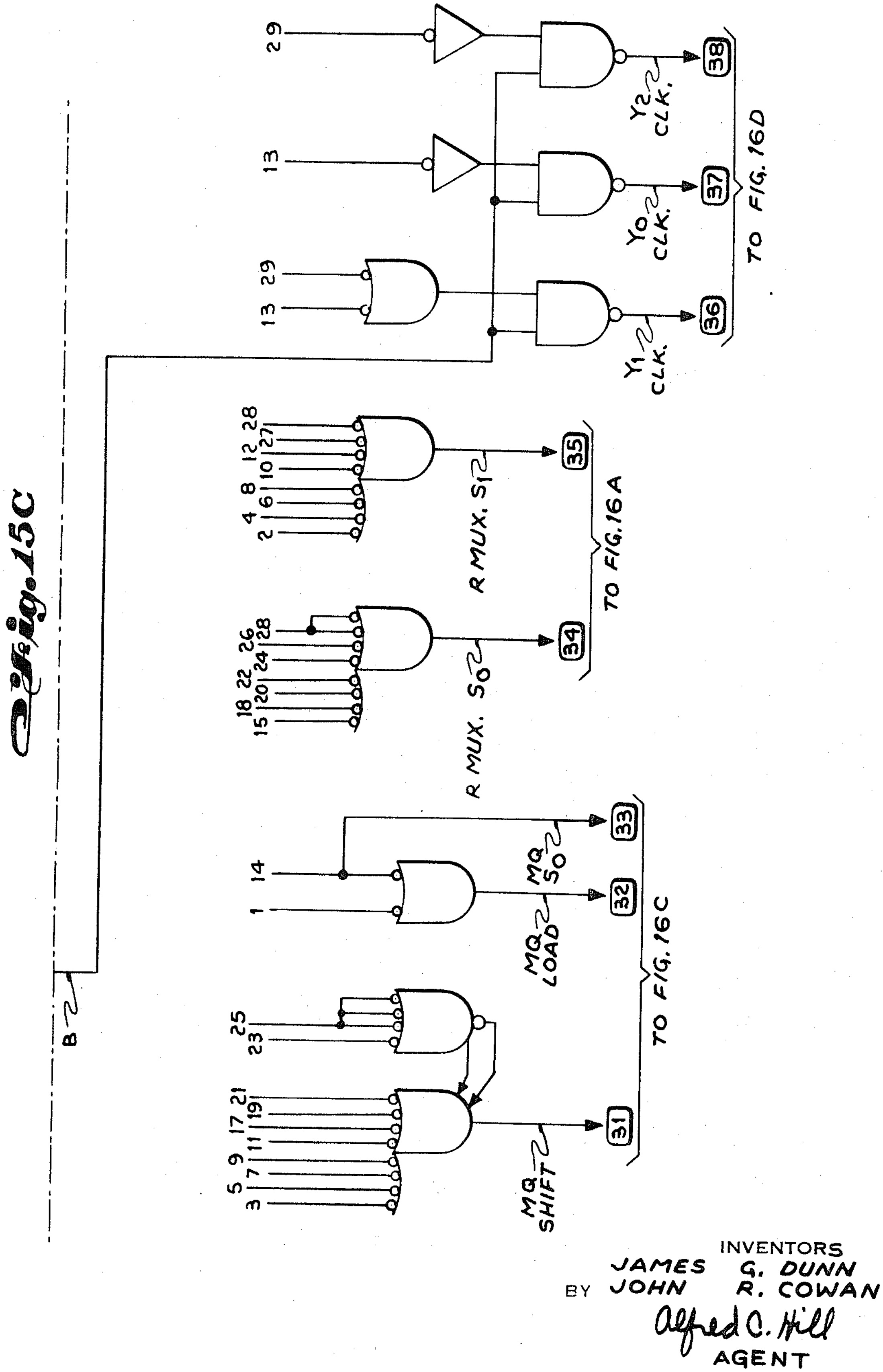
Figure 16A:
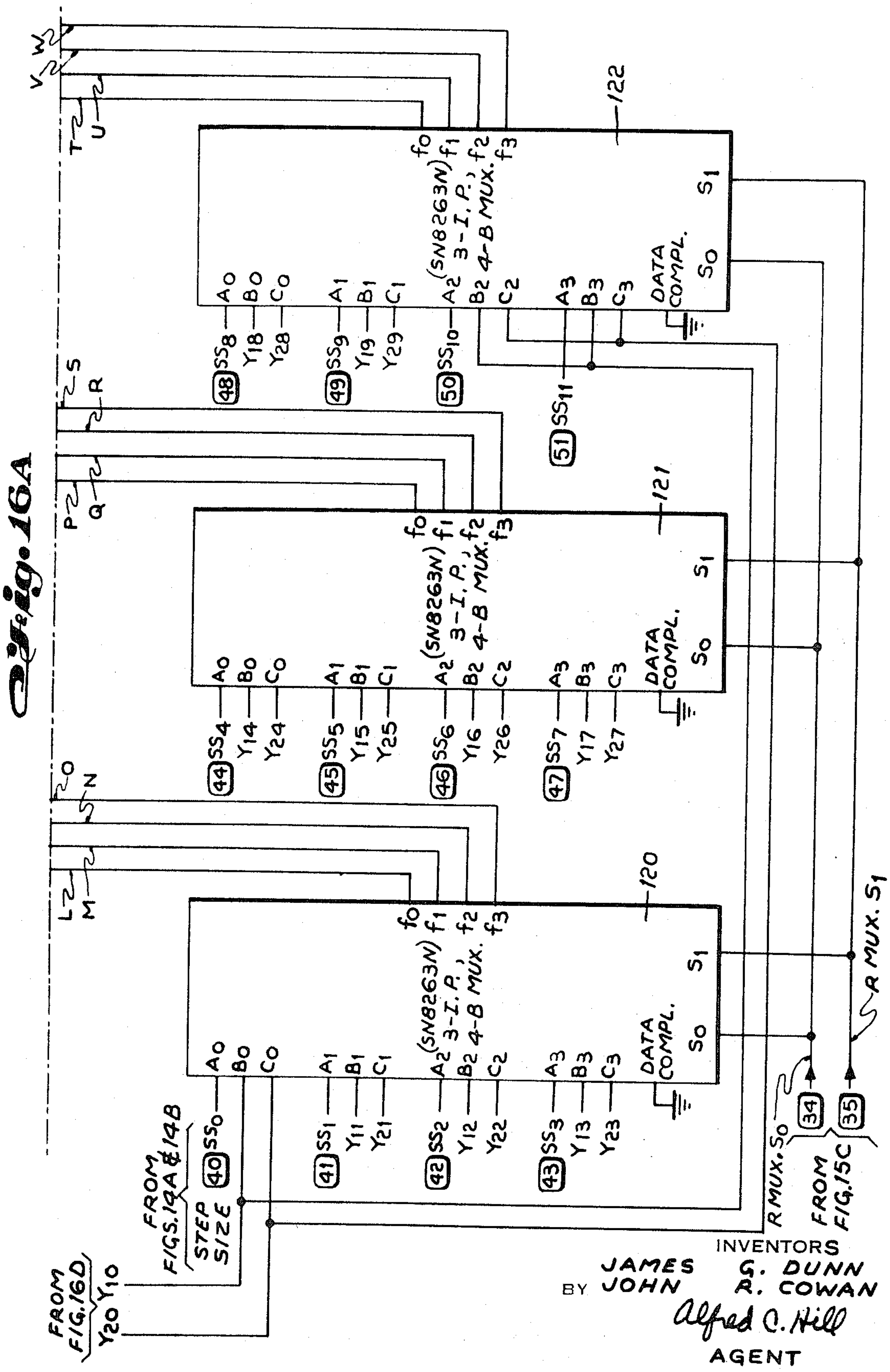
FIGS. 16A – 16D when organized as shown in FIG. 16E illustrates one embodiment of the logic diagram of the arithmetic unit, digital-to-analog converter, lowpass filter and pass utilization device of FIG. 4B.
Figure 16B:
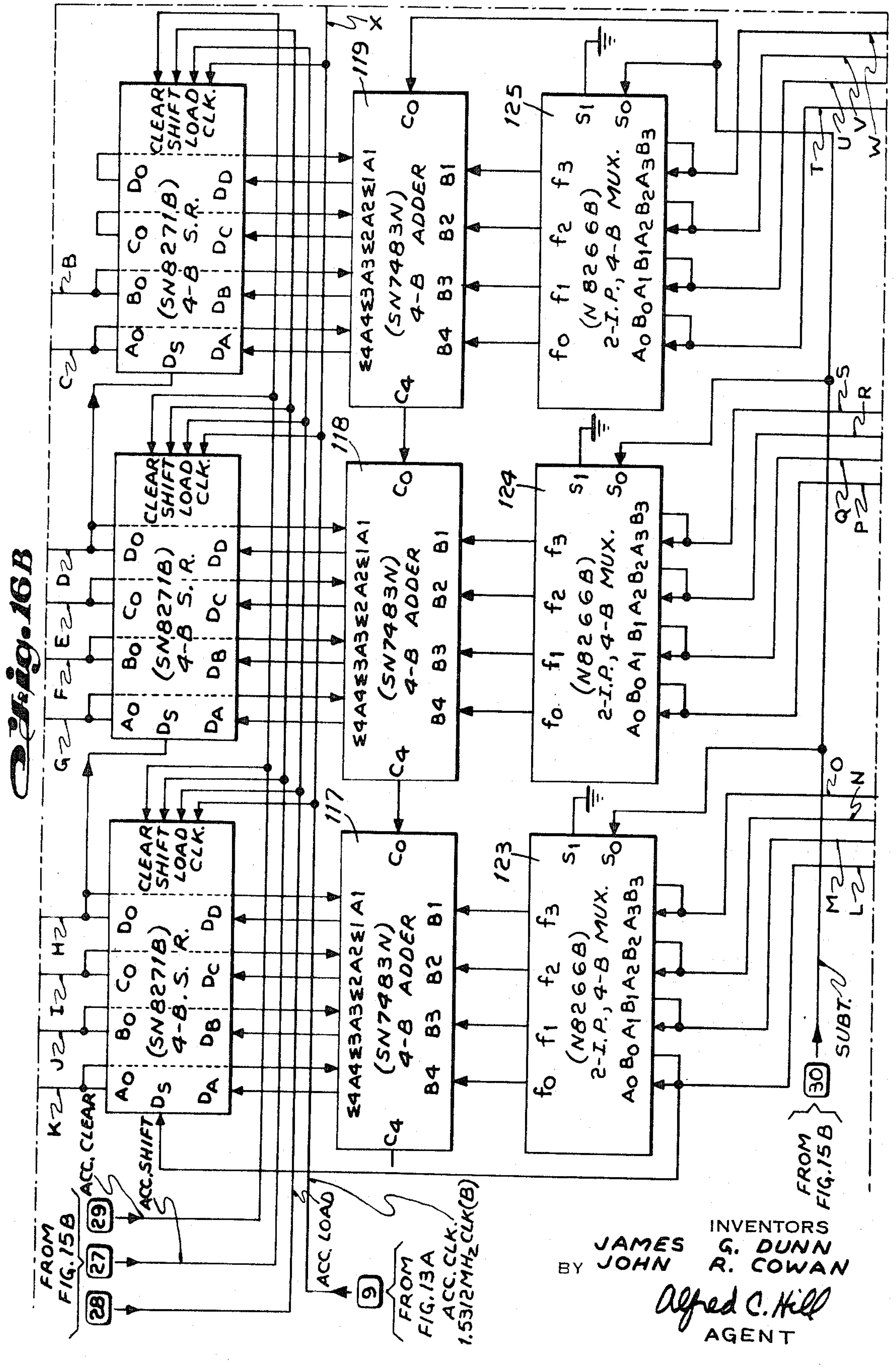
Figures 16C, 16E:
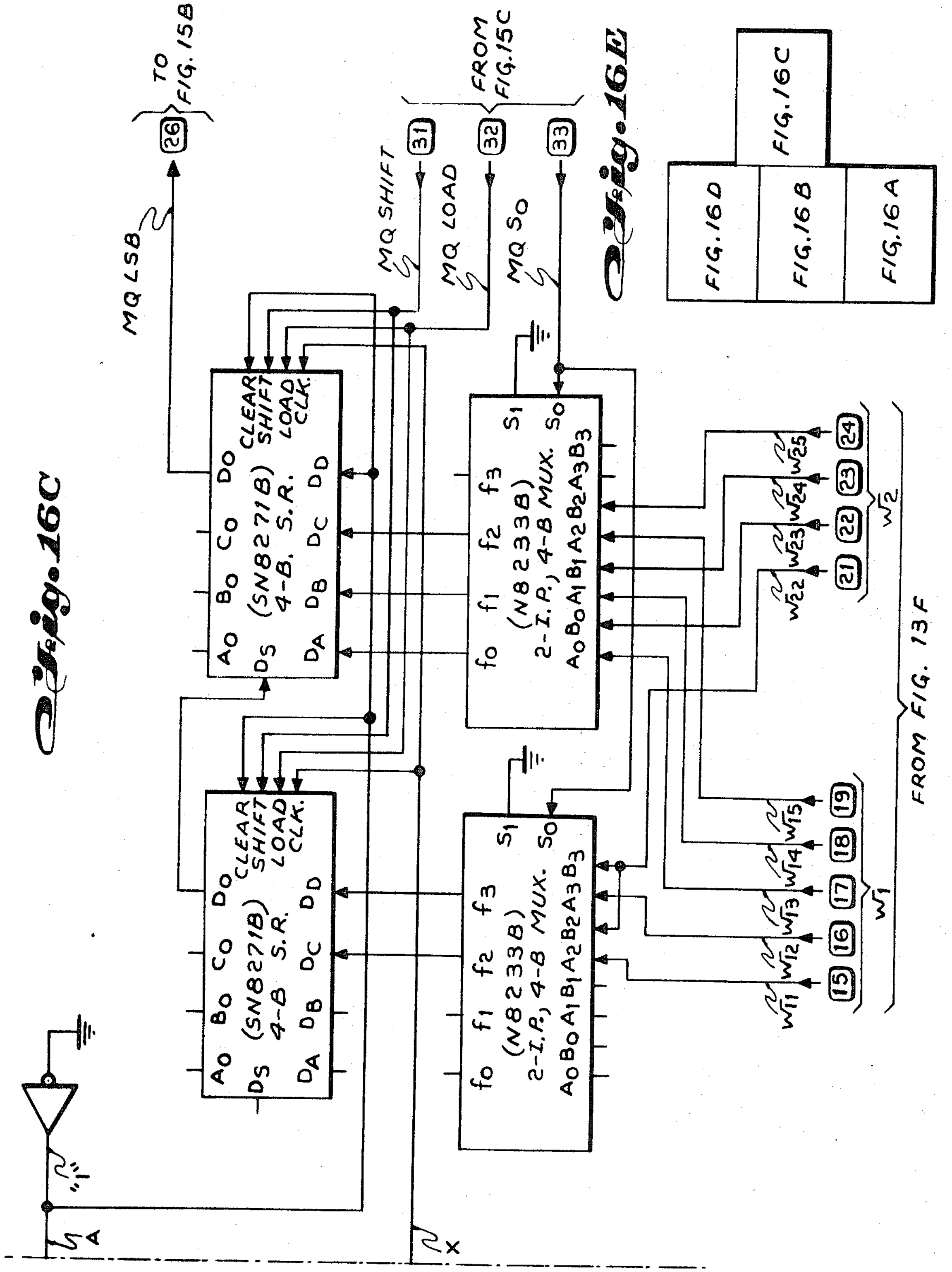
Figure 16D:
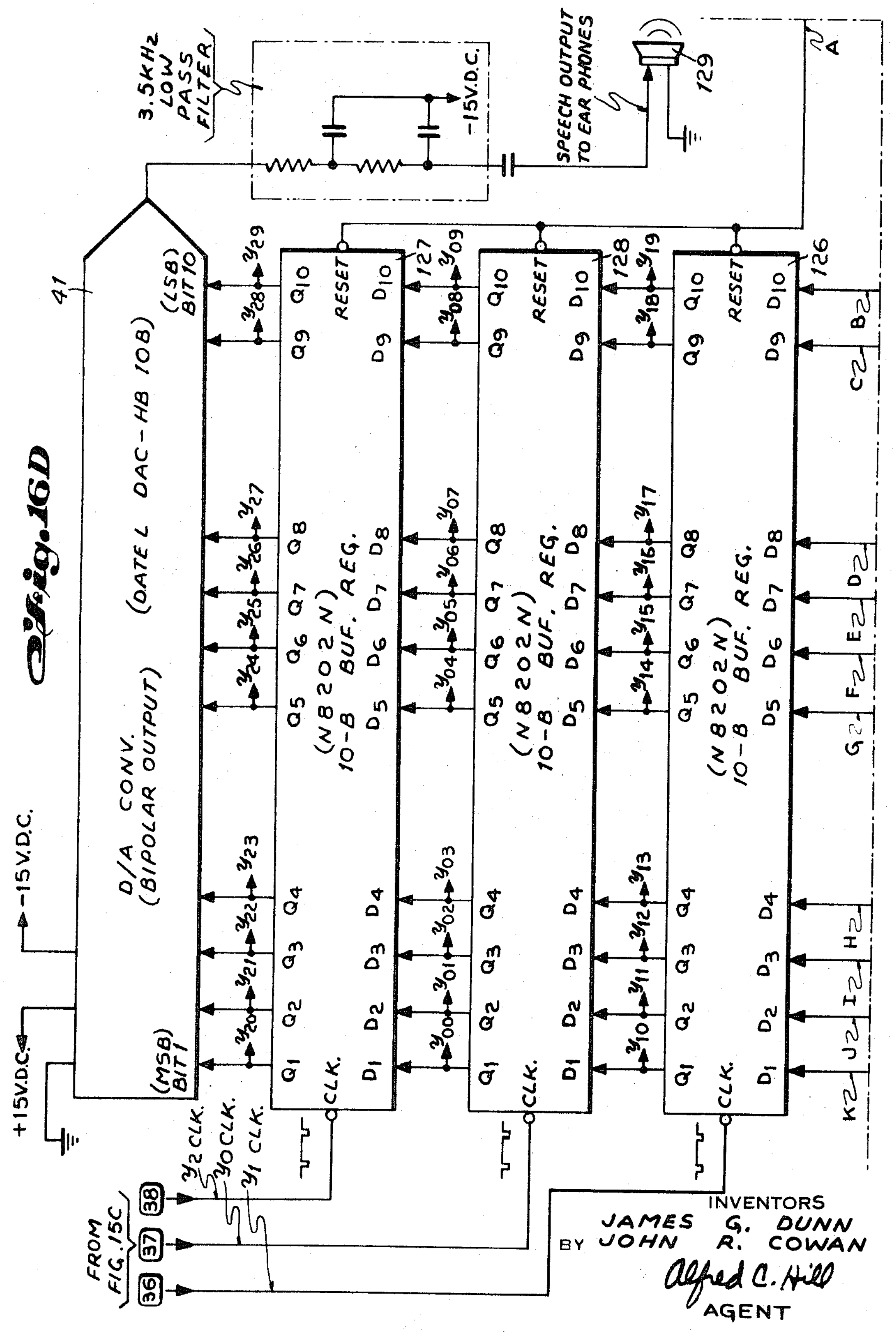

The logic diagram of arithmetic control unit 38 is shown in FIGS. 15A–15C when laid out according to FIG. 15D. Various inputs from FIGS. 13A and 13C are applied to 16 bit decoders 115 and 116 whose numbered outputs 1–32 are coupled similarly number inputs of the various gates in FIGS. 15B and 15C to produce the necessary control signals for the receiver arithmetic unit 37 whose logic diagram is shown in FIGS. 16A–16D when laid out as illustrated in FIG. 16E. As mentioned with respect to the description of FIG. 4B the arithmetic unit of FIGS. 16A–16D perform many less arithmetic functions than the transmitter arithmetic unit. The functions performed are primarily carried out by the three input, four bit multiplexexers 120–122 and the two input, four bit multiplexers 123–125. The three inputs to multiplixers 120–122 are provided from the 10 bit outputs of the $y_1$ 10 bit buffer register 126 which stores the $y_1$ parameter, from the ten bit outputs of the $y_2$ 10 bit buffer register 127 which stores the $y_2$ parameter and from the eleven SS outputs of the step size calculator illustrated in FIGS. 14A and 14B. The transmission of binary bits between register 126 and 127 is under control of the $y_0$ clock and the ten bit buffer register 128. After each calculation for a sample, the results from register 127 are transmitted in parallel to the digital-to-analog converter 41 and, hence, through the low-pass filter 42 to a speech utlization device illustrated as earphones 129.

While we have described above the principles of our invention in connection with specific apparatus it is to be more clearly understood that this description is made only by way of example and not as a limitation to the scope of out invention as set forth in the objects thereof and in the accompanying claims.

We claim:

1. A speech communication system comprising:
a source of speech;
first means coupled to said source responsive to said speech to determine the redundant information of said speech, to determine at least one weighting parameter of said redundant information and to remove said redundant information from said speech to produce a residual signal;
second means coupled to said first means to transmit said residual signal and said parameter of said redundant information; and
third means coupled to said second means responsive to said residual signal and said parameter of said redundant information to reconstruct said speech for utilization.

2. A system according to claim 1, wherein
said second means transmits said residual signal in the form of delta modulation and said parameter of said redundant information in the form of binary code groups.

3. A system according to claim 1, wherein
said first means provides periodically said parameter of said redundant information in the form of *n* bit binary code groups, where *n* is an integer greater than two, and
said second means includes
means to translate said n bit binary code groups into ($n$—1) bit binary code groups for transmission.

4. A system according to claim 3, wherein
at least one distinctive combination of bits of said ($n$—1) bit binary code groups is employed for synchronization.

5. A system according to claim 4, wherein
the presence of said distinctive combination of bits indicates an out-of-synchronization condition.

6. A system according to claim 1, wherein
said first means includes
fourth means coupled to said source to sample said speech at a given rate and convert said samples to binary representation thereof,
fifth means coupled to said fourth means to store said binary representation of a predetermined number of immediately preceeding ones of said samples, and
sixth means coupled to said fifth means and said fourth means responsive to said binary representation of the present one of said samples and said immediately preceeding ones of said samples to determine said redundant information, to determine said parameter of said redundant information and to produce said residual signal.

7. A system according to claim 6, wherein
said predetermined number equals two.

8. A system according to claim 6, wherein
said sixth means is a binary arithmetic arrangement which provides said parameter of said redundant information in the form of *n* bit binary code groups, where *n* is an integer greater than two, and said residual signal in the form of binary code groups.

9. A system according to claim 8, wherein
said second means includes
seventh means coupled to said sixth means to convert said binary residual signal into a delta modulation signal for transmission, and
eighth means coupled to said sixth means to convert said *n* bit binary code groups into a ($n$—1) bit binary code groups for transmission, at least one distinctive combination of bits of said ($n$—1) bit binary code group providing an indication of lack of synchronization.

10. A system according to claim 9, wherein
said third means includes
ninth means coupled to said seventh and eighth means to receive said delta modulation signal and to receive said ($n$—1) bit binary code groups,
10th means coupled to said ninth means to translate said ($n$—1) bit binary code groups into said *n* bit binary code groups,
11th means coupled to said ninth means to recover quantized steps of proper polarity represented by said delta modulation signal,
12th means coupled to said tenth and eleventh means to reconstruct said binary representations of said samples, and
13th means coupled to said twelfth means to convert said binary representation into said speech for utilization.

11. A system according to claim 10, wherein
said 11th means responds to the sequence of similar bits in said delta modulation signal to control the amplitude of said quantized steps.

12. A system according to claim 11, further including
14th means coupled to said seventh and eighth means to multiplex on a time basis said delta modulation signal and said ($n$—1) bit binary code groups prior to transmission, and 15th means coupled between said 14th means and said ninth means to demultiplex on a time basis said delta modulation signal and said ($n$−1) bit binary code groups, said 15th means including means responding to to said ($n$−1) bit binary code groups to maintain said system synchronized where response to said one distinctive combination of bits of said ($n$−1) bit binary code groups indicates an out-of-synchronization condition.

13. A speech transmitter comprising:

a source of speech;

first means coupled to said source responsive to said speech to determine the redundant information of said speech, to determine at least one weighting parameter of said redundant information and to remove said redundant information from said speech to produce a residual signal; and second means coupled to said first means to transmit said residual signal and said parameter of said redundant information.

14. A transmitter according to claim 13, wherein said second means transmits said residual signal in the form of delta modulation and said parameter of said redundant information in the form of binary code groups.

15. A transmitter according to claim 13, wherein said first means provides periodically said parameter of said redundant information in the form of n bit binary code groups, where $n$ is an interger greater than two, and said second means includes means to translate said $n$ bit binary code groups into ($n$−1) bit binary code groups for transmission.

16. A transmitter according to claim 15, wherein at least one distinctive combination of bits of said ($n$−1) bit binary code groups is employed for synchronization.

17. A transmitter according to claim 16, wherein the presence of said distinctive combination of bits indicates an out-of-synchronization condition.

18. A receiver to provide speecj output comprising:

a source of delta modulation signals representing a non-redundant portion of said speech and binary code groups representing at least one weighting parameter for a redundant portion of said speech;

an arithmetic unit coupled to said source responsive to said delta modulation signals and the present one and a given number of immediately preceeding ones of said binary code groups to reconstruct a binary code representation of samples of said speech; and a digital to analog converter arrangement coupled to said arithmetic unit to provide said speech output.

19. A receiver accoreing to claim 18, wherein said given number equals two.

* * * * *